US005572218A

United States Patent [19]
Cohen et al.

[11] Patent Number: 5,572,218
[45] Date of Patent: Nov. 5, 1996

[54] SYSTEM AND METHOD FOR GENERATING PRECISE POSITION DETERMINATIONS

[75] Inventors: Clark E. Cohen, Palo Alto; Bradford W. Parkinson, Los Altos; John D. Powell, Menlo Park; David G. Lawrence; Boris S. Pervan, both of Mountain View; Henry S. Cobb, Stanford, all of Calif.

[73] Assignee: IntegriNautics, Palo Alto, Calif.

[21] Appl. No.: 480,021

[22] Filed: Jun. 7, 1995

Related U.S. Application Data

[63] Continuation of Ser. No. 410,011, Mar. 22, 1995, abandoned, which is a continuation of Ser. No. 36,319, Mar. 24, 1993, abandoned.

[51] Int. Cl.$^6$ .............................. G01S 5/02; G01S 1/08; H04B 7/185
[52] U.S. Cl. ............................................ 342/357; 342/386
[58] Field of Search ................................ 342/357, 353, 342/385, 386, 33, 410

[56] References Cited

U.S. PATENT DOCUMENTS

| | | | |
|---|---|---|---|
| 4,667,203 | 5/1987 | Counselman, III | 342/357 |
| 4,672,382 | 6/1987 | Fukuhara et al. | 342/357 |
| 4,754,465 | 6/1988 | Trimble | 375/1 |
| 4,894,655 | 1/1990 | Joguet et al. | 342/357 |
| 4,928,106 | 5/1990 | Ashjaee et al. | 342/352 |
| 4,972,431 | 11/1990 | Keegan | 375/1 |
| 5,134,407 | 7/1992 | Lorenz et al. | 342/352 |
| 5,177,489 | 1/1993 | Hatch | 342/357 |
| 5,252,982 | 10/1993 | Frei | 342/357 |
| 5,311,194 | 5/1994 | Brown | 342/357 |

OTHER PUBLICATIONS

Expanding The Performance Envelope of GPS-Based Attitude Determination, by Clark E. Cohen, et al., Institute of Washington, Albuquerque, NM, Sep. 9–13, 1991.

Flight Tests of Attitude Determination Using GPS Compared Against An Inertial Navigation Unit, by Clark E. Cohen, et al., Institute of Navigation, San Francisco, CA, Jan. 20–22, 1993.

Integer Ambiguity Resolution Of The GPS Carrier For Spacecraft Attitude Determination, by Clark E. Cohen, et al., 15th Annual AAS Guidance & Control Conference, Keystone, CO, Feb. 8–12, 1992.

Attitude Determination Using GPS, by Clark E. Cohen, Dissertation for Ph.A. from Stanford University, Dec. 1992.

(List continued on next page.)

*Primary Examiner*—Gregory C. Issing
*Attorney, Agent, or Firm*—Flehr, Hohbach, Test, Albritton & Herbert

[57] ABSTRACT

A GPS system and method for generating precise position determinations. The GPS system includes a ground based GPS reference system which receives with a reference receiver GPS signals and makes phase measurements for the carrier components of the GPS signals. The GPS reference system then generates and broadcasts an initialization signal having a carrier component and a data link signal having a data component. The data component of the data link signal contains data representing the phase measurements made by the reference receiver. The GPS system also includes a GPS mobile system which receives with a mobile position receiver the same GPS signals as were received by the reference system. In addition, the GPS position receiver receives the data link and initialization signals broadcast by the reference system. The GPS position receiver then makes phase measurements for the carrier components of the GPS signals during and after an initialization period and makes phase measurements for the initialization signal during the initialization period. In response to the phase measurements made by both the reference receiver and the position receiver during the initialization period, the position receiver generates initialization values representing resolution of the integer ambiguities of the received signals. In response to the initialization values and the phase measurements made by both the receivers after the initialization period, the position receiver generates precise position determinations to within centimeters of the exact location.

25 Claims, 19 Drawing Sheets

OTHER PUBLICATIONS

Ambiguity Resolution On–The–Fly—A Comparison of P Code And High Performance C/A Code, by Dr. Gerard Lachapelle, et al., Institute of Navigation, GPS–92, Albuquerque, NM, Sep. 1992.

Aircraft Applications of GPS–Based Attitude Determination, by Clark E. Cohen, et al., Institute of Navigation, GPS–92, Albuquerque, NM, Sep. 1992.

Kinematic GPS For Differential Positioning: Resolving Integer Ambiguities On The Fly, by Patrick Y. C. Hwang, GPS Papers published in Navigation, vol. 38, No. 1, Jan. 1991.

Application & Technical Notes, Real–Time Kinematic GPS Surveying Technical Overview, published by Trimble Navigation, Jan. 1992.

Landau, H., et al., "Precise Real–Time Differential GPS Positioning Using On–The–Fly Ambiguity Resolution", *Institute of Astonomical and Physical Geodesy, University FAF Munich.*

"Site Surveyor, –Real–Time GPS Survey System," by Trimble Navigation, Oct. 1992.

"Application & Technical Notes, —Real–Time Kinematic GPS Surveying Technical Overview," by Trimble Navigation.

"Surveying and Mapping Products —System Surveyor, Series 4000, GPS Survey System," by Trimble Navigation, 1992.

Ambiguity Resolution On–The–Fly—Comparison Of P Code And High Performance C/A Code Receiver Technologies, by Dr. Gerard Lachapelle, et al., pp. 1025–1032.

Aircraft Applications Of GPS–Based Attitude Determination, by Clark E. Cohen, et al., Stanford University, Dept. of Aeronautics and Astronautics.

Instantaneous Ambiguity Resolution, by Ron Hatch, Paper Presented Sep. 11, 1990 at Banff, Canada at KIS Symposium 1990.

A GPS Precision Approach And Landing System, by Dr. Alison K. Brown, Inst. of Navigation, GPS–92, Albuquerque, NM, Sep. 1992, pp. 373–381.

Kinematic GPS For Differential Positioning: Resolving Integer Ambiguities On The Fly, by Patrick Y. C. Hwang, Rockwell Intl. Corp., Cedar Rapids, Iowa, Jan. 1991.

The Application Of Navstar Differential GPS In The Civilian Community, by Jacques Beser, et al., GPS Papers Published in Navigation, vol. II, 1984, pp. 167–196.

The Use Of Pseudo Satellites For Improving GPS Performance, by Dale Klein, et al., GPS Papers Published in Navigation, vol. III, 1986, pp. 135–146.

RTCM SC–104 Recommended Pseudolite Signal Specification, by Thomas A. Stansell, Jr., GPS Papers Published in Navigation, vol. III, 1986, pp. 117–134.

SYSTEM AND METHOD FOR GENERATING PRECISE POSITION DETERMINATIONS

This is a continuation, of application Ser. No. 08/410,011 filed Mar. 22, 1995, now abandoned, which is a continuation, of application Ser. No. 08/036,319 filed Mar. 24, 1993, now abandoned.

FIELD OF THE INVENTION

The present invention relates generally to systems and methods for generating precise position determinations for any land, sea, air, or space vehicle. In particular, it pertains to aircraft landing systems and methods.

BACKGROUND OF THE INVENTION

There has traditionally been a need for systems and methods which allow a user to make extremely precise position determinations. In fact, a number of attempts have been made at developing these kinds of systems and methods. However, they all suffer from serious problems which render them unfeasible or inaccurate.

This is particularly true in the case of aircraft landing systems and methods. The current system, the Instrument Landing System (ILS), was developed decades ago and is very expensive to install and maintain.

A proposed alternative to ILS is the Microwave Landing System (MLS). It however is also expensive to install and maintain.

Other proposed alternatives are based on the Global Positioning System (GPS). GPS involves a constellation of 24 satellites placed in orbit about the earth by the United States Department of Defense. Each satellite continuously broadcasts a GPS signal. This GPS signal contains an L-band carrier component (L1) transmitted at a frequency of 1.575 GHz. The L1 carrier component is modulated by a coarse acquisition (C/A) pseudo random (PRN) code component and a data component.

The PRN code provides timing information for determining when the GPS signal was broadcast. The data component provides information such as the satellite's orbital position. The carrier component allows a receiver to easily acquire the GPS signal.

Position determination using Conventional GPS is well known in the art. In Conventional GPS, a receiver makes ranging measurements between an antenna coupled to the receiver and each of at least four GPS satellites in view. The receiver makes these measurements from the timing information and the satellite orbital position information obtained from the PRN code and data components of each GPS signal received. By receiving four different GPS signals, the receiver can make fairly accurate position determinations.

However, Conventional GPS only allows a user to determine his actual location to within tens of meters. In applications such as aircraft landings, position accuracies of one foot must be achieved. Therefore, conventional GPS is not suitable for these applications.

A more accurate version of GPS is Ordinary Differential GPS. Position determination using Ordinary Differential GPS is also well known in the art. It involves the same kind of ranging measurements as are made with Conventional GPS, except that a ground reference receiver at a precisely known location is utilized. Ideally, satellite ranging errors will affect the position determinations made by the user's receiver in the same way as they will the position determinations made by the nearby ground receiver. Since the location of the ground receiver is already known, the ground receiver can compare the position determination it has calculated with the actual known position. As a result, the ground receiver can accurately detect ranging errors.

From these errors, the ground receiver can compute suitable corrections which are transmitted by data link to the user's receiver. The user's receiver can then apply the corrections to its own ranging measurements so as to provide accurate real time position determinations.

Also, a pseudolite (i.e. ground based pseudo satellite) can be used to transmit these error corrections along with an unassigned PRN code. The unassigned PRN code enables the user's receiver to make a redundant fifth ranging measurement for even greater precision. And, in some cases, it enables the user's receiver to make a necessary fourth ranging measurement where one of the other GPS signals has been lost.

However, even with Ordinary Differential GPS, the position determinations are only accurate to within several meters. Since, as indicated earlier, aircraft landing systems must be accurate to within a foot, Ordinary Differential GPS by itself is not suitable for such an application.

An extremely accurate form of GPS is Carrier Phase Differential GPS. This form of GPS utilizes the 1.575 GHz carrier component of the GPS signal on which the PRN code and the data component are superimposed.

Carrier Phase Differential GPS involves generating position determinations based on the measured phase differences at two different antennas for the carrier component of a GPS signal. However, this technique initially requires determining how many integer wavelengths of the carrier component exist between the two antennas at a particular point in time. This is called integer ambiguity resolution.

A number of approaches currently exist for integer ambiguity resolution. However, all of them suffer from serious problems which render them unfit for precise position determinations in applications such as a aircraft landing.

One approach is Integer Searching using redundant measurements. This involves receiving more than the standard four GPS signals in order to sort out the correct combination of integer ambiguities. The different combinations of integer candidates are systematically checked against a cost function until an estimated correct set is found. However, for antenna separations of just a few meters, the checked combinations can number in the hundreds of millions. As a result, this approach has a propensity to arrive at wrong solutions. Furthermore, the configuration of the constellation of GPS satellites can only guarantee that four satellites will be in view at any given time. Therefore, any application requiring precise position determinations at any given time must not rely on redundant satellites for reliable resolution of the integer ambiguities.

Another approach is Narrow Correlator Spacing. This technique involves using the PRN code of the GPS signal to bound the integer ambiguities. However, a significant amount of the time it can yield position determination errors of as much as several meters. This does not provide the kind of consistency which is required in aircraft landing applications.

Still another approach is Dual Frequency Wide-Laning. This approach also utilizes a second GPS signal broadcast by each satellite. This second GPS signal has an L-band carrier component (L2) transmitted at a frequency of 1.227 GHz. The L2 carrier component and the L1 carrier component are differenced so as to form a signal having an effective wavelength that is much longer than either of the two carrier components. From this signal, it is relatively easy to resolve the integer ambiguities. However, the L2 component is not available for civilian use. Although the denial of the second carrier component can be countermeasured with cross correlation technology, the performance of this type of technology is unproven and very expensive to implement.

One successful approach to integer ambiguity resolution is motion-based and has been utilized in static surveying applications. This approach involves taking a number of phase measurements while the user's antenna and the reference antenna are stationary. These phase measurements are made over a period of about 15 minutes. The phase measurements made during the slowly changing geometry of the GPS satellites will reveal the integer ambiguities. But, in many situations in which precise position determinations are required, such as aircraft landing, it would be impractical to require the user's antenna to remain stationary for 15 minutes while the integer ambiguities are resolved.

Another motion-based approach has been used for aircraft attitude determination. It involves placing an antenna on the tail, on the fuselage, and on each wing tip. The antenna on the fuselage serves as the reference antenna. The integer ambiguities can be resolved in seconds by rotating the aircraft and taking several phase measurements. Taking the phase measurements during this rapid change in geometry with respect to the slowly changing GPS satellite geometry will reveal the integer ambiguities. However, since the reference antenna and the other antennas are fixed to the aircraft, this approach is limited to attitude determinations and is not suitable for precise position determinations for the aircraft itself.

OBJECTS OF THE INVENTION

It is an object of the invention to provide a complete GPS system and method for making precise position determinations to within centimeters of the exact location.

It is another object of the invention to provide a mobile GPS system used in conjunction with a reference GPS system for making precise position determinations to within centimeters of the exact location.

It is further an object of the invention to provide a reference GPS system used in conjunction with a mobile GPS system for making precise position determinations to within centimeters of the exact location.

It is another object of the invention to provide a mobile GPS position receiver capable of making GPS position determinations to within centimeters of the exact location.

It is another object of the invention to provide a mobile GPS receiver capable of precise GPS attitude determinations, coarse GPS position determinations to within meters for navigation, and precise GPS position determinations to within centimeters for landing.

It is further an object of the invention to provide a ground based GPS reference transceiver capable of supplying a mobile GPS position receiver with the information necessary for making precise GPS position determinations to within centimeters of the exact location.

SUMMARY OF THE INVENTION

The foregoing and other objects of the invention may generally be achieved by a GPS system and method which employs Carrier Phase Differential GPS. The system and method utilize a ground based reference GPS system and a mobile GPS system mounted on a moving vehicle.

The elements of the reference system are stationary. They include a GPS reference receiver, an initialization pseudolite, a data link pseudolite, and a reference antenna.

The data link pseudolite generates and broadcasts a data link signal in the form of a signal beam. This data link signal has at least a carrier component and data component.

The initialization pseudolite generates and broadcasts an initialization signal in the form of a low power signal bubble. The initialization signal has at least a carrier component.

The reference antenna receives GPS signals broadcast by GPS satellites and provides them to the reference receiver. The reference receiver makes phase measurements at periodic measurement epochs for the carrier components of the GPS signals and may do the same, depending on the configuration of the reference GPS system, for the carrier component of the initialization signal. Data representing these phase measurements is received by the data link pseudolite and broadcast to the mobile system via the data component of the data link signal.

The elements of the mobile system are mounted on the moving vehicle and are therefore mobile. The mobile system includes a GPS position receiver and two antennas.

The first antenna receives the same GPS signals as were received by the reference antenna. This is done both during and after an initialization period.

The second antenna receives the initialization and data link signals broadcast by the two pseudolites during the initialization period. After the initialization period is over, the second antenna only receives the data link pseudolite signal.

Each of the GPS signals received by the first antenna and the reference antenna has an integer ambiguity associated with these two antennas. The initialization period is used to resolve these integer ambiguities so that the mobile GPS position receiver can generate subsequent precise position determinations for the first antenna using Carrier Phase Differential GPS.

During the initialization period, the GPS position receiver receives from the first antenna the GPS signals and from the second antenna the initialization and data link signals. While the moving vehicle is within the signal bubble and receives the initialization signal, there is a large angular change in geometry between the moving vehicle and the initialization pseudolite as the vehicle moves through the signal bubble.

The mobile GPS position receiver makes and records phase measurements for the GPS signals and the initialization signal over this large angular change in geometry. These phase measurements are made at the same epochs as those made by the GPS reference receiver over this same change in geometry. Furthermore, the mobile GPS receiver receives via the data link signal the phase measurements made by the GPS reference receiver and records them. From the recorded phase measurements of both receivers, the GPS position receiver can accurately compute initialization values representing resolutions of the integer ambiguities of the GPS signals. Thus, the large angular change in geometry reveals the integer ambiguities.

Once these initialization values have been computed, the initialization period is over and the moving vehicle will have left the signal bubble. The mobile GPS receiver can then compute precise positions for the first antenna at each measurement epoch to within centimeters of the exact location. This is done using the computed initialization values, the phase measurements for the GPS signals made by the mobile position receiver, and the phase measurements made by the GPS reference receiver provided to the GPS position receiver via the data link signal.

BRIEF DESCRIPTION OF THE DRAWINGS

The foregoing and other objects of the invention will become more apparent on reading the following detailed description and upon reference to the drawings, in which.

DETAILED DESCRIPTION OF THE INVENTION

FIGS. 1–21 provide illustrations of the invention described herein. In these figures, like components are designated by like numerals.

DETAILED DESCRIPTION OF SYSTEM AND METHOD

Figure 1:
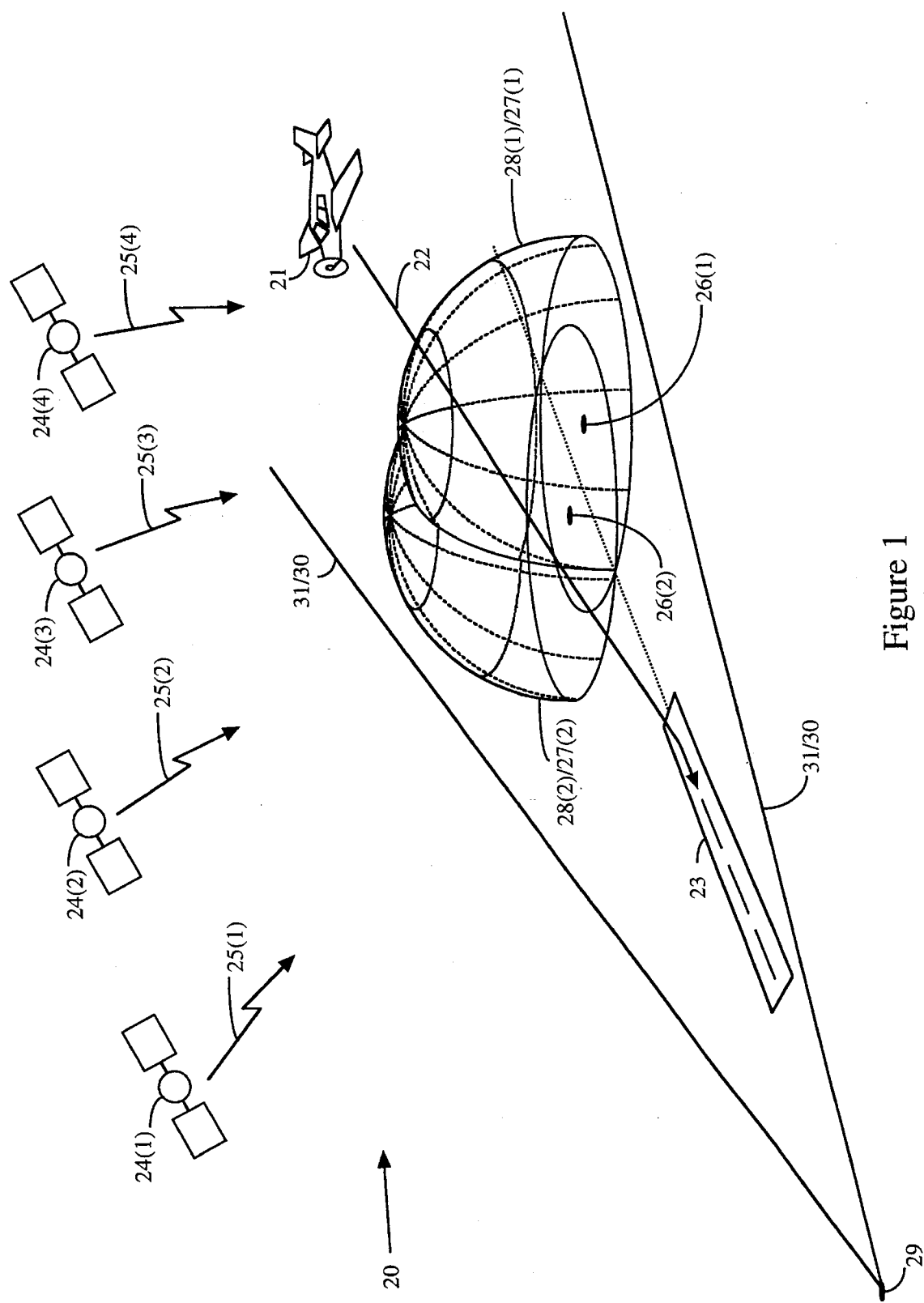
FIG. 1 shows a general view of a GPS system which employs two initialization pseudolites in accordance with the invention.

FIG. 1 shows a general view of a GPS system 20 for generating precise position determinations using Carrier Phase Differential GPS. An airplane 21 is on final approach trajectory 22 to runway 23. Four GPS satellites 24(1)–(4) at known orbital positions are in view and broadcast GPS signals 25(1)–(4). Initialization pseudolites 26(1)–(2) are located at known positions on each side of the horizontal component of flight trajectory 22 and respectively generate and broadcast initialization signals 27(1)–(2) in the form of a low power signal bubbles 28(1)–(2). A data and ranging link pseudolite 29 is located at a known position at the end of runway 22 and broadcasts a data link signal 30 in the form of a signal beam 31. As shown, Airplane 21 is initially outside of signal bubbles 28 but within signal beam 31.

Figure 2:
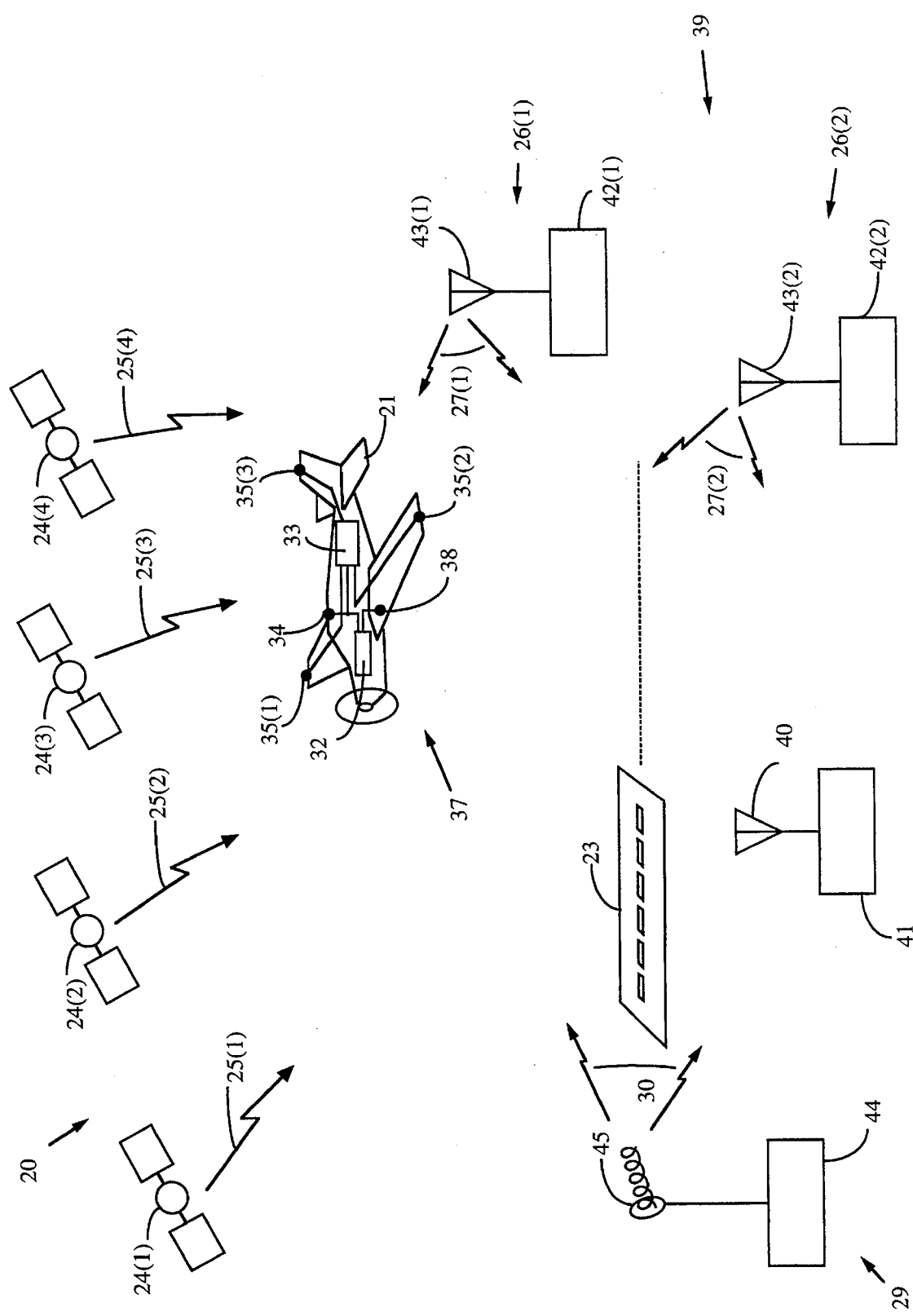
FIG. 2 shows a more detailed view of the GPS system shown in FIG. 1.

FIG. 2 shows GPS system 20 while airplane 21 is inside GPS signal bubbles 28(1)–(2). Mounted on airplane 21 is GPS mobile system 37 which includes GPS position receiver 32, GPS attitude receiver 33, GPS top side antenna 34, GPS attitude antennas 35(1)–(3), and GPS bottom side antenna 38. Each of the components 32–34, 35(1)–(3), and 38 of the GPS mobile system 37 is mobile. Furthermore, each of the antennas 34 and 35(1)–(3) receives GPS signals 25(1)–(4) and is coupled to position receiver 32. Antenna 38 receives pseudolite signals 27(1)–(2) and 30 and is also coupled to receiver 32.

Located near runway 23 is a ground based GPS reference system 39. It includes reference GPS antenna 40, stationary reference GPS receiver 41, and pseudolites 26(1)–(2) and 29. Reference antenna 40 receives GPS signals 25(1)–(4), initialization signals 27(1)–(2), and data link signal 30. Reference receiver 41 is coupled to reference antenna 40 for receiving these signals. Pseudolites 26(1)–(2) respectively comprise signal generators 42(1)–(2) and pseudolite transmit antennas 43(1)–(2). The signal generators 42(1)–(2) are respectively coupled to antennas 43(1)–(2) and respectively generate pseudolite signals 27(1)–(2) while antennas 43(1)–(2) respectively broadcast these signals. Pseudolite 29 comprises signal generator 44 and pseudolite transmit antenna 45. Signal generator 44 is coupled to antenna 45 and generates pseudolite signal 30 while antenna 45 broadcasts this signal. Reference antenna 40, reference receiver 41, and pseudolite antennas 43(1)–(2) and 45 are at precisely surveyed locations with respect to each other and runway 23.

The GPS signals 25(1)–(4) are L1 C/A code GPS signals. In other words, they contain an L1 carrier component, a C/A PRN code, and a data component. In the preferred embodiment, the initialization signals 27(1)–(2) and the data link signal 30 are L1 C/A GPS type signals in order to utilize existing GPS technology and methodology.

However, the signals 27(1)–(2) and 30 need not be limited to L1 C/A GPS signals. In fact, the pseudolite signal 30 need only provide a data link between the reference system 39 and the mobile receiver 32. Thus, it could simply comprise a carrier component (with a frequency in the L-band or otherwise) and a data component. Furthermore, the pseudolite signals 27(1)–(2) need only provide receiver 32 with a carrier signal. Thus, they could simply comprise a carrier signal (with a frequency in the L-band or otherwise).

The L1 carrier is a sinusoidal wave transmitted at a frequency of 1.575 GHz. In the preferred embodiment, the L1 carrier signal allows the position receiver 32 and the reference receiver 41 to easily acquire the GPS signals 25(1)–(4), 27(1)–(2), and 29. And, as is discussed later, it also allows the position receiver 32 to compute precise position determinations for airplane 21 using Carrier Phase Differential GPS.

The PRN code provides timing information enabling the position receiver 32 to make Conventional GPS and Ordinary Differential GPS position determinations. It comprises a series of variable width pulses broadcast at a frequency of 1.023 MHz. Each of the GPS satellites 24(1)–(4) and the pseudolites 26(1)–(2) and 29 transmits its own unique PRN code. This enables position receiver 32 and reference receiver 41 to easily identify and separate the various GPS signals received by the two receivers.

The position receiver 32 and the reference receiver 41 generate internally the same PRN codes at substantially the same time as do GPS satellites 24(1)–(4) and pseudolites 26(1)–(2) and 29. The receivers 32 and 41 compare the PRN codes that they generate with the corresponding PRN codes received from the GPS satellites 24(1)–(4) and the pseudolites 26(1)–(2) and 29. The phase difference needed to match the received and generated PRN codes is then computed in terms of time.

The computed phase difference represents the time it takes for the PRN code of the broadcasting GPS satellite 24(1)–(4) or pseudolite 26(1)–(2) or 29 to travel to the antenna 34, 35(1)–(3), 38 or 40 which has received the PRN code. From the measured phase difference, the range to the broadcasting GPS satellite 24(1)–(4) or pseudolite 26(1)–(2) or 29 can be established. With ranging measurements to the four different GPS satellites 24(1)–(4), position determinations using Conventional GPS can be made by receiver 32 to within tens of meters. With additional ranging measurements to pseudolites 26(1)–(2) or 29, and with data furnished by receiver 41 and broadcast by pseudolites 26(1)–(2) or 29 in the respective data components of GPS signals 27(1)–(2) or 30, accurate position determinations can be made using Ordinary Differential GPS to within several meters.

The data component of each of the GPS signals 25(1)–(4) broadcast by the GPS satellites 24(1)–(4) respectively, when considered alone by the position receiver 32, only contains enough information for enabling the position receiver 32 to make Conventional GPS position determinations. However, when the position receiver 32 also considers the data component of GPS signals 27(1)–(2) or 30, it can make Ordinary Differential GPS and Carrier Phase Differential GPS position determinations.

The information in the data component of each GPS signal 25(1)–(4) includes the orbital position of the GPS satellite 24(1)–(4) which has broadcast it. This information is provided as a bit stream with a frequency of 50 bits per second. The information in the data component of the pseudolite GPS signals 27(1)–(2) or 30 can include (a) the position of pseudolites 26(1)–(2) and 29, (b) the position of antenna 40, (c) the position of reference receiver 41, (d) corrective information computed by reference receiver 41, (e) the raw carrier phase measurements and PRN code measurements made by reference receiver 41 for the GPS signals 25(1)–(4), 27(1)–(2), and 30, and (g) important runway and airport status information. All of this information is broadcast as a bit stream with a frequency of approximately 1000 bits per second.

As indicated earlier, FIG. 1 shows airplane 21 approaching runway 23 outside of the signal bubbles 28(1)–(2). While outside the signal bubbles 28(1)–(2), position receiver 32 makes position determinations using Ordinary Differential GPS from the information supplied by GPS signal 30. This is done to provide proper navigation during an initialization period. During the initialization period, position receiver 32 is initialized for Carrier Phase Differential GPS position determinations.

The initialization of position receiver 32 involves integer ambiguity resolution. Integer ambiguity resolution is the process of determining, at a particular point in time, the number of integer wavelengths of the carrier component of a GPS signal 25(1)–(4), 27(1)–(2), or 30 which lies between a given pair of antennas in the direction of the broadcasting GPS satellite 24(1)–(4) or pseudolite 26(1)–(2) or 29.

Figure 3:
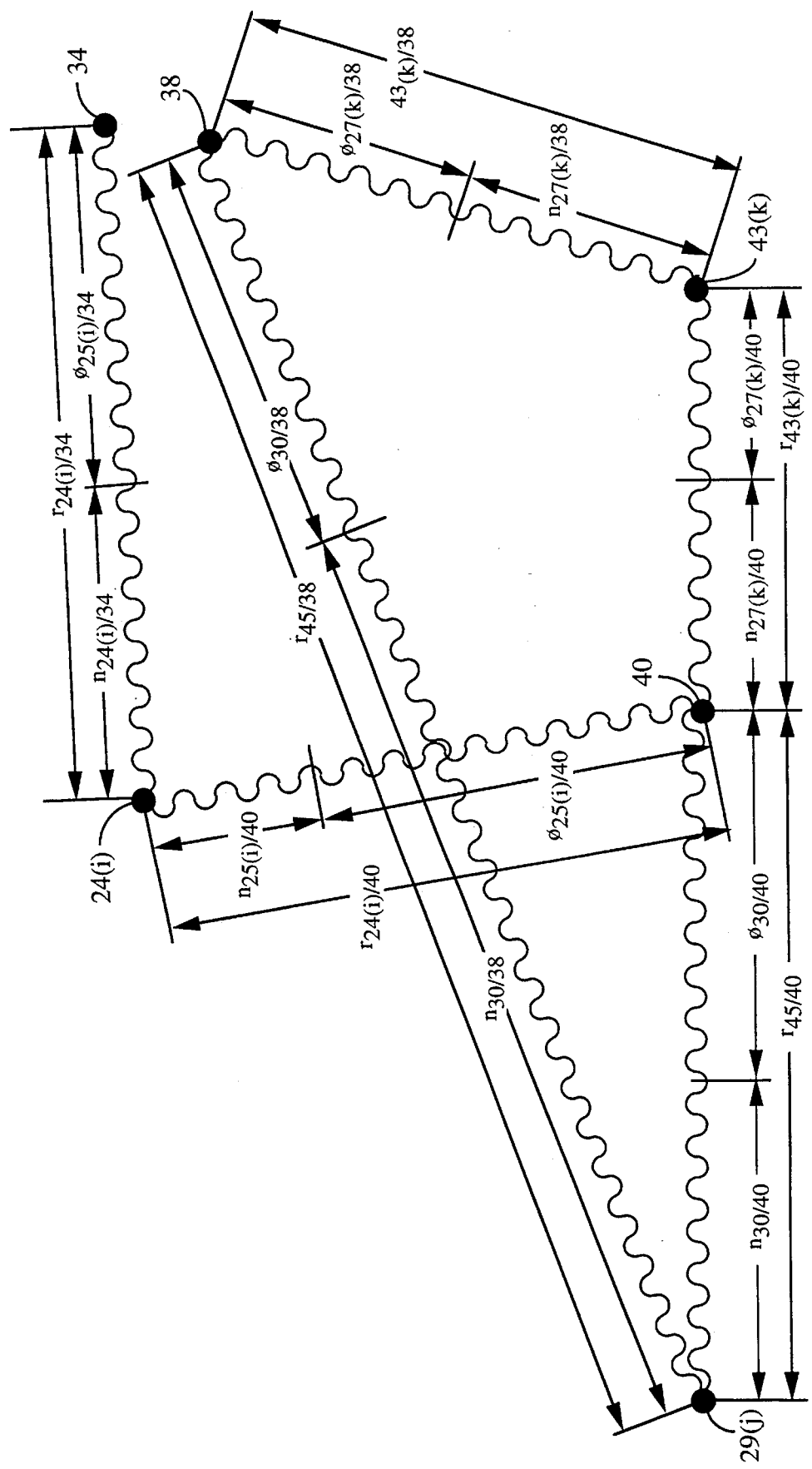
FIG. 3 provides an illustration of how integer ambiguities at an initial epoch arise which are then resolved during an initialization period required for generating precise position determinations.

FIG. 3 provides an illustration of how three integer ambiguities $n_{25(i)}$, $n_{30}$, and $n_{27(k)}$ arise at the first measurement epoch of the initialization period.

GPS satellite 24($i$) (i.e. the $i^{th}$ of the GPS satellites 24(1)–(4)) broadcasts with its transmit antenna a carrier component of GPS signal 25($i$) (i.e. the $i^{th}$ of the GPS signals 25(1)–(4)) in the direction of antennas 34 and 40. The integer ambiguity $n_{25(i)}$ of GPS signal 25($i$) is associated with top side antenna 34 and reference antenna 40.

Ranging link pseudolite 29 broadcasts with its pseudolite antenna 45 a carrier component of GPS signal 30 in the direction of antennas 34 and 40. The integer ambiguity $n_{30}$ of GPS signal 30 is associated with top side antenna 38 and reference antenna 40.

Initialization pseudolite 26($k$) (i.e. the $k^{th}$ of the initialization pseudolites 26(1)–(4)) broadcasts with its pseudolite antenna 43($k$) (i.e. the $k^{th}$ of pseudolite antennas 43(1)–(2)) a carrier component of GPS signal 27($k$) (i.e. the $k^{th}$ of the GPS signals 27) in the direction of antennas 38 and 40. The integer ambiguity $n_{27(k)}$ of GPS signal 27($k$) is associated with top side antenna 34 and reference antenna 40.

Both of the receivers 32 and 41 are configured to make phase measurements for the acquired GPS signals 25(1)–(4), 27(1)–(2), and 30. Each measurement includes both a fractional wavelength phase component $\Phi_{fr}$ and an integer wavelength phase change component $\Phi_{int}$. The integer wavelength change in phase $\Phi_{int}$ for each raw phase measurement is kept track of by receiver 32 as of the time the GPS signals 25(1)–(4), 27(1)–(2), and 30 was first acquired. In the preferred embodiment, the phase measurements are made by the receivers 32 and 41 at a rate in the range of 1–10 Hz. Each cycle is a measurement epoch. This rate is selected so that the phase measurements of reference receiver 41 can be sampled and telemetered up to receiver 32 (via the pseudolite GPS signals 27(1)–(2) or 30) for synchronization with the sampled raw phase measurements of receiver 32.

As mentioned previously, antennas 34 and 38 are coupled to position receiver 32 and antenna 41 is coupled to reference receiver 41. Both position receiver 32 and reference receiver 41 generate internally their own carrier component for phase comparisons with the received carrier component of GPS signals 25(1)–(4), 27(1)–(2), and 30. These carrier components are not generated at exactly the same time because at each measurement epoch the receiver 32 has clock synchronization error $\Delta T_{32}$, the reference receiver 41 has clock synchronization error $\Delta T_{41}$, the signal generator of GPS satellite 24(i) has a clock synchronization error $\Delta T_{24(i)}$, the signal generator 44 of the ranging link pseudolite 29 has synchronization error $\Delta T_{44}$, and the signal generator 42(k) (i.e. the $k^{th}$ of the signal generators 42(1)–(2)) of initialization pseudolite 27(k) has synchronization error $\Delta T_{42(k)}$.

As shown in FIG. 3, the unknown range $r_{24(i)/34}$ between the transmit antenna of GPS satellite 24(i) and antenna 34, at the initial epoch of the initialization, includes the phase component $\Phi_{25(i)/34}$ measured by receiver 32 and the unknown integer component $n_{25(i)/34}$ of GPS signal 25(i). The unknown range $r_{45/38}$ between the pseudolite antenna 45 and the antenna 38, at the initial epoch of the initialization, includes the phase component $\Phi_{30/38}$ measured by receiver 32 and the unknown integer component $n_{30/38}$ of GPS signal 30. And, the unknown range $r_{43(k)/38}$ between a pseudolite antenna 43(k) and the antenna 38, at the initial epoch of the initialization, includes the phase component $\Phi_{27(k)/38}$ measured by receiver 32 and the unknown integer component $n_{27(k)/38}$ for GPS signal 27(k).

The unknown range $r_{24(i)/40}$ at the initial epoch between the transmit antenna of GPS satellite 24(i) and antenna 40 includes the phase component $\Phi_{25(i)/40}$ measured by receiver 41 and the unknown integer component $n_{25(i)/40}$ of GPS signal 25(i). The known range $r_{45/40}$ at the initial epoch between the pseudolite antenna 45 and antenna 40 includes the phase component $\Phi_{30/40}$ measured by receiver 41 and the unknown integer component $n_{30/40}$ of GPS signal 30. The known range $r_{43(k)/40}$ at the initial epoch between a pseudolite antenna 43(k) and antenna 40 includes the phase component $\Phi_{27(k)/40}$ measured by receiver 41 and the unknown integer component $n_{27(k)/40}$ of GPS signal 27(k). The phase measurements $\Phi_{25(i)/40}$, $\Phi_{30/40}$, and $\Phi_{27(k)/40}$ are uplinked to receiver 32.

The unknown integer components $n_{25(i)/34}$, $n_{30/38}$, $n_{27(k)/38}$, $n_{25(i)/40}$, $n_{30/40}$, and $n_{27(k)/40}$ which are assigned at the initial epoch remain constant throughout the initialization process and the subsequent Carrier Phase Differential GPS position determinations. This fact is illustrated in FIG. 4.

Figure 4:
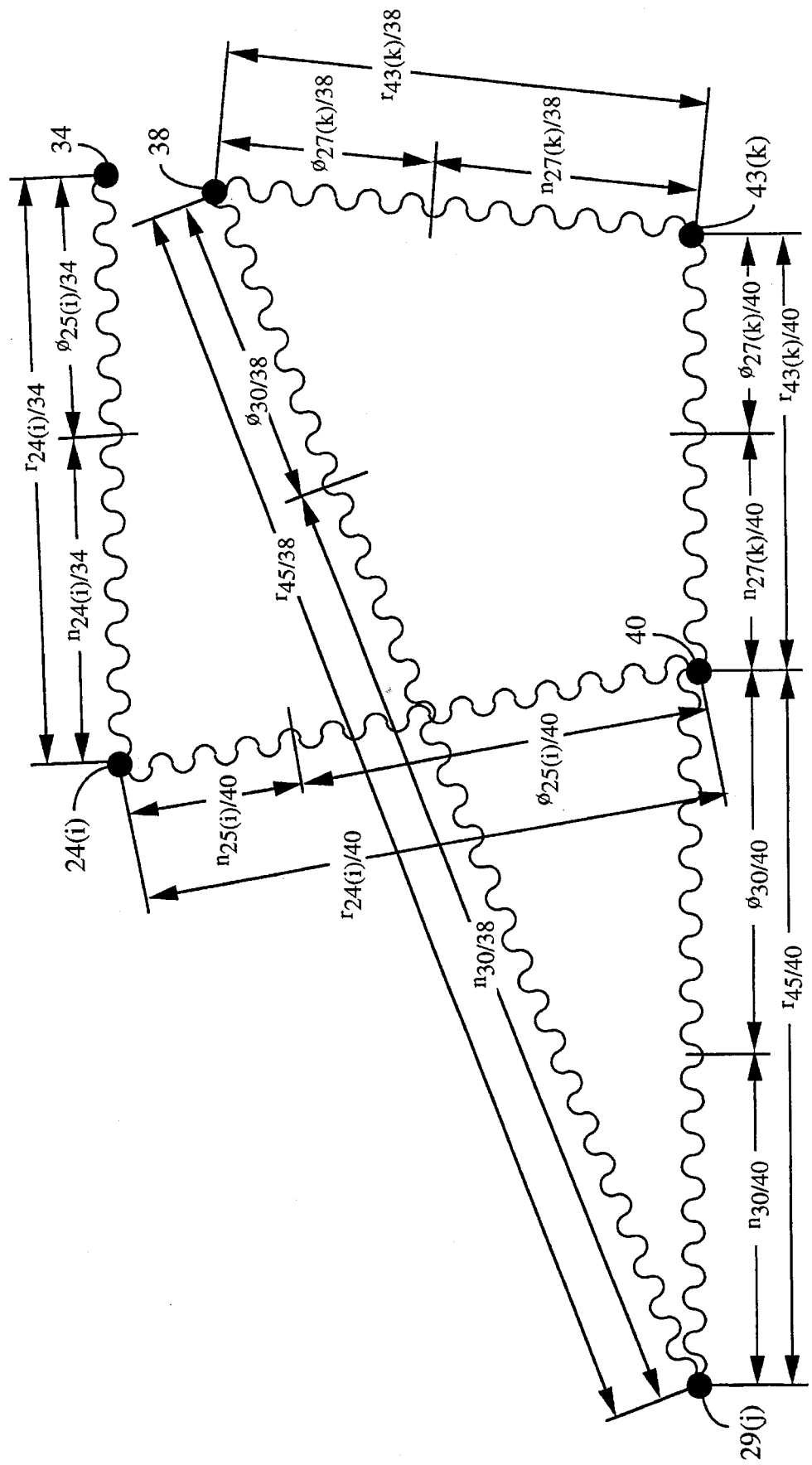
FIG. 4 provides an illustration of the integer ambiguities at an epoch after the initial epoch.

FIG. 4 shows an epoch after the initial epoch. This second epoch could be during or after the initialization period. Each of the measurements $\Phi_{25(i)/34}$, $\Phi_{25(i)/40}$, $\Phi_{30/38}$, $\Phi_{30/40}$, $\Phi_{27(k)/38}$, and $\Phi_{27(k)/40}$ will have changed since the initial epoch. This is due to the fact that the fractional component $\Phi_{fr}$ and integer wavelength change component $\Phi_{int}$ which make up the identified phase measurements have changed since the initial epoch. However, the assigned integer components $n_{25(i)/34}$, $n_{30/38}$, $n_{27(k)/38}$, $n_{25(i)/40}$, $n_{30/40}$, and $n_{27(k)/40}$ have not changed.

The relationship between $\Phi_{25(i)/34}$ and $n_{25(i)/34}$ and the relationship between $\Phi_{25(i)/40}$ and $n_{25(i)/40}$ are provided as follows in Equations (1), and (2) respectively:

$$\Phi_{25(i)/34}=r_{25(i)/34}-n_{25(i)/34}+\Delta T_{32}-\Delta T_{24(i)} \quad (1)$$

$$\Phi_{25(i)/40}=r_{24(i)/40}-n_{25(i)/40}+\Delta T_{41}-\Delta T_{24(i)} \quad (2)$$

Equations (1) and (2) can be differenced so as to form the single difference phase relationship provided as follows in Equation (3):

$$\Phi_{25(i)}=\Phi_{25(i)/34}-\Phi_{25(i)/40}=r_{24(i)/34}-r_{24(i)/40}-n_{25(i)}+\Delta T_{32}-\Delta T_{41} \quad (3)$$

where $n_{25(i)}$ is the integer ambiguity between antennas 34 and 40 at the initial epoch for the carrier component of the GPS signal 25(i) broadcast by GPS satellite 24(i).

The relationship between $\Phi_{30/38}$ and $n_{30/38}$ and the relationship between $\Phi_{30/40}$ and $n_{30/40}$ are provided as follows in Equations (4), and (5) respectively:

$$\Phi_{30/38}=r_{45/38}-n_{30/38}+\Delta T_{32}-\Delta T_{44} \quad (4)$$

$$\Phi_{30/40}=r_{45/40}-n_{30/40}+\Delta T_{41}-\Delta T_{44} \quad (5)$$

Equations (4) and (5) can be differenced so as to form the single difference phase relationship provided as follows in Equation (6):

$$\Phi_{30}=\Phi_{30/38}-\Phi_{30/40}=r_{45/38}-r_{45/40}-n_{30}+\Delta T_{32}-\Delta T_{41} \quad (6)$$

where $n_{30}$ is the integer ambiguity between antennas 38 and 40 at the initial epoch for the carrier component of the GPS signal 30 broadcast by pseudolite antenna 45 of ranging link pseudolite 29.

The relationship between $\Phi_{27(k)/38}$ and $n_{27(k)/38}$ and the relationship between $\Phi_{27(k)/40}$ and $n_{27(k)/40}$ are provided as follows in Equations (7), and (8) respectively:

$$\Phi_{27(k)/38}=r_{43(k)/38}-n_{27(k)/38}+\Delta T_{32}-\Delta T_{42(k)} \quad (7)$$

$$\Phi_{27(k)/40}=r_{43(k)/40}-n_{27(k)/40}+\Delta T_{41}-\Delta T_{42(k)} \quad (8)$$

Equations (7) and (8) can be differenced so as to form the single difference phase relationship provided as follows in Equation (9):

$$\Phi_{27(k)}=\Phi_{27(k)/38}-\Phi_{27(k)/40}=r_{43(k)/38}-r_{43(k)/40}-n_{27(k)}+\Delta T_{32}-\Delta T_{41} \quad (9)$$

where $n_{27(k)}$ is the integer ambiguity between antennas 38 and 40 at the initial epoch for the carrier component of the GPS signal 27(k) broadcast by pseudolite antenna 43(k) of initialization pseudolite 26(k).

Figure 5:
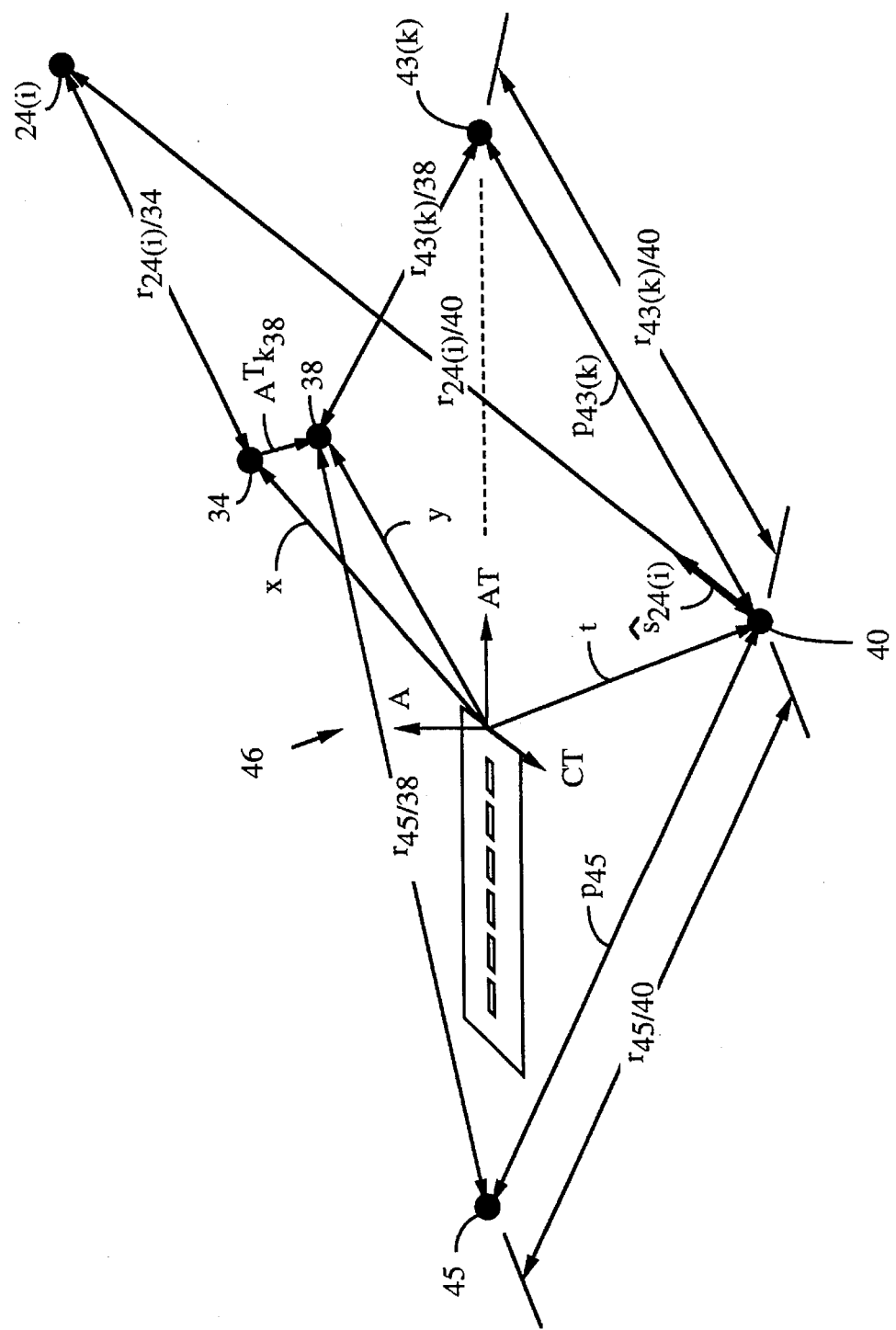
FIG. 5 shows the vector relationships associated with the integer ambiguities shown in FIGS. 3 and 4.

In order to make proper position determinations for airplane 21 relative to the beginning of runway 23, Equations (3), (6), and (9) must be manipulated so as to include the vector relationships t, x, y, $\hat{s}_{24(i)}$, $p_{43(k)}$, $p_{45}$, and $A^T k_{38}$ associated with the ranges $r_{24(i)/34}$, $r_{24(i)/40}$, $r_{45/38}$, $r_{45/40}$, $r_{43(k)/38}$, and $r_{43(k)/40}$. These relationships are shown in FIG. 5 and are established with respect to the runway coordinate system 46 associated with the threshold of runway 23. Coordinate system 46 is defined by the along track AT, cross track CT, and altitude A coordinates.

The position of reference antenna 40 with respect to the runway 23 threshold is known and represented by the vector t which is provided as follows in Equation (12):

$$t = \begin{bmatrix} t_{AT} \\ t_{CT} \\ t_A \end{bmatrix} \quad (12)$$

where $t_{AT}$, $t_{CT}$, and $t_A$ are respectively the along track distance between antenna 40 and the runway 23 threshold.

The position of top side antenna 34 with respect to the runway 23 threshold is unknown and represented by the vector x [3×1] provided as follows in Equation (13):

$$x = \begin{bmatrix} x_{AT} \\ x_{CT} \\ x_A \end{bmatrix} \quad (13)$$

where $x_{AT}$, $x_{CT}$, and $x_A$ are respectively the along track, cross track, and altitude distances between antenna 34 and the runway 23 threshold.

The position of bottom side antenna 38 with respect to the runway 23 threshold is unknown and represented by the vector y [3×1] provided as follows in Equation (14):

$$y = \begin{bmatrix} y_{AT} \\ y_{CT} \\ y_A \end{bmatrix} \quad (14)$$

where $y_{AT}$, $y_{CT}$, and $y_A$ are respectively the along track, cross track, and altitude distances between antenna 38 and the runway 23 threshold.

The known direction to GPS satellite 24(i) relative to antenna 40 is represented by the unit direction vector $\hat{s}_{24(i)}$ [3×1] provided as follows in Equation (15):

$$\hat{s}_{24(i)} = \begin{bmatrix} \hat{s}_{24(i)/AT} \\ \hat{s}_{24(i)/CT} \\ \hat{s}_{24(i)/A} \end{bmatrix} \quad (15)$$

where $s_{24(i)/AT}$, $s_{24(i)/CT}$, $s_{24(i)/A}$ are respectively the unit along track, cross track, and altitude distances to GPS satellite 24(i). This vector is computed by receiver 32 for a GPS satellite 24(i) from the satellite position information contained in the data component of its associated GPS signal 25(i) and from the known position of antenna 40 in the coordinate system used to determine the positions of the GPS satellite 24(i).

The known position of pseudolite antenna 45 of ranging link pseudolite 45 relative to reference antenna 40 is represented by the position vector $p_{45}$ [3×1] provided as follows in Equation (16):

$$p_{45} = \begin{bmatrix} p_{45/AT} \\ p_{45/CT} \\ p_{45/A} \end{bmatrix} \quad (16)$$

where $p_{45/AT}$, $p_{45/CT}$, and $p_{45/A}$ are respectively the along track, cross track, and altitude distances between antenna 40 and pseudolite antenna 45.

The known position of pseudolite antenna 43(k) of the initialization pseudolite 26(k) relative to reference antenna 40 is represented by the position vector $p_{43(k)}$ [3×1] provided as follows in Equation (17):

$$p_{43(k)} = \begin{bmatrix} p_{43(k)/AT} \\ p_{43(k)/CT} \\ p_{43(k)/A} \end{bmatrix} \quad (17)$$

where $p_{43(k)/AT}$, $p_{43(k)/CT}$, and $p_{43(k)/A}$ are respectively the along track, cross track, and altitude distances between antenna 40 and pseudolite antenna 43(k).

The vector $A^T k_{38}$ [3×1] is the lever arm correction vector needed for determining the unknown position vector x. It is the dot product of the transposed attitude matrix A [3×3] and the known position vector $k_{38}$ [3×1] for the bottom side antenna 38.

Figure 6:
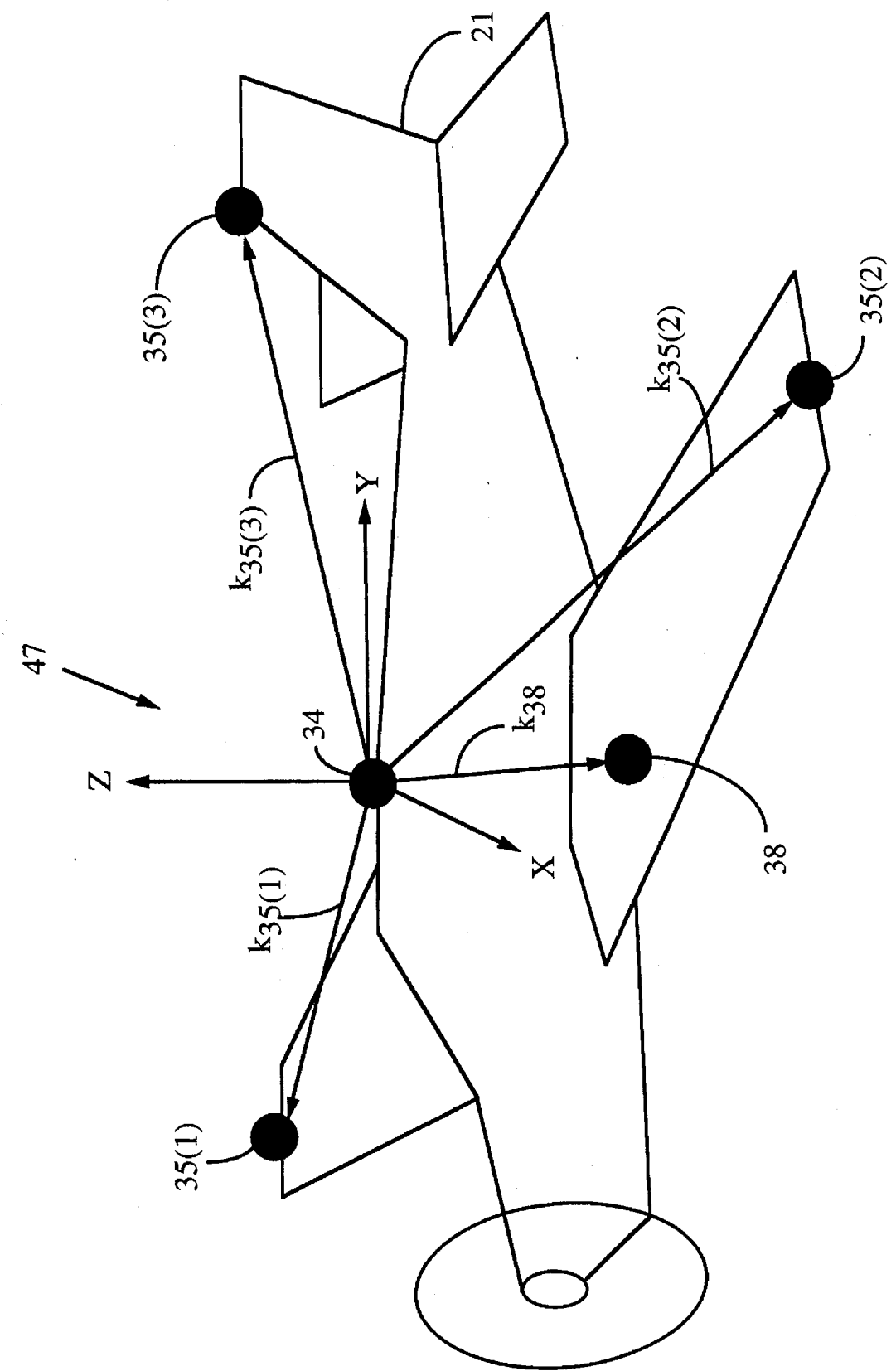
FIG. 6 shows the vectors representing the surveyed positions of antennas which are mounted on an airplane with respect to the body coordinate system of the airplane.

The known position of bottom side antenna 38 relative to top side antenna 34 is precisely surveyed with respect to the body coordinate system 47 defined by the coordinates X, Y, and Z and shown in FIG. 6. This position is represented by vector $k_{38}$ which is provided as follows in Equation (18):

$$k_{38} = \begin{bmatrix} k_{38/X} \\ k_{38/Y} \\ k_{38/Z} \end{bmatrix} \quad (18)$$

where $k_{38/X}$, $k_{38/Y}$ and $k_{38/Z}$ are respectively the distances between antennas 34 and 38 in the X, Y, and Z directions.

Figure 7:
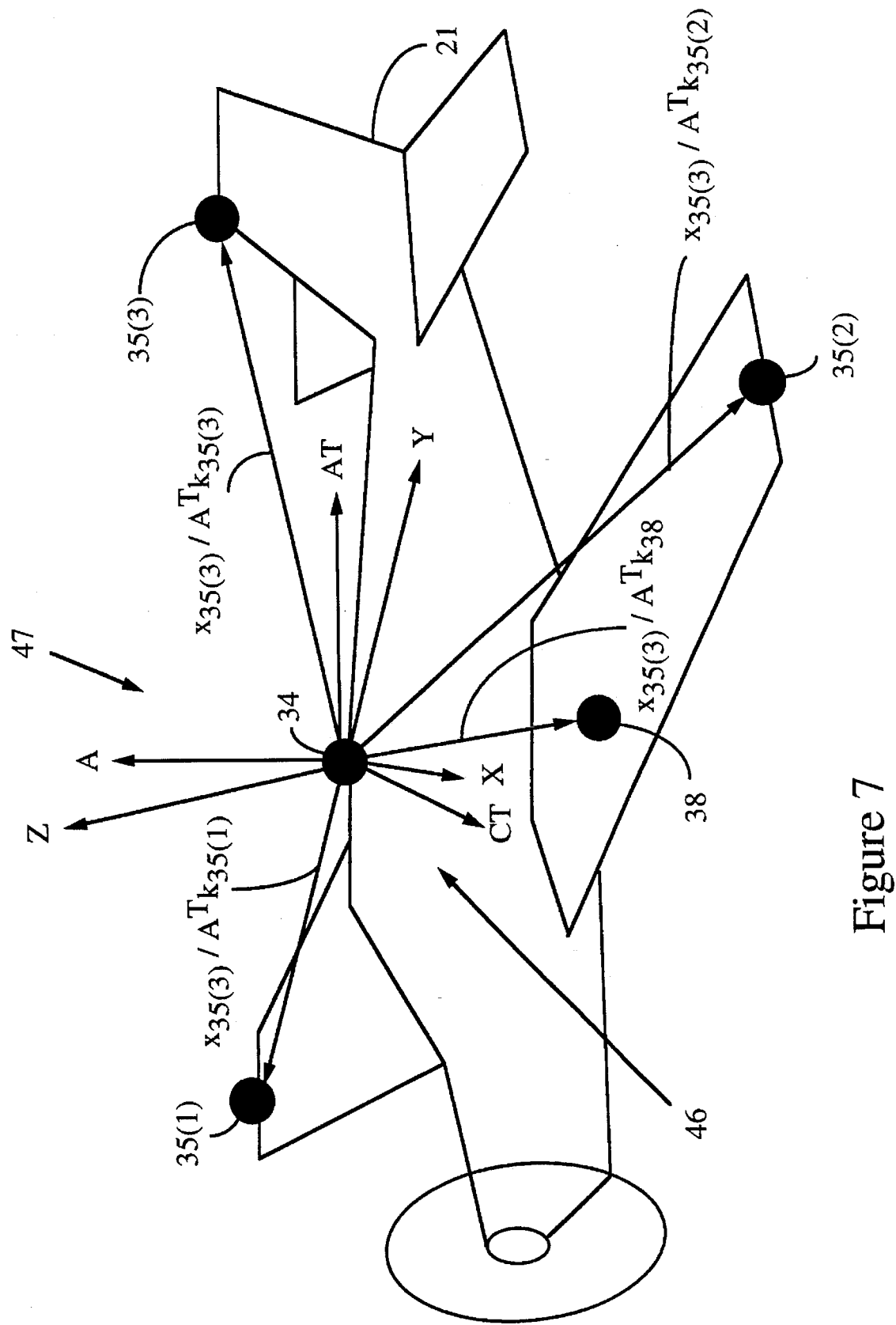
FIG. 7 shows the rotation of the body coordinate system of the airplane with respect to the runway coordinate system.

The attitude matrix A is known and can be determined from attitude solutions generated by attitude GPS receiver 33. As shown in FIG. 7, the matrix is established from the rotation of the body coordinate system 47 of airplane 21 with respect to the runway coordinate system 46. This matrix is provided as follows in Equation (19):

$$A^T = \begin{bmatrix} A_{X/AT} & A_{Y/AT} & A_{Z/AT} \\ A_{X/CT} & A_{Y/CT} & A_{Z/CT} \\ A_{X/A} & A_{Y/A} & A_{Z/A} \end{bmatrix} \quad (19)$$

where each element of the matrix represents the rotation of a coordinate of the body coordinate system 47 with respect to a coordinate of the runway coordinate system 46. As a result, the vector $A^T k_{38}$ represents the position of antenna relative to antenna 34 in the runway coordinate system 46.

From the preceding vector relationships, the following mathematical relationships in Equations (20)–(25) may be established:

$$r_{24(i)/34} - r_{24(i)/40} = \hat{s}_{24(i)}^T(x-t) \quad (20)$$

$$r_{45/38} = |x - t + A^T k_{38} - p_{45}| \quad (21)$$

$$r_{45/40} = |p_{45}| \quad (22)$$

$$r_{43(k)/38} = |x - t + A^T k_{38} - p_{43(k)}| \quad (23)$$

$$r_{43(k)/40} = |p_{43(k)}| \quad (24)$$

$$y = x + A^T k_{38} \quad (25)$$

Equation (20) can be combined with Equation (3) to establish the single difference phase relationship provided in Equation (26):

$$\Phi_{25(i)} = \hat{s}_{24(i)}^T(x-t) - n_{25(i)} + \Delta T_{32} - \Delta T_{41} \quad (26)$$

Equations (21) and (22) can be combined with Equation (6) to establish the single difference phase relationship provided in Equation (27):

$$\Phi_{30} = |x - t + A^T k_{38} - p_{45}| - |p_{45}| - n_{30} + \Delta T_{32} - \Delta T_{41} \quad (27)$$

Equations (23) and (24) can be combined with Equation (9) to establish the single difference phase relationship provided in Equation (28):

$$\Phi_{27(k)} = |x - t + A^T k_{38} - p_{43(k)}| - |p_{43(k)}| - n_{27(k)} + \Delta T_{32} - \Delta T_{41} \quad (28)$$

In order to cancel out the clock synchronization errors $\Delta T_{32}$ and $\Delta T_{41}$, Equations (26) and (27) can each be differenced with one of the two equations derived from Equation (28) which is associated with one of the two pseudolites 27(1)–(2). Furthermore, the two equations associated with the pseudolites 27(1)–(2) can be differenced with each other. Thus, where the equation associated with pseudolite 27(1) is used as the base differencing equation, the following double difference phase relationships are established in Equations (29), (30), and (31):

$$\Phi_{25(i)/27(1)} = \hat{s}_{24(i)}^T(x-t) - |x - t + A^T k_{38} - p_{43(1)}| + |p_{43(1)}| - N_{25(i)/27(1)} \quad (29)$$

$$\Phi_{30/27(1)} = |x - t + A^T k_{38} - p_{45}| - |x - t + A^T k_{38} - p_{43(1)}| - |p_{45}| + |p_{43(1)}| - N_{30/27(1)} \quad (30)$$

$$\Phi_{27(2)/27(1)} = |x - t + A^T k_{38} - p_{43(2)}| - |x - t + A^T k_{38} - p_{43(1)}| - |p_{43(2)}| + |p_{43(1)}| - N_{27(2)/27(1)} \quad (31)$$

where $N_{25(i)/27(1)}$, $N_{30/27(1)}$, and $N_{27(2)/27(1)}$ are unknown constants which respectively represent the difference between the integer ambiguities $n_{25(i)}$ and $n_{27(1)}$, the integer ambiguities $n_{30}$ and $n_{27(1)}$, and the integer ambiguities $n_{27(2)}$ and $n_{27(1)}$. Thus, the values $N_{25(i)/27(1)}$, $N_{27(2)/27(1)}$, and $N_{30/27(1)}$ are expressed as follows in Equations (32), (33), and (34):

$$N_{25(i)/27(1)} = n_{25(i)} - n_{27(2)} \quad (32)$$

$$N_{30/27(1)} = n_{30} - n_{27(1)} \quad (33)$$

$$N_{27(2)/27(1)} = n_{27(2)} - n_{27(1)} \quad (34)$$

Equations (29), (30), and (31) may then be linearized for each epoch to provide the following relationships in Equations (35), (36), and (37):

$$\delta\phi_{25(i)/27(1)} = \left( \tilde{s}_{24(i)}^T - \frac{(x_0 - t + A^T k_{38} - p_{43(1)})}{|x_0 - t + A^T k_{38} - p_{43(1)}|} \right) \delta x + \quad (35)$$

$$|p_{43(1)}| - N_{25(i)/27(1)} + \tilde{s}_{24(i)}^T t$$

$$\delta\phi_{30/27(1)} = \quad (36)$$

$$\left( \frac{(x_0 - t + A^T k_{38} - p_{45})}{|x_0 - t + A^T k_{38} - p_{45}|} - \frac{(x_0 - t + A^T k_{38} - p_{43(1)})}{|x_0 - t + A^T k_{38} - p_{43(1)}|} \right) \delta x$$

$$\delta\phi_{27(2)/27(1)} = \left( \frac{(x_0 - t + A^T k_{38} - p_{43(2)})}{|x_0 - t + A^T k_{38} - p_{43(2)}|} - \quad (37) \right.$$

$$\left. \frac{(x_0 - t + A^T k_{38} - p_{43(1)})}{|x_0 - t + A^T k_{38} - p_{43(1)}|} \right) \delta x - |p_{43(2)}| + |p_{43(1)}| - N_{27(2)/27(1)}$$

where (A) the guess for the estimate $x_0$ of the precise position vector x at each epoch is of the initialization period calculated by receiver 32 using Ordinary Differential GPS, and (B) $\delta x$ is the vector at each epoch which represents the unknown precise difference between the unknown precise vector x and the estimate $x_0$.

The relationship between the vectors x and $x_0$ and the vector $\delta x$ is represented as follows in Equation (38):

$$\delta x = x - x_0 \quad (38)$$

Furthermore, the vector $\delta x$ can be expressed as follows in Equation (39):

$$\delta x = \begin{bmatrix} \delta x_{AT} \\ \delta x_{CT} \\ \delta x_A \end{bmatrix} \quad (39)$$

where $\delta x_{AT}$, $\delta x_{CT}$, and $\delta x_A$ represent respectively at each epoch the unknown precise difference between the vectors x and $x_0$ in the along track, cross track, and altitude distances.

One method for computing the values $N_{25(i)/27(1)}$, $N_{30/27(1)}$, and $N_{27(2)/27(1)}$ only involves making carrier phase measurements $\Phi_{25(i)/34}$, $\Phi_{25(i)/40}$, $\Phi_{30/38}$, $\Phi_{30/40}$, $\Phi_{27(k)/38}$, and $\Phi_{27(k)/40}$ associated with the GPS signals 25(1)–(4), 27(1)–(2), and 30. As mentioned previously, at least four GPS satellites 24(1)–(4) are always guaranteed to be in view at any one time. Thus, the four GPS signals 25(1)–(4), barring any sudden maneuvers, will always be received by receivers 32 and 41. Furthermore, this method can be used with several configurations for the ground system 39.

Where the ground system 39 includes two initialization pseudolites 26(1)–(2), as shown in FIG. 1, receiver 32 will make phase measurements $\Phi_{25(i)/34}$ and $\Phi_{27(k)/38}$ and receiver 41 will make measurements $\Phi_{25(i)/40}$ and $\Phi_{27(k)/40}$ over a number of epochs while airplane 21 is inside the signal bubbles 28(1)–(2) and receives the initialization signals 27(1)–(2). During this initialization period, there is a large angular change in geometry between antennas 34 and 38 and the transmit antennas 43(1)–(2) as the antennas 34 and 38 move through the signal bubbles 28(1)–(2).

The phase measurements made by the receivers 32 and 41 during this large angular change in geometry are recorded by receiver 32. This is done in such a way that the equations generated from Equations (35) and (37) can be stacked in matrix form for simultaneously computing the unknown values $N_{25(i)/27(1)}$ and $N_{27(2)/27(1)}$ and the unknown vectors $\delta x$ at each epoch.

Figure 8:
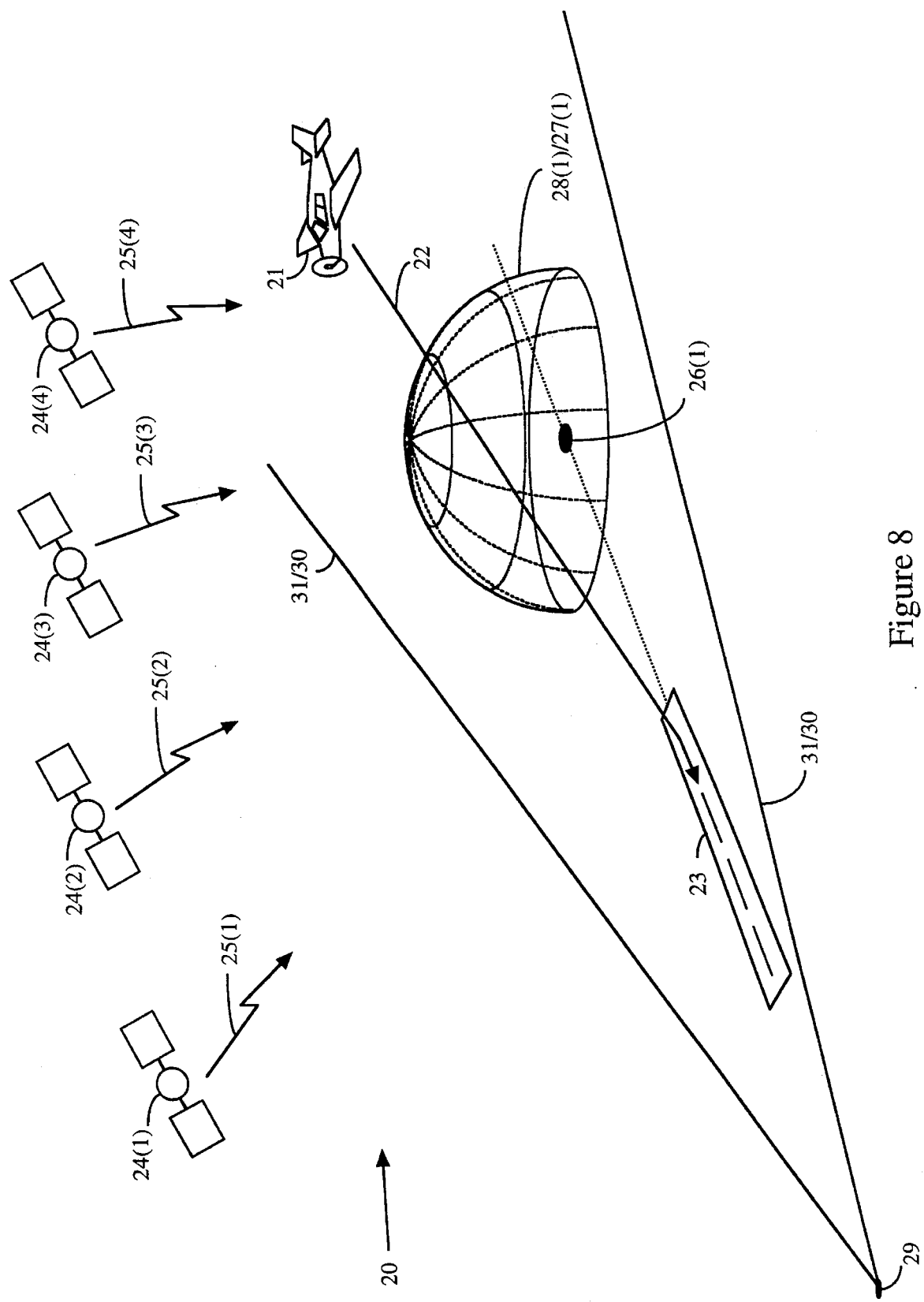
FIG. 8 shows a general view of a GPS system employing a single initialization pseudolite in accordance with the invention.

In the case where only one initialization pseudolite 26 is used, as shown in FIG. 8, receiver 32 will make the phase measurements $\Phi_{25(i)/34}$ and $\Phi_{27(1)/38}$ and receiver 41 will make the phase measurements $\Phi_{25(i)/40}$ and $\Phi_{27(1)/40}$ over a number of epochs while inside signal bubble 28(1). In this case, there is a large angular change in geometry between antennas 34 and 38 and the transmit antenna 43(1) as the antennas 34 and 38 move through the signal bubble 28(1).

As was the case in the dual initialization pseudolite configuration, the phase measurements made by the receivers 32 and 41 during the large angular change in geometry are recorded by receiver 32. Receiver records these measurements in such a way that equations generated from Equation (35) can be stacked in matrix form for simultaneously computing the unknown values $N_{25(i)/27(1)}$ and the unknown vectors $\delta x$ at each epoch.

For greater accuracy, receiver 32 is programmed to record the phase measurements $\Phi_{25(i)/34}$, $\Phi_{25(i)/40}$, $\Phi_{27(k)/38}$, and $\Phi_{27(k)/40}$ at more than the minimum number of epochs needed to compute the earlier described unknown values associated with each configuration. In either configuration, more than the required number of equations will be generated by receiver 32 from Equation (35) and, if applicable to the configuration used, Equation (37). All of these equations are stacked in matrix form for solving the unknowns associated with that configuration. Thus, the system and method will benefit because the set of unknowns will be over-determined.

Another way of adding accuracy to the computation of the unknowns associated with either configuration, is to utilize additional GPS satellites 24(i) when they are in view. Thus, carrier phase measurements $\Phi_{25(i)/34}$ and $\Phi_{25(i)/40}$ for the additional GPS signal 25(i) are also made by receiver 32 and receiver 41 respectively at a number of measurement epochs over the large change in geometry. These phase measurements are recorded by receiver 32. In either configuration, additional equations will be generated by receiver 32 from Equation (33) at each epoch for solving the unknowns associated with that configuration. Once again, the system and method benefits from the over-determined set of unknowns.

As a variation of the two configurations described earlier, pseudolite 30 may be used as a carrier ranging link as well as a data link. Thus, phase measurements $\Phi_{30/38}$ and $\Phi_{30/40}$ are made by receivers 32 and 41 respectively at a number of epochs over the large change in geometry. These phase measurements are also recorded by receiver 32. As a result, receiver 32 can generate from Equation (36) additional equations at each epoch for solving the earlier discussed unknowns associated with either configuration and the unknown value $N_{30/27(1)}$. These additional equations can serve as redundant equations to be stacked with all the other equations generated from Equation (35) and, if applicable, from Equation (37). Furthermore, if the lock on any of the GPS signals 25(i) is lost for some reason, the equations generated from Equation (36) can serve as substitutes for the equations which would have been generated from Equation (35).

Most importantly, the computation of the unknown vector $\delta x$ at each of the epochs employed in the initialization process and the computation of the unknown values $N_{25(i)/27(1)}$ and, if applicable, $N_{30/27(1)}$ or/and $N_{27(2)/27(1)}$, is repeated iteratively until they converge to within a desired level. Receiver 32 accomplishes this by taking from the previous iteration the computed vector $\delta x$ at each employed epoch and computing the vector x at each employed epoch from Equation (38). The computed vector x at each employed epoch is then substituted as the estimate $x_0$ into Equation (35) and, if applicable, into Equations (36) or/and (37). The unknown vector $\delta x$ at each employed epoch and the unknown values $N_{25(i)/27(1)}$ and, if applicable, $N_{30/27(1)}$ or/and $N_{27(2)/27(1)}$, are then computed again. As was stated earlier, this process is repeated by receiver 32 until the computed unknown values $N_{25(i)/27(1)}$ and, if applicable, $N_{30/27(1)}$ or/and $N_{27(2)/27(1)}$, converge to within a desired level.

Once the values $N_{25(i)/27(1)}$ and, if applicable, $N_{30/27(1)}$ or/and $N_{27(2)/27(1)}$, have been computed to within the desired accuracy level, receiver 32 can compute the integer ambiguities $n_{25(i)}$ and $n_{27(1)}$ and, if applicable, $n_{27(2)}$ or/and $n_{30}$. This is done with the relationships established in Equation (32) and, if applicable, Equation (33) or/and (34). Thus, the large change in angular geometry between the antennas 34 and 38 and the transmit antenna 43(1), and if applicable, 43(2), provided means for resolving the integer ambiguities $n_{25(i)}$ and $n_{27(1)}$ and, if applicable, $n_{30}$ and $n_{27(2)}$.

In this method, receiver 32 can make precise position determinations using Carrier Phase Differential GPS only after the values $N_{25(i)/27(1)}$, $n_{25(i)}$, and $n_{27(1)}$ and, if applicable, $N_{30/27(1)}$, $N_{27(2)/27(1)}$, $n_{30}$ and $n_{27(2)}$, have been computed. Thus, these are the initialization values generated by receiver 32 during the initialization process.

Another method for resolving the integer ambiguities involves making and recording phase velocity measurements at a number of epochs while airplane 21 is inside the signal bubble 28(1), and if applicable, signal bubble 28(2). This method also requires taking the phase measurements $\Phi_{25(i)/34}$, $\Phi_{27(1)/38}$, $\Phi_{25(i)/40}$ and $\Phi_{27(1)/40}$, and if applicable, $\Phi_{27(2)/38}$ and $\Phi_{27(2)/40}$, at the same epochs and recording them. Both receiver 32 and 41 make phase velocity measurements at the same rate in which they make the above identified phase measurements.

As in the earlier described method, the phase measurements and the phase velocity measurements are made over a number of epochs while airplane 21 is inside the signal bubble 28(1), and if applicable, signal bubble 28(2). Furthermore, as the antennas 34 and 38 move through the signal bubble 28(1) and, if applicable, 28(2), receiver 32 records the phase measurements made during the large angular change in geometry between antennas 34 and 38 and the transmit antenna 43(1), and if applicable, transmit antenna 43(2).

The phase velocity measurements are also made by receivers 32 and 41 at a number of epochs over the large change in geometry. The phase velocity measurements made by receiver 41 are uplinked to receiver 32 in the data components of any of the pseudolite GPS signals 27(1)–(2) and 30.

These phase velocity relationships are obtained by differentiating over time the Equations (9) and (26). These relationships are provided as follows in Equations (40) and (41):

$$\dot{\Phi}_{25(i)} = \dot{\Phi}_{25(i)/34} - \dot{\Phi}_{25(i)/40} = \dot{\hat{s}}_{24(i)} + \dot{x}\hat{s}_{24(i)} + \Delta\dot{T}_{32} - \Delta\dot{T}_{41} \quad (40)$$

$$\dot{\Phi}_{27(k)} = \dot{\Phi}_{27(k)/38} - \dot{\Phi}_{27(k)/40} = \dot{r}_{43(k)/38} + \Delta\dot{T}_{32} - \Delta\dot{T}_{41} \quad (41)$$

where (A) $\dot{\Phi}_{25(i)/34}$ and $\dot{\Phi}_{27(k)/38}$ are the phase velocities measured by receiver 32, (B) $\dot{\Phi}_{25(i)/40}$ and $\dot{\Phi}_{27(k)/40}$ are the phase velocities measured by receiver 41 and uplinked to receiver 32, (C) $\dot{\hat{s}}_{24(i)}$ is the rate of change of the unit direction vector $\hat{s}_{24(i)}$, (D) $\dot{x}$ is the rate of change of the precise position vector x, (E) $\dot{r}_{43(k)/38}$ is the rate of change in the range $r_{43(k)/38}$, and (F) $\Delta\dot{T}_{32}$ and $\Delta\dot{T}_{41}$, are the rate of changes in the clock synchronization errors $\Delta T_{32}$ and $\Delta T_{41}$ respectively.

Since $\dot{\hat{s}}_{24(i)}$ is small, it can generally be neglected in Equation (40). Furthermore, the phase velocity measurements $\dot{\Phi}_{25(i)/34}$ are made by receiver 32 at each epoch of the initialization process and the phase velocity measurements $\dot{\Phi}_{25(i)/40}$ are made by receiver 41 at these same epochs and uplinked to receiver 32. In response, receiver 32 generates equations at each employed epoch from Equation (38) and stacks them in matrix form so as to compute $\dot{x}$ and the relationship $\Delta\dot{T}_{32} - \Delta\dot{T}_{41}$ at each employed epoch.

Since the relationship $\Delta\dot{T}_{32} - \Delta\dot{T}_{41}$ can be computed at each employed epoch, the actual rate of change $\dot{r}_{43(k)/38}$ can be computed by receiver 32 at each of these epochs as well. This is done by substituting into Equation (41) the relationship $\Delta\dot{T}_{32} - \Delta\dot{T}_{41}$ along with the phase velocity measurements $\dot{\Phi}_{27(k)/38}$ made by receiver 32 at each employed epoch and the phase velocity measurements $\dot{\Phi}_{27(k)/40}$ made by receiver 41 at these same epochs and uplinked to receiver 32.

Furthermore, the actual rate of change $\dot{r}_{43(k)/38}$ can be expressed as follows in Equation (42):

$$\dot{r}_{43(k)/38} = \dot{r}_{0/43(k)/38} + \delta\dot{r} \quad (42)$$

where (A) $\dot{r}_{0/43(k)/38}$ is the guess at each employed epoch of the rate of change of $r_{43(k)/38}$, and (B) $\delta\dot{r}$ is the precise difference between the actual and the guessed rate of change of $r_{43(k)/38}$. The guessed rate of change at each employed epoch is computed by receiver 32 using the vector relationship associated with Equation (23), where the coarse position vector $x_0$ calculated from Ordinary Differential GPS is substituted in place of the vector x. The value $\delta\dot{r}$ at each employed epoch can be computed from the values $\dot{r}_{43(k)/38}$ and $\dot{r}_{0/43(k)/38}$ using Equation (40).

Equation (42) can also be linearized to provide the following relationship in Equation (43):

$$\delta\dot{r}_{43(k)/38} = \left( \frac{\vec{\dot{r}}_{0/43(k)/38} - \frac{\vec{r}_{0/43(k)/38}\vec{\dot{r}}_{0/43(k)/38}}{r_{0/43(k)/38}}}{r_{0/43(k)/38}} \right) \delta x \quad (43)$$

where (a) $\delta x$ is the unknown constant vector representing the difference between the actual trajectory vector x and the estimated trajectory vector $x_0$ over the entire initialization period, (B) $\vec{r}_{0/43(k)/38}$ is the guess at each employed epoch for the actual range vector $\vec{r}_{43(k)/38}$, and (C) $\vec{\dot{r}}_{0/43(k)/38}$ is the guess at each employed epoch for the actual rate of change in $\vec{\dot{r}}_{43(k)/38}$. The values for the guesses $\vec{r}_{0/43(k)/38}$ and $\vec{\dot{r}}_{0/43(k)/38}$ can be easily computed by receiver 32 using similar relationships to that established in Equation (23), where the coarse position vector $x_0$ calculated from Ordinary Differential GPS is substituted in place of the vector x.

The values $\delta\dot{r}$, $\dot{r}_{0/43(k)/38}$, $\vec{\dot{r}}_{0/43(k)/38}$, $\vec{r}_{0/43(k)/38}$ and $\vec{r}_{0/43(k)/38}$ are computed by receiver 32 at each of the epochs employed during the large angular change in geometry are stored by receiver 32. Thus, from these stored values receiver 32 can generate equations from Equation (43) which are stacked in matrix form for solving for the unknown vector $\delta x$.

The calculation for $\delta x$ is iteratively repeated until it converges to within a desired level. This is done by substituting the value of $\delta x$ obtained in the previous iteration into Equation (37) and computing the vector x. This calculated vector x is then used as $x_0$ for the next iteration. The vector $\delta x$ is then computed again from Equation (43) in the way just described and compared with the previously computed $\delta x$ to see if it converged to within the desired level.

Once $\delta x$ is computed, the integer ambiguities $n_{25(i)}$ and $n_{27(1)}$, and if applicable, $n_{27(2)}$, can be computed using Equation (26). This requires substituting into Equation (26) the phase measurements $\Phi_{25(i)/34}$, $\Phi_{27(1)/38}$, $\Phi_{25(i)/40}$ and $\Phi_{27(1)/40}$, and if applicable, $\Phi_{27(2)/38}$ and $\Phi_{27(2)/40}$, recorded by receiver 32. Thus, receiver 32 generates a set of equations from Equation (26) which are stacked in matrix form for solving for the integer ambiguities $n_{25(i)}$ and $n_{27(1)}$, and if applicable, $n_{27(2)}$. Thus, as in the previous method, the large change in angular geometry between the antennas 34 and 38 and the transmit antenna 43(1), and if applicable, 43(2), provides means for resolving the integer ambiguities $n_{25(i)}$ and $n_{27(1)}$ and, if applicable, $n_{30}$ and $n_{27(2)}$.

As with the previous method, receiver 32 can make precise position determinations using Carrier Phase Differential GPS only after the integer ambiguities $n_{25(i)}$ and $n_{27(1)}$ and, if applicable, $n_{30}$ or/and $n_{27(2)}$ have been computed. Thus, these are the initialization values generated by receiver 32 during the initialization process of this method.

The fact that the integer ambiguities $n_{25(i)}$ and $n_{27(1)}$ and, if applicable, $n_{30}$ or/and $n_{27(2)}$, are integer values serves as a built-in integrity checking device for both of the methods described. Thus, receiver 32 can check to see during the initialization process that these computed integer ambiguities converge to integer values.

Once the integer ambiguities $n_{25(i)}$ and $n_{27(1)}$ and, if applicable, $n_{30}$ and $n_{27(2)}$, have been computed, receiver 32 can compute at each epoch the precise position vector x. This is done by substituting the integer ambiguity $n_{25(i)}$ into Equation (26), and if applicable, the integer ambiguity $n_{30}$ into Equation (27). Since airplane 21 will have left the signal bubble 28(1), and if applicable, signal bubble 28(2), Equation (28) is no longer usable for computing the vector x.

Receiver 32 makes the phase measurements $\Phi_{25(i)/34}$ at each epoch and receives the phase measurements $\Phi_{25(i)/40}$ made by receiver 41. Thus, receiver 32 can stack at each epoch the equations generated from Equation (26) in matrix form for solving for the vector x and the total clock synchronization error $\Delta T_{32-\Delta T41}$.

Once the precise position vector x is computed, the position vector y for the bottom antenna 38 or any other part of the airplane 21 can easily be computed. The position vector y for bottom side antenna 38 can easily be computed from the relationship established in Equation (25). Additionally, it is particularly critical for the position of the landing gear of the airplane 21 to be known during a landing. Thus, using a similar equation to that of Equation (25), the precise position of the landing gear can also be computed if its location relative to top side antenna 34 in the runway coordinate system 46 is precisely surveyed beforehand.

Furthermore, where pseudolite 29 is used as a carrier ranging link, receiver 32 makes the phase measurement $\Phi_{30/38}$ and receives the phase measurement $\Phi_{30/40}$ made by receiver 41. Thus, receiver 32 can stack unto the equations generated from Equation (26) the equation generated from Equation (27) for solving for the vector x and the total clock synchronization error $\Delta T_{32}-\Delta T_{41}$. In this case, the ranging pseudolite 29 serves as an integrity check in that the system and method benefit from the over-determined set of unknowns.

Still another built-in integrity check is the use of Ordinary Differential GPS position determinations by receiver 32. The system and method do not require PRN code ranging except for generating the coarse initial guess for position vector $x_0$ at each epoch of the initialization period. Thus, the coarse position determinations made by receiver 32 can be used after the initialization period to monitor the Carrier Phase Differential GPS position determinations made by receiver 32.

In the single initialization pseudolite configuration of FIG. 8, airplane 21 moves through the signal bubble 28(1) in a simple linear trajectory 22 over the initialization pseudolite 26(1). As indicated previously, the system and method utilizes the large angular change in geometry between airplane 21 and the pseudolite antenna 43(1) of pseudolite 26 in order to resolve the integer ambiguities $n_{25(i)}$, $n_{30}$, and $n_{27(1)}$. Considered with respect to the slowly changing GPS satellite geometry, this large angular change in geometry will make the along track component $\delta x_{AT}$ and altitude component $\delta x_A$ of precise position change vector $\delta x$ clearly observable during this initialization period. Thus, the resolved integer ambiguities $n_{25(i)}$ and $n_{30}$ will provide subsequent position determinations where the along track component $x_{AT}$ and the altitude component $x_A$ of precise position vector x are accurate to within centimeters.

However, in most cases the initialization trajectory 22 will be in a line closely over the pseudolite 26(1) with little or no cross track (i.e. lateral) deviation. Under these circumstances, as is evident from the linearized Equations (35)-(37), the cross track component $\delta x_{CT}$ of precise position change vector $\delta x$ will be unobservable during initialization. Thus, the resolved integer ambiguities $n_{25(i)}$ and $n_{30}$ will result in subsequent position determinations where the cross track component $x_{CT}$ of precise position vector x will only be accurate to within meters. This accuracy is commensurate with the accuracy of the initial guess for the vector $x_0$ calculated by receiver 32 at each epoch of the initialization.

Figure 9:
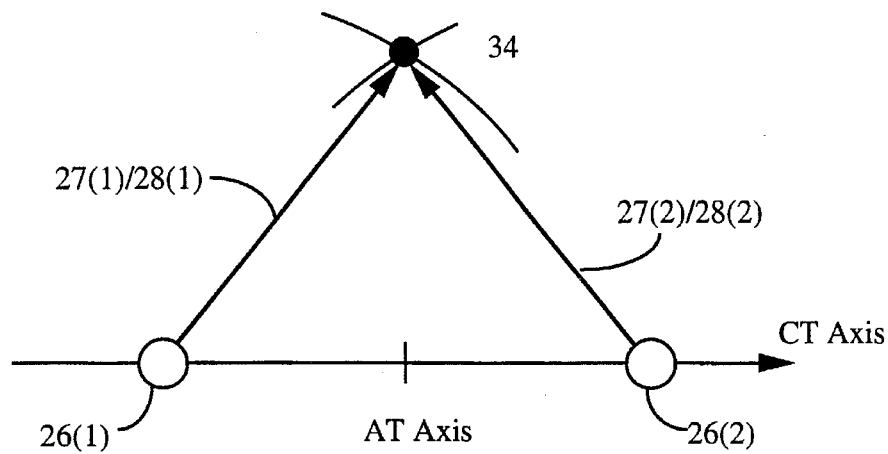
FIG. 9 illustrates elimination of cross track uncertainty by use of two initialization pseudolites.

One way in which the cross track error can be reduced to within centimeters is to employ the configuration of FIG. 1 which utilizes two initialization pseudolites 26(1)-(2). As shown in FIG. 9, the two initialization pseudolites 26(1)-(2) are placed on each side of the along track component of the flight trajectory 22. Because there are now two carrier ranging links 27(1)-(2) in the cross track plane, the cross track component $\delta x_{CT}$ of precise position change vector $\delta x$ will be clearly observable during initialization. As a result, the cross track uncertainty of the single pseudolite configuration is eliminated and the resolved integer ambiguities $n_{25(i)}$ and $n_{30}$ will then provide subsequent position determinations having a cross track component $x_{CT}$ accurate to within centimeters.

Figure 10:
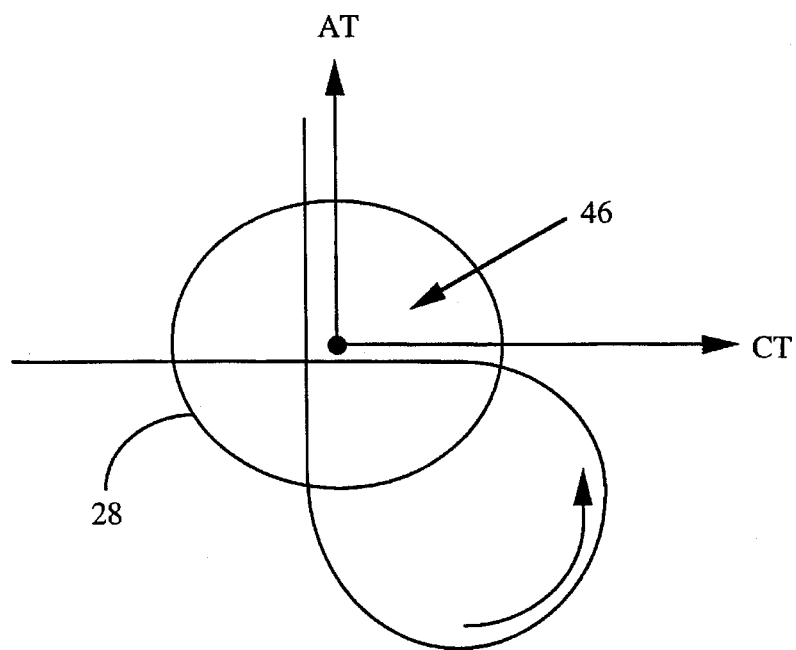
FIG. 10 illustrates elimination of cross track error by overflying a single initialization pseudolite twice.

Another way of reducing the cross track error to within centimeters is to overfly the single initialization pseudolite 26 twice. As shown in FIG. 10, the first overflight is made in the along track AT direction and the second in the cross track CT direction.

With the first overflight, a first set of integer ambiguities $n_{25(i)}$ and $n_{30}$ are resolved during a first initialization period. As was discussed for the single initialization pseudolite configuration, after initialization, position receiver 32 provides Carrier Phase Differential GPS position determinations with a cross track error of several meters.

During the second overflight, the coarse initial guess for position vector $x_0$ is calculated by position receiver 32 using Carrier Phase Differential GPS position determinations. Since the overflight is in the cross track direction (rather than in the along track direction), the cross track component $\delta x_{CT}$ and the altitude component $\delta x_{CT}$ of the precise position change vector $\delta x$ will be clearly observable. But, the along track component $\delta x_{AT}$ will not be observable during this second overflight. However, the along track component $x_{0/AT}$ of the initial guess for position vector $x_0$ calculated for the second overflight is already within centimeter level due to the earlier overflight. Therefore, the second set of integer ambiguities $n_{25(i)}$ and $n_{30}$ resolved during the second overflight will provide subsequent position determinations with the cross track component $x_{CT}$, the along track component $x_{AT}$, and the altitude component $x_A$ all accurate to within centimeters.

Another significant advantage to Carrier Phase Differential GPS position determinations is that the integer ambiguities $n_{25(i)}$ of an additional GPS signals $25(i)$ broadcast by GPS satellites $24(i)$ which were not in view during the initialization period can now be resolved easily once they do become in view after the initialization period. Receiver 32 accomplishes this by measuring $\Phi_{25(i)/34}$ and $\Phi_{25(i)/40}$ for the new GPS signals $25(i)$ at a particular epoch after the initialization period. At this epoch the precise position vector $x$ is already being determined by receiver 32 from the other GPS signals $25(1)$–$(4)$ and 30 which have had their respective integer ambiguities $n_{25(i)}$ and $n_{30}$ resolved during the initialization period. The calculated position vector $x$ and the phase measurements $\Phi_{25(i)/34}$ and $\Phi_{25(i)/40}$ are plugged into Equation (24) so as to solve for the new integer ambiguity $n_{25(i)}$. Then, a new equation is generated from Equation (24) at each epoch for use in solving for the position vector $x$. Thus, this technique results in a seamless integer hand-off so that a new initialization period is unnecessary.

The same approach can be utilized for GPS signal 30 where the integer ambiguity $n_{30}$ was not resolved during initialization. After initialization, the phase measurements $\Phi_{30/38}$ and $\Phi_{30/40}$ are made at a particular epoch. These values along with the calculated precise position vector $x$ calculated for that epoch by receiver 32 are substituted into the Equation (25) so as to solve for the integer ambiguity $n_{30}$. Thus, this again results in a seamless integer hand-off.

The attitude matrix A is generated by receiver 33 from the GPS signals $25(1)$–$(4)$ received by antennas $35(1)$–$(3)$ and 38. In doing so, receiver 33 utilizes Equation (1) associated with antenna 34 and a set of similarly derived phase relationships each associated with one of the antennas $35(1)$–$(3)$. For antenna $35(m)$ (i.e. the $m^{th}$ of the attitude antennas $35(1)$–$(3)$) this phase relationship is provided in Equation (43):

$$\Phi_{25(i)/35(m)} = r_{24(i)/35(m)} - n_{25(i)/35(m)} + \Delta T_{33} \Delta T_{24(i)} \quad (43)$$

where (A) $r_{24(i)/35(m)}$ represents the unknown range from GPS satellite $24(i)$ to antenna $35(m)$, (B) $\Phi_{25(i)/35(m)}$ represents the phase component of the unknown range $r_{24(i)/35(m)}$ measured by receiver 32 for the GPS signal $25(i)$ received at antenna $35(m)$, and (C) $n_{25(i)/35(m)}$ represents the integer component of the unknown range $r_{24(i)/35(m)}$ associated with GPS signal $25(i)$ received at antenna $35(m)$.

Receiver 33 measures $\Phi_{25(i)/34}$ and $\Phi_{25(i)/35(m)}$ in the same way as was discussed earlier for receivers 32 and 41. These measurements are made at the same rate as is used by receivers 32 and 41 so that the attitude solutions generated by receiver 33 are synchronized with the position determinations of receiver 32.

Differencing Equations (1) and (43) provides the single difference phase relationship given as follows in Equation (44):

$$\Phi_{25(i)/34/35(m)} = \Phi_{25(i)/34} - \Phi_{25(i)/35(m)} = \Delta r_{24(i)/34/35(m)} - n_{25(i)/34/35(m)} \quad (44)$$

where (A) $n_{25(i)/34/35(m)}$ represents the unknown integer ambiguity for GPS signal $25(i)$ associated with antennas 34 and $35(m)$ and (B) $\Delta r_{24(i)/34/35(m)}$ represents the difference in the unknown ranges $r_{24(i)/34}$ and $r_{24(i)/35(m)}$.

Figure 11:
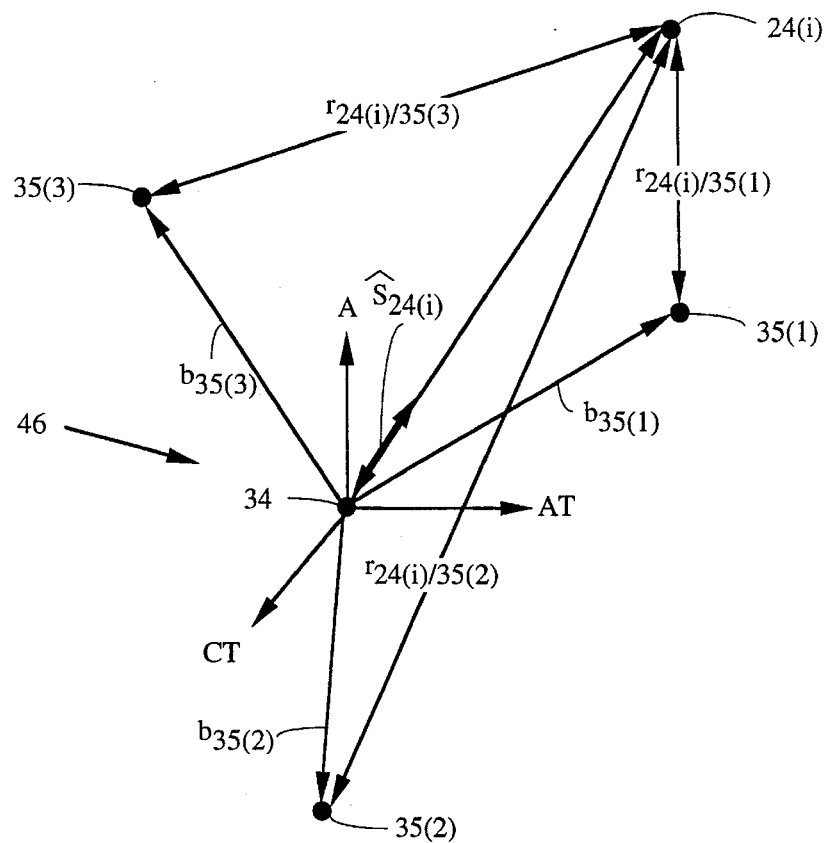
FIG. 11 provides an illustration of the vector relationships associated with the integer ambiguities which are resolved during an initialization period required for generating precise GPS attitude determinations.

In order to resolve the integers ambiguities $n_{25(i)/34/35(m)}$ properly, Equation (44) must be manipulated so as to include the baseline vector relationships which are associated with the ranges $r_{24(i)/34}$ and $r_{24(i)/35(m)}$. These relationships are shown in FIG. 11 and are established with respect to the runway coordinate system 46 which is defined by the coordinates along track AT, cross track CT, and altitude A.

The baseline vectors $b_{35(1)}$, $b_{35(2)}$, and $b_{35(3)}$ respectively represent the unknown positions of attitude antennas $35(1)$–$(3)$ with respect to antenna 34 at the initial epoch of the initialization period. The baseline vector $b_{35(m)}$ [3×1] (i.e. the $m^{th}$ of the baseline vectors $b_{35(1)}$, $b_{35(2)}$, and $b_{35(3)}$) is provided as follows in Equation (45):

$$b_{35(m)} = \begin{bmatrix} b_{35(m)/AT} \\ b_{35(m)/CT} \\ b_{35(m)/A} \end{bmatrix} \quad (45)$$

where $b_{35(m)/AT}$, $b_{35(m)/CT}$, and $b_{35(m)/A}$ are respectively the distances between antennas $35(m)$ and 34 in the along track AT, cross track CT, and altitude A directions.

The direction to GPS satellite $24(i)$ (i.e. the $i^{th}$ of GPS satellites $24(1$–$4)$) in relation to antenna 34 is represented by the known unit direction vector $\hat{s}_{24(i)/34}$ [3×1] provided as follows in Equation (46):

$$\hat{s}_{24(i)/34} = \begin{bmatrix} \hat{s}_{24(i)/34/AT} \\ \hat{s}_{24(i)/34/CT} \\ \hat{s}_{24(i)/34/A} \end{bmatrix} \quad (46)$$

where $\hat{s}_{24(i)/34/AT}$, $\hat{s}_{24(i)/34/CT}$, $\hat{s}_{24(i)/34/A}$ are respectively the unit distances to GPS satellite $24(i)$ in the along track AT, cross track CT, and altitude A directions. This vector is computed by receiver 33 for a GPS satellite $24(i)$ from the satellite position information contained in the data component of the associated GPS signal $25(i)$ and form the coarse position fix generated by receiver 32 for antenna 34 with respect to the coordinate system used to determine the positions of the GPS satellite $24(i)$.

From the preceding vector relationships in Equations (45) and (46), the following mathematical relationship is provided in Equation (47):

$$\Delta r_{24(i)/34/35(m)} = \hat{s}_{24(i)}^T b_{35(m)} \quad (47)$$

Combining Equation (47) with Equation (44) results in the following relationship in Equation (48):

$$\Phi_{25(i)/34/35(m)} = \hat{s}_{24(i)}^T b_{35(m)} - n_{25(i)/34/35(m)} \quad (48)$$

The integer ambiguities $n_{25(i)/34/35(m)}$ can be computed during an initialization period using two different approaches. The first approach requires that the airplane 21 remain stationary during the initialization process. The second is motion-based.

The static method is similar to that used in surveying applications. After several epochs of measuring $\Phi_{25(i)/34}$ and $\Phi_{25(i)/35(m)}$, receiver 33 can generate equations from Equation (47) which are stacked in matrix form for solving the integer ambiguities $n_{25(i)/34/35(m)}$.

In order to insure greater accuracy for the computed values, receiver 33 employs more than the minimum number of epochs needed to compute these values. As a result, the system benefits from the over-determined set of unknowns.

Furthermore, receiver 33 makes measurement epochs over a large enough time period to allow the slowly changing GPS satellite geometry to reveal the integer ambiguities $n_{25(i)/34/35(m)}$. This typically requires approximately fifteen minutes.

Additionally, where possible, phase measurements $\Phi_{25(i)/34}$ and $\Phi_{25(i)/35(m)}$ for additional GPS signals $25(i)$ are made by receiver 33. Again, the system benefits from the over-determined set of unknowns.

Figure 12:
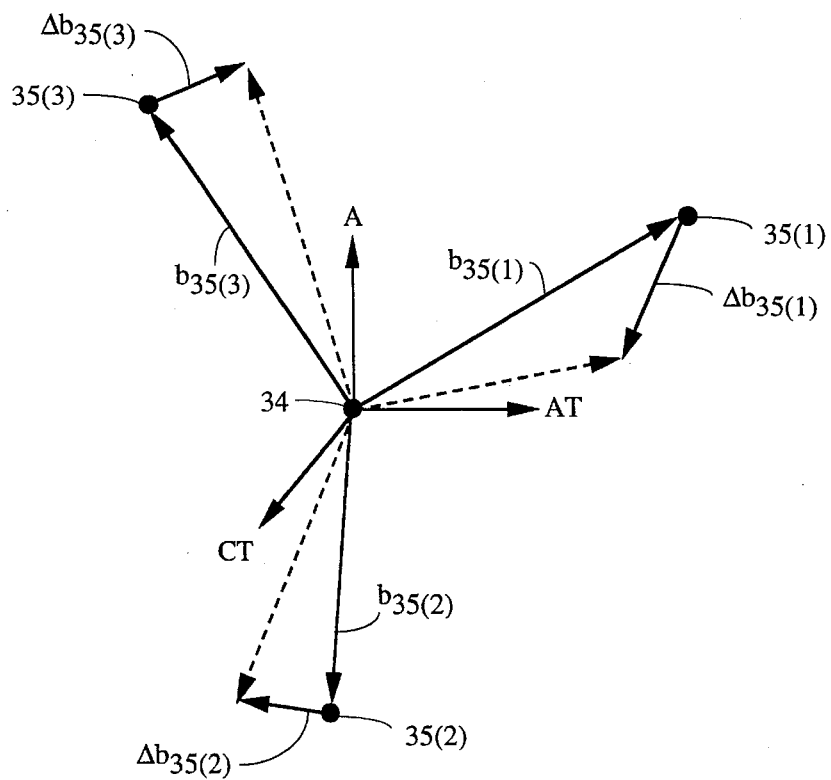
FIG. 12 shows rotation of the attitude antennas about a single axis of the runway coordinate system during the initialization period required for GPS attitude determinations.

The second approach to resolving the integer ambiguities $n_{25(i)/34/35(m)}$ requires rotation of the antennas 35(1)–(3) about at least one of the axis of the runway coordinate system 46. FIG. 12 shows the vector relationships for such a rotation.

In FIG. 12, antennas 35(1)–(3) rotate about the altitude A axis. The baseline vectors $b_{35(1)}$, $b_{35(2)}$, and $b_{35(3)}$ are unknown at the initial epoch of the initialization process. The vectors $\Delta b_{35(1)}$, $\Delta b_{35(2)}$, and $\Delta b_{35(3)}$ respectively represent the change in positions of the antennas 35(1)–(3) at a second epoch with respect to the initial baseline vectors $b_{35(1)}$, $b_{35(2)}$, and $b_{35(3)}$. The vector $\Delta b_{35(m)}$ (i.e. the $m^{th}$ of the vectors $\Delta b_{35(1)}$, $\Delta b_{35(2)}$, and $\Delta b_{35(3)}$) is provided as follows in Equation (49):

$$\Delta b_{35(m)} = \begin{bmatrix} \Delta b_{35(m)/AT} \\ \Delta b_{35(m)/CT} \\ \Delta b_{35(m)/A} \end{bmatrix} \quad (49)$$

where $\Delta b_{35(m)/AT}$, $\Delta b_{35(m)/CT}$, and $\Delta b_{35(m)/A}$ are respectively the change in position of the antenna 35($m$) at the second epoch in the along track AT, cross track CT, and altitude A directions.

The equations generated from Equation (49) at the initial and the second epoch can be subtracted to establish the following relationship in Equation (50):

$$\Delta\Phi_{25(i)/34/35(m)} = \S_{24(i)}^T \Delta b_{35(m)} \quad (50)$$

where $\Delta\Phi_{25(i)/34/35(m)}$ represents the change in $\Phi_{25(i)/34/35(m)}$ between the initial epoch and the second epoch.

The equations generated from Equation (50) may be stacked at a number of epochs after the initial epoch to solve for the vectors $\Delta b_{35(m)}$. Thus, the vectors $\Delta b_{35(m)}$ may be simultaneously computed at each of these epochs without resolving the integer ambiguities $n_{25(i)/34/35(m)}$.

The antennas 35(1)–(3) are fixed to the airplane 21. Thus, the following constraint relationship may be imposed on the baseline vectors $b_{35(y)}$ and $b_{35(z)}$ (i.e. the $y^{th}$ and $z^{th}$ of the vectors $b_{35(1)}$–$b_{35(3)}$) as follows in Equation (51):

$$(b_{35(y)} + \Delta b_{35(y)})(b_{35(z)} + \Delta b_{35(z)}) = b_{35(y)}^T b_{35(z)} \quad (51)$$

However Equation (51) can also be mathematically expressed as follows in equation (52):

$$(b_{35(y)} + \Delta b_{35(y)})(b_{35(z)} + \Delta b_{35(z)}) = b_{35(y)}^T b_{35(z)} + \Delta b_{35(z)}^T b_{35(y)} + \Delta b_{35(y)}^T b_{35(z)} + \Delta b_{35(y)}^T \Delta b_{35(z)} \quad (52)$$

Thus, the Equations (51) and (52) can be combined to form the following relationship in Equation (53):

$$\Delta b_{35(z)}^T b_{35(y)} + \Delta b_{35(y)}^T b_{35(z)} = \Delta b_{35(y)}^T \Delta b_{35(z)} \quad (53)$$

Equation (53) can be stacked by receiver 33 in matrix form to provide equations at each epoch employed after the initial epoch for solving the unknown vectors $b_{35(m)}$. This includes the situations where $y \neq z$ and where $y = z$.

For greater accuracy more than the minimum number of epochs needed to calculate the baseline vectors $b_{35(m)}$ should be employed by receiver 33. As a result, receiver 33 can generate additional equations from Equation (53) for simultaneously solving the over-determined set of unknown baseline values.

Once these baseline values are computed, receiver 33 can compute each integer ambiguity $n_{25(i)/34/35(m)}$. This is done by plugging a computed baseline vector $b_{35(m)}$ and the phase measurement $\Phi_{25(i)/34/35(m)}$ recorded by receiver 33 at the initial epoch into Equation (48) and solving for the integer ambiguity $n_{25(i)/34/35(m)}$. As a built in integrity check, the computed $n_{25(i)/34/35(m)}$ values are checked during the initialization period to see that they converge to integer values.

Once the integer ambiguities have been resolved, the initialization process is over and attitude solutions for airplane 21 can then be computed. The integer ambiguities $n_{25(i)/34/35(m)}$ are included in the set of initialization values needed for computing the attitude solutions.

FIG. 7 shows the vector relationships associated with antennas 35(1)–(3) with respect to the body coordinate system 47. The known vectors $k_{35(1)}$, $k_{35(2)}$, and $k_{35(3)}$ respectively represent the precisely surveyed positions of attitude antennas 35(1)–(3) from antenna 34 with respect to the body coordinate system 47. The known vector $k_{35(m)}$ [3×1] (i.e. the $m^{th}$ of the known vectors $k_{35(1)}$, $k_{35(2)}$, and $k_{35(3)}$) is provided as follows in Equation (54):

$$k_{35(m)} = \begin{bmatrix} k_{35(m)/X} \\ k_{35(m)/Y} \\ k_{35(m)/Z} \end{bmatrix} \quad (54)$$

where $k_{35(m)/X}$, $k_{35(m)/Y}$, and $k_{35(m)/Z}$ are respectively the known distances between antennas 35($m$) and 34 in the X, Y, and Z directions.

FIG. 8 shows the vector relationships associated with antennas 35(1)–(3) as the body coordinate system 47 rotates about the runway coordinate system 46. The unknown vectors $x_{35(1)}$, $x_{35(2)}$, and $x_{35(3)}$ respectively represent the unknown positions of attitude antennas 35(1), 35(2), and 35(3) from antenna 34 with respect to the runway coordinate system 46. The unknown vector $x_{35(m)}$ [3×1] (i.e. the $m^{th}$ of the unknown vectors $x_{35(1)}$, $x_{35(2)}$, and $x_{35(3)}$ is provided as follows in Equation (55):

$$x_{35(m)} = \begin{bmatrix} x_{35(m)/AT} \\ x_{35(m)/CT} \\ x_{35(m)/A} \end{bmatrix} \quad (55)$$

where $x_{35(m)/AT}$, $x_{35(m)/CT}$, and $x_{35(m)/A}$ are respectively the unknown distances between antennas 35($m$) and 34 in the along track AT, cross track CT, and altitude A directions.

From the preceding vector relationships in Equations (46) and (55), the following relationship is provided in Equation (56):

$$\Delta r_{24(i)/34/35(m)} = \S_{24(i)}^T x_{35(m)} \quad (56)$$

Combining Equations (56) and (44) results in the following relationship in Equation (57):

$$\Phi_{25(i)/34/35(m)}\hat{s}_{24(i)}{}^T x_{35(m)} - n_{25(i)/34/35(m)} \tag{57}$$

Since, as discussed earlier, the attitude matrix A represents the rotation of the body coordinate system 47 about the runway coordinate system 46, the following relationship may be established in Equation (58)

$$x_{35(m)} = A^T k_{35(m)} \tag{58}$$

Combining equation (58) with Equation (57) results in the following relationship provided by Equation (59):

$$\Phi_{25(i)/34/35(m)} = \hat{s}_{24(i)}{}^T A^T k_{35(m)} - n_{25(i)/34/35(m)} \tag{59}$$

A complete attitude solution can be generated by receiver 33 by utilizing the differential ranges $\Delta r_{24(i)/34/35(m)}$ which can be computed from Equation (44). This is done by minimizing the following quadratic cost function provided in Equation (60):

$$J = \sum_{m=1}^{l} \sum_{i=1}^{j} w_{35(m)/24(i)} (\Delta r_{24(i)/34/35(m)} - k_{35(m)}^T A \hat{s}_{24(i)})^2 \tag{60}$$

where $w_{35(m)/24(i)}$ represent the optional measurement weighting associated with antenna 35(m) and GPS satellite 24(i).

Starting with an assumed estimate $A_0$ [3×3] for the matrix A, a better estimate may be obtained by linearizing Equation (60) about the current solution $A_0$ as follows in Equation (61):

$$J = \sum_{m=1}^{l} \sum_{i=1}^{j} w_{35(m)/24(i)} (\Delta r_{24(i)/34/35(m)} - k_{35(m)}^T \delta A A_0 \hat{s}_{24(i)})^2 \tag{61}$$

where $\delta A$ [3×3] is an attitude correction matrix of small angle rotations.

Thus, the attitude matrix A may be expressed as follows in Equation (62):

$$A = \delta A A_0 \tag{62}$$

The correction matrix $\delta A$ is expressed as follows in Equation (63):

$$\delta A = I + \Theta^x \tag{63}$$

where (A) I [3×3] is an identity matrix, and (B) $\Theta^x$ [3×3] is the skew symmetric matrix associated with the unknown vector $\delta\Theta$ of small angle rotations.

The unknown vector $\delta\Theta$ [3×1] can be expressed as follows in Equation (64):

$$\delta\Theta = \begin{bmatrix} \delta\theta_X \\ \delta\theta_Y \\ \delta\theta_Z \end{bmatrix} \tag{64}$$

where $\delta\Theta_x$, $\delta\Theta_y$, and $\delta\Theta_z$ respectively represent the unknown small angle rotations about the X, Y, and Z coordinates of the body coordinate system 47.

The skew symmetric matrix $\Theta^x$ associated with the vector $\delta\Theta$ can be expressed as follows in Equation (65):

$$\Theta^x = \begin{bmatrix} 0 & -\delta\theta_Z & \delta\theta_Y \\ \delta\theta_Z & 0 & -\delta\theta_X \\ -\delta\theta_Y & \delta\theta_X & 0 \end{bmatrix} \tag{65}$$

After combining Equations (62)-(65) with Equation (61), the attitude cost function can be expressed as follows in Equation (66):

$$J = \sum_{m=1}^{l} \sum_{i=1}^{j} w_{35(m)/24(i)} (\Delta r_{24(i)/34/35(m)} - \tag{66}$$

$$k_{35(m)}^T A_0 s_{24(i)} - s_{24(i)} A_0^T K_{35(m)}^x \delta\Theta)^2$$

where the dot product of the matrix $K_{35(m)}$ and the vector $\delta\Theta$ equals the dot product of the matrix $\Theta^x$ and the vector $k_{35(m)}$.

The matrix $K_{35(m)}^x$ may be represented as follows in Equation (67):

$$K_{35(m)}^x = \begin{bmatrix} 0 & -k_{35(m)/AT} & k_{35(m)/AT} \\ k_{35(m)/CT} & 0 & -k_{35(m)/CT} \\ -k_{35(m)/A} & k_{35(m)/A} & 0 \end{bmatrix} \tag{67}$$

By minimizing Equation (66), the vector $\delta\Theta$ may be computed by receiver 33. As a result, the matrix $\Theta^x$ may be computed from Equation (65) and the matrix $\delta A$ may then be computed from Equation (63). Using the computed matrix $\delta A$ and the computed matrix $A_0$, receiver 33 computes a more accurate estimate for matrix A from Equation (62).

The estimate A from the previous iteration is used as the current solution $A_0$ for the next iteration. The new estimate A is then computed and compared with the estimate A from the previous iteration. This process is continued until the estimate for A converges to within a desired level.

Another significant advantage to this approach is that the integer ambiguities $n_{25(i)/34/35(m)}$ of an additional GPS signal 25(i) broadcast by GPS satellite 24(i) which was not in view during the initialization period can be resolved once it does become in view after the initialization period. Receiver 33 accomplishes this by measuring $\Phi_{25(i)/34}$ and $\Phi_{25(i)/35(m)}$ for the new GPS signal 25(i) at a particular epoch after the initialization period. At this epoch the matrix A has already being determined by receiver 33 from the other GPS signals 25(1)-(4) which have had their respective integer ambiguities $n_{25(i)/34/35(m)}$ resolved during the initialization period. The calculated attitude matrix A and the phase measurements $\Phi_{25(i)/34}$ and $\Phi_{25(i)/35(m)}$ are plugged into Equation (54) so as to solve for the new integer ambiguity $n_{25(i)/34/35(m)}$. Then, this newly computed integer ambiguity $n_{25(i)/34/35(m)}$ together with the phase measurements for the newly acquired GPS signal 25(i) may be used in computing the matrix A in the two ways just described. Thus, this technique results in a seamless integer hand-off so that a new initialization period is unnecessary.

DETAILED DESCRIPTION OF GROUND SYSTEM

FIGS. 13–17 provide detailed illustrations of the elements of the ground system 39. The functions of these elements, in relation to the previously described equations, are better understood with reference to these figures.

Figure 13:
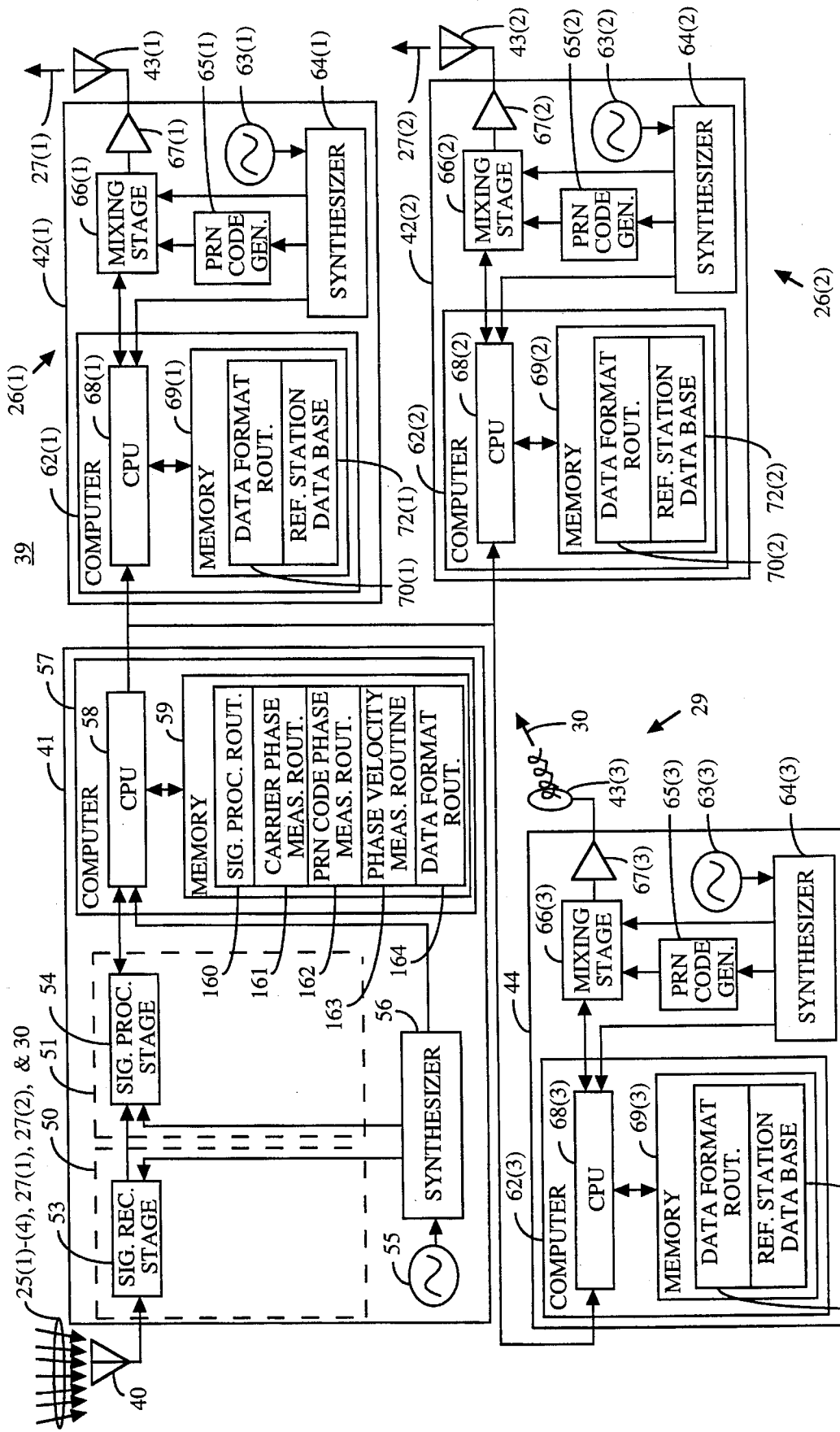
FIG. 13 shows a detailed description of a ground base GPS reference system which is part of the entire GPS system of FIG. 1 and which employs two initialization pseudolites.

FIG. 13 shows the reference system 39 in the configuration which employs dual initialization pseudolites 26. It comprises reference GPS antenna 40, reference GPS receiver 41, the two initialization pseudolites 26(1)–(2), and the data and ranging link pseudolite 29.

Reference antenna 40 receives GPS signals 25(1)–(4), 27(1)–(2), and 30. It is at a known ground location, represented by the previously described vector t, with respect to the runway 23 threshold. In this configuration, this location can be on either side of the runway 23 but is within the broadcast radius of the signal bubbles 28(1)–(2). It is also at a known location with respect to the coordinate system used to define the positions of the GPS satellites 24(1)–(4).

Reference GPS receiver 41 receives the GPS signals 25(1)–(4), 27(1)–(2), 30 from the reference antenna 40. It includes a signal receiving block 50, a signal processing block 51, a reference oscillator 55, a synthesizer 56, and a computer 57.

In this configuration, the signal receiving block 50 comprises a single signal receiving stage 53. The signal receiving stage 53 is coupled to reference antenna 40 for receiving the GPS signals 25(1)–(4), 27(1)–(2), and 30 from reference antenna 40. It extracts the received GPS signals 25(1)–(4), 27(1)–(2), and 30 and down converts them to an intermediate frequency for signal processing by the signal processing block 51.

The signal processing block 51 in this configuration includes a single multi-channel signal processing stage 54. The signal processing stage is coupled to the signal receiving stage 53 for receiving the down converted GPS signals 25(1)–(4), 27(1)–(2), and 30. It is also coupled to computer 57 for receiving signal processing control signals from the computer 56. The signal processing stage 54 separates (i.e. demodulates) each of the down converted GPS signal 25(1)–(4), 27(1)–(2), or 30 into its carrier, PRN code, and data components.

Furthermore, with the signal processing control signals provided by the computer 57, the signal processing stage 54 phase locks the carrier and PRN code components of each of the GPS signals 25(1)–(4), 27(1)–(2), or 30 with the carrier and PRN code signals it generates. As a result, the signal processing stage 54 provides the computer 57 with information for making the earlier described carrier phase measurements, PRN code phase measurements, and carrier phase velocity measurements for the GPS signal 25(1)–(4), 27(1)–(2), or 30.

The computer 57 is coupled to the signal processing stage 54. It includes a central processing unit (CPU) 58 and a computer memory 59.

The CPU 58 receives from the signal processing block 51 the information for making the earlier described carrier phase measurements, PRN code phase measurements, and phase velocity measurements described earlier for the GPS signal 25(1)–(4), 27(1)–(2), and 30. Furthermore, the CPU also receives from the signal processing block 51 the demodulated data components of the GPS signal 25(1)–(4), 27(1)–(2), and 30.

The computer memory 59 stores the signal processing routine 160, the carrier phase measuring routine 161, the PRN code phase measuring routine 162, the phase velocity measuring routine 163, and the data formatting routine 164. The CPU 58 is coupled to the computer memory 59 for receiving the routines 160–164.

The signal processing routine 160 generates the signal processing control signals for controlling the carrier and PRN code phase locking operations of the signal processing block 51. These control signals are outputted by the CPU 58 and received by the signal processing block 51.

The carrier phase measuring routine 161 makes the phase measurements $\Phi_{25(1)/40}$, $\Phi_{30/40}$, and $\Phi_{27(k)/40}$ based on the information received from the signal processing block 51. Thus, the routine 161 and the signal processing block 51 make up the carrier phase measuring component of the receiver 41. Furthermore, as was indicated earlier, each of these carrier phase measurement includes both a fractional wavelength phase component $\Phi_{fr}$ and an integer wavelength phase change component $\Phi_{int}$. These phase measurements are used by receiver 32 for making Carrier Phase Differential GPS position determinations.

The PRN code phase measuring routine 162 makes the earlier described PRN code phase measurements for the GPS signals 25(1)–(4), 27(1)–(2), and 30 based on the information received from the signal processing block 51. Thus, the routine 162 and the signal processing block 51 make up the PRN code phase measuring component of the receiver 41. As was indicated earlier, these measurements are used by receiver 32 for Conventional GPS and Ordinary Differential GPS position determinations.

The carrier phase velocity measuring routine 163 makes the phase velocity measurements $\dot\Phi_{25(i)/40}$ and $\dot\Phi_{27(k)/40}$ based on the information received from the signal processing block 51. Thus, the routine 163 and the signal processing block 51 make up the carrier phase velocity measuring component of the receiver 41. As was indicated earlier, each of these phase velocity measurements are used by receiver 32 for calculating the initialization values necessary for Carrier Phase Differential GPS position determinations.

The routines 161–163 issue their respective measurements at the same rate as is do the measurement routines in receivers 32 and 33. This is done so that the carrier and PRN code phase measurements and the phase velocity measurements of receivers 32 and 33 can be synchronized with the carrier and PRN code phase measurements and phase velocity measurements of receiver 41 which have been uplinked to receiver 32. As was discussed earlier, these carrier phase measurements are made by the routines 161–163 at the rate of approximately 1–10 Hz.

The formatting routine 164 then formats together the carrier and PRN code phase measurements and phase velocity measurements made for each of the GPS signals 25(1)–(4), 27(1)–(2), and 30. This formatted data is then outputted by the CPU 58 and received by the signal generators 42(1)–(2) and 44.

The synthesizer 56 and the reference oscillator 55 are coupled together. The reference frequency signal outputted by the oscillator 55 is used by the synthesizer 56 to generate a down converting signal and a clock signal.

The down converting signal is received by the signal receiving stage 53. It is used to down convert the received GPS signals 25(1)–(4), 27(1)–(2), and 30 to the intermediate frequency.

The clock signal is received by the signal processing stage 54 and the CPU 58. Since the CPU 58 and the signal processing stage 54 operate based on the same clock source, the carrier phase measurements, PRN code phase measurements, and carrier phase velocity measurements made for each of the GPS signals 25(1)–(4), 27(1)–(2), and 30 are coherent (i.e. made at the same time) with respect to each other.

Pseudolites 26(1)–(2) and 29 respectively generate and broadcast the GPS signals 27(1)–(2) and 30. Each is coupled to the reference receiver 41. Pseudolites 26(1)–(2) and 29 respectively include the GPS signal generators 42(1)–(2) and 44 and respectively include the pseudolite antennas 43(1)–(2) and 45.

The signal generators 42(1)–(2) and 44 are respectively coupled to the pseudolite antennas 43(1)–(2) and 45. The signal generators 42(1)–(2) and 44 respectively include the computers 62(1)–(3), the reference oscillators 63(1)–(3), the synthesizers 64(1)–(3), the PRN code generators 65(1)–(3), the mixing stages 66(1)–(3), and the amplifiers 67(1)–(3).

The computers 62(1)–(3) respectively have CPUs 68(1)–(3) and computer memories 69(1)–(3). The CPUs 68(1)–(3) each receive the data formatted by the formatting routine 164 of computer 57. The computer memories 69(1)–(3) respectively store the data modulating routines 70(1)–(3) and the reference system data bases 72(1)–(3).

The reference system data bases 72(1)–(3) can include (a) the precisely surveyed position of reference antenna 40 with respect to the coordinate system used to determine the positions of the GPS satellites 24(1)–(4), (b) the precisely surveyed vectors t, $p_{45}$, and $p_{43(k)}$, and (c) important runway and airport status information.

The data formatting routines 70(1)–(3) respectively format the data in the data bases 72(1)–(3) with the carrier and PRN phase data and phase velocity data received from the receiver 41. The formatted data of the routines 70(1)–(3) is respectively outputted to the mixing stages 66(1)–(3) at a frequency of approximately 1000 bits per second.

The synthesizers 64(1)–(3) are coupled to the reference oscillators 63(1)–(3). The synthesizers 64(1)–(3) respectively use the reference frequency signal outputted by the oscillators 63(1)–(3) for generating a clock signal and a GPS carrier signal.

The computers 62(1)–(3) are coupled to and receive clock signals from the synthesizers 64(1)–(3) respectively. Thus, the operation of the computers 62(1)–(3) is therefore based on the oscillators 63(1)–(3) respectively.

The PRN code generators 65(1)–(3) are coupled to and receive clock signals from the synthesizers 64(1)–(3) respectively. The PRN code generators 65(1)–(3) respectively generate a unique unassigned PRN code from the received clock signals of the synthesizers 64(1)–(3).

The mixing stages 66(1)–(3) are respectively coupled to the computers 62(1)–(3), the PRN code generators 65(1)–(3) and the synthesizers 64(1)–(3). The mixing stages 66(1)–(3) respectively modulate the data received from the data generators 62(1)–(3) onto the PRN codes respectively received from the PRN code generators 65(1)–(3). The mixing stages 66(1)–(3) then respectively convert the modulated PRN codes with the L-band carrier signals respectively received from the synthesizers 64(1)–(3). Thus, the GPS signals 27(1)–(2) and 30 are respectively generated by the signal generators 42(1)–(3) and 44.

The amplifiers 67(1)–(30) are respectively coupled to the mixing stages 66(1)–(3) and respectively receive the GPS signals 27(1)–(2) or 30. The amplifiers 67(1)–(3) then respectively amplify the GPS signals 27(1)–(2) or 30.

In the dual initialization configuration of FIG. 1, the amplifiers 67(1)–(2) respectively amplify the GPS signals 27(1)–(2) at the same low power level. This power level is selected so that the broadcast radii of the two signal bubbles 28(1)–(2) will overlap at a height which is larger than the nominal altitude (i.e. the normal altitude) for an estimated flight trajectory along the along track axis and between the pseudolite antennas 43(1)–(2).

In the preferred embodiment, the nominal altitude for a flight trajectory inside the signal bubbles 28(1)–(2) will be approximately several hundred meters. As a result, the power used will be on the order of several µW so that signal bubbles 28(1)–(2) have broadcast radii which overlap at a height greater than the preferred nominal altitude of several hundred meters.

In the single initialization pseudolite configuration of FIG. 8, the amplifier 67 of the signal generator 42 amplifies the GPS signal 27 at a low power level. This power level is selected so that the broadcast radius of signal bubble 28 will be larger than the nominal altitude for an estimated flight trajectory along the along track axis over the signal bubble 28.

As was the case in the dual pseudolite configuration, in the preferred embodiment, the nominal altitude for a flight trajectory inside the signal bubbles 28(1)–(2) will be approximately several hundred meters. Thus, the power used will be on the order of several µW so that signal bubble 28(1) will have a broadcast radius greater than the preferred nominal altitude of several hundred meters.

In the dual initialization pseudolite configuration of FIG. 1, pseudolite antennas 43(1)–(2) are at known locations, represented by the vectors $p_{43(k)}$, with respect to the reference antenna 40. In the preferred embodiment, these antennas are located on each side of the along track axis approximately 100 meters apart in the cross track direction. Furthermore, these antennas are located approximately 1000 meters in front of the runway 23 threshold in the along track direction. But, in the single initialization pseudolite configuration of FIG. 8, pseudolite antenna 43 will be preferably located approximately 1000 meters in front of the runway 23 on the along track axis.

Pseudolite antennas 43(1)–(2) are respectively coupled to the amplifiers 67(1)–(2) and respectively receive the GPS signals 27(1)–(2). The antennas 43(1)–(2) then respectively broadcast the GPS signals 27(1)–(2) as the low power signal bubbles 28(1)–(2).

As indicated earlier, pseudolite antenna 45 is at a known location, represented by the vector $p_{45}$, with respect to the reference antenna 40. In the preferred embodiment, this location is approximately 1000 meters in front of the end of runway 23 on the along track axis.

Pseudolite antenna 45 is also coupled to the mixing stage 66(3) of the signal generator 44 and receives the GPS signal 30 from it. The pseudolite antenna 45 broadcasts the GPS signal 30 as the signal beam 31.

Figure 14:
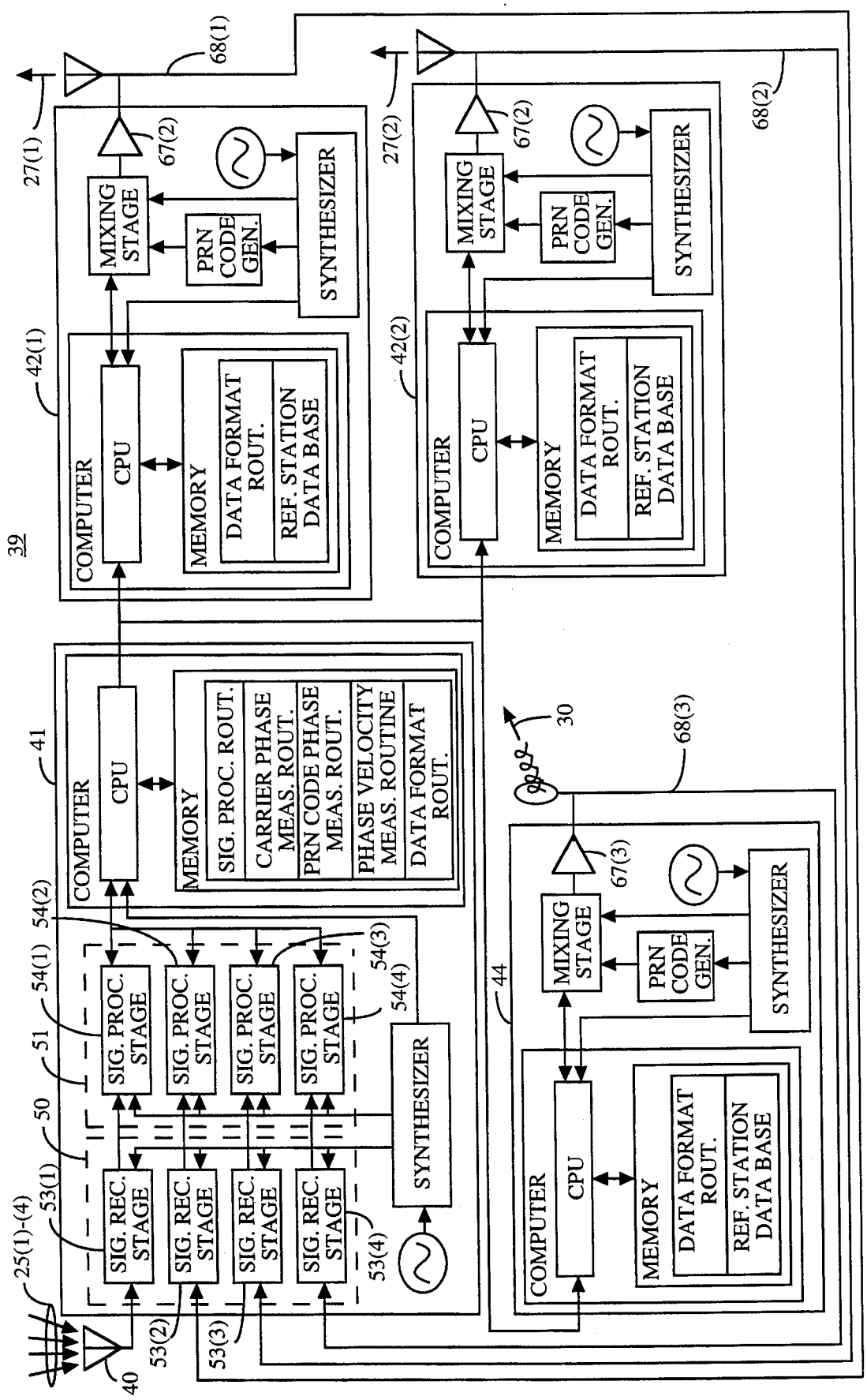
FIG. 14 shows an alternative embodiment for the GPS reference system where pseudolite signals are received directly by a reference receiver from pseudolite signal generators.

FIG. 14 shows another embodiment of the reference system 39. The amplifiers 67(1)–(3) are respectively coupled to the signal receiving block 50 of reference receiver 41 by the coaxial cables 68(1)–(3). Thus, the GPS signals 27(1)–(2) and 30 are received by the reference receiver 41 directly from signal generators 42(1)–(2) and 44 rather than from reference antenna 40. As a result, reference antenna 40 need not be located within the signal bubbles 28(1)–(2) in this configuration.

In this embodiment, reference receiver 41 has four signal paths. The first accommodates the GPS signals 25(1)–(4) received from the antenna 40. The second, third, and fourth respectively accommodate the GPS signals 27(1)–(2) and 30 received respectively from the three coaxial cables 68(1)–(3).

Thus, in this embodiment the signal receiving block 67 has four signal receiving stages 53(1)–(4) and the signal processing block 68 has four signal processing stages 54(1)–(4). The signal receiving stages 53(1)–(4) are respectively coupled to the signal processing stages 54(1)–(4).

The signal receiving stage 53(1) is coupled to antenna 40 for receiving GPS signals 25(1)–(4). The signal receiving stages 53(2)–(4) are respectively coupled the coaxial cables 68(1)–(3) for respectively receiving the GPS signals 27(1)–(2) and 30. Except for this difference, each of the signal receiving stages 53(1)–(4) is otherwise configured and coupled in the same way and performs the same signal extracting and down converting functions as was earlier described for the signal receiving stage 53 of FIG. 11. Moreover, each of the signal processing stages 54(1)–(4) is configured and coupled in the same way and performs the same separating and information providing functions as was earlier described for the signal processing stage 54 of FIG. 13.

Furthermore, in this embodiment, the integer ambiguities $n_{30}$ and $n_{27(k)}$ are associated with the reference receiver 41 and the antenna 38, rather than with reference antenna 40 and antenna 38. And, the vectors $p_{43(k)}$ and $p_{45}$ represent the distances from each of the signal generators 42(1)–(2) and 44 to the reference receiver 41, rather than the distances from the pseudolite antennas 43(1)–(2) and 45 to the reference antenna 40.

Figure 15:
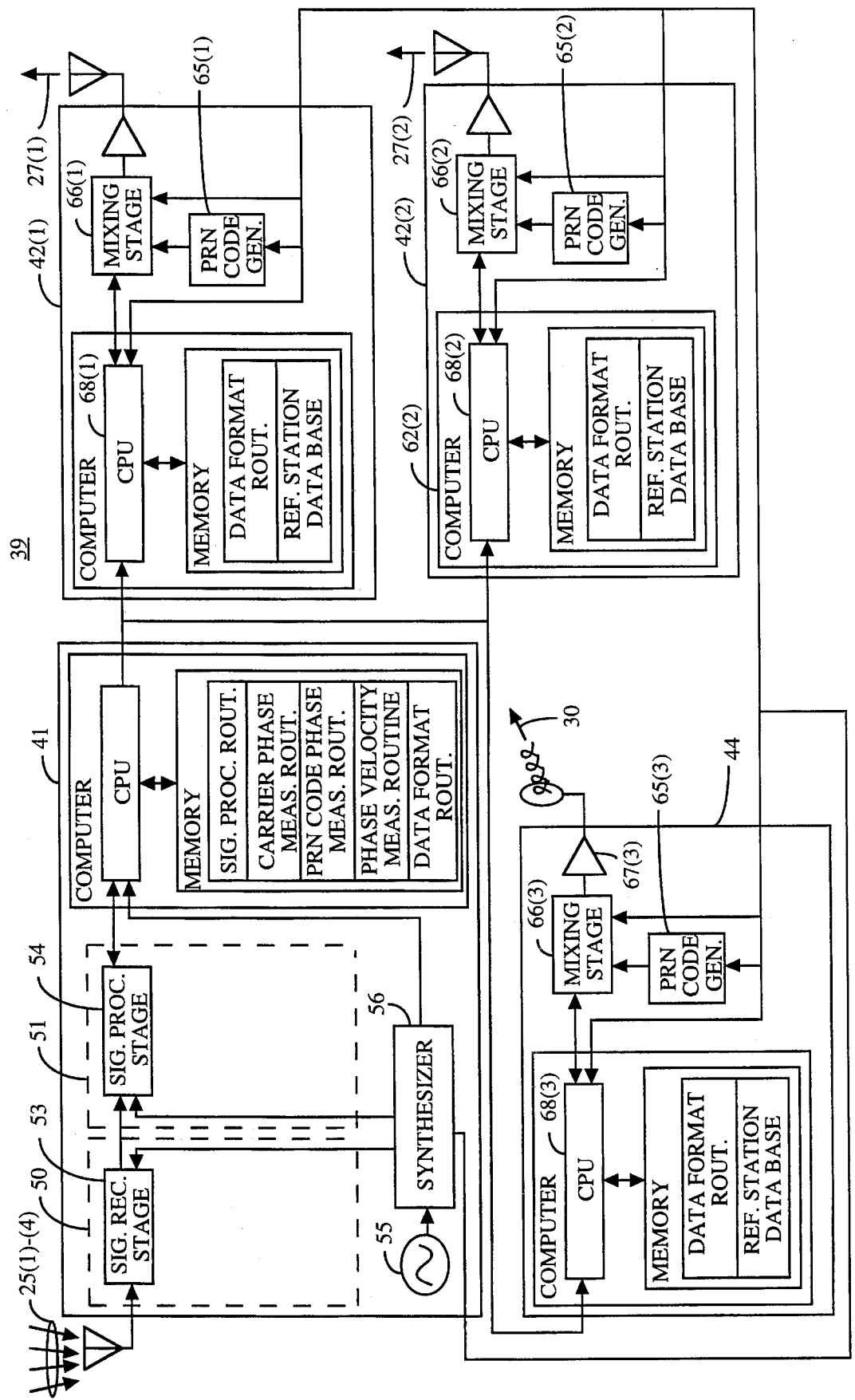
FIG. 15 shows another embodiment for the GPS reference system where the GPS reference receiver and the pseudolite signal generators share a common synthesizer.

FIG. 15 shows still another embodiment of the reference system 39. The configuration shown in FIG. 13 is the same as that in FIG. 13 except that the synthesizer 56 of reference receiver 41 is coupled to each of the signal generators 42(1)–(3) respectively.

This connection replaces the oscillators 63(1)–(3) and synthesizers 64(1)–(3) of the signal generators 42(1)–(2) and 44 respectively. Since the operations of reference receiver 41 and signal generators 42(1)–(2) and 44 are now based on the same oscillator 55, the clock synchronization errors $\Delta T_{42(k)}$ and $\Delta T_{44}$ are replaced by the single clock synchronization error $\Delta T_{41}$. Thus, Equations (4), (5), (7), and (8) can be expressed as follows:

$$\Phi_{30/38} = r_{45/38} - n_{30/34} + \Delta T_{32} - \Delta T_{41} \quad (4)$$

$$\Phi_{30/40} = r_{45/40} - n_{30/40} \quad (5)$$

$$\Phi_{27(k)/38} = r_{43(k)/38} - n_{27(k)/34} + \Delta T_{32} \Delta T_{41} \quad (7)$$

$$\Phi_{27(k)/40} = r_{43(k)/40} - n_{27(k)/40} \quad (8)$$

Equations (5) and (8) in this configuration no longer include any clock synchronization errors. Unlike the case for the configurations of FIGS. 13 and 14, the Equations (5) and (8) are no longer required for cancelling out the clock synchronization errors $\Delta T_{43(k)}$ and $\Delta T_{44}$ with the single phase relationships of Equations (6) and (9) respectively. Thus, the phase measurements $\Phi_{30/40}$ and $\Phi_{27(k)/40}$ and corresponding phase velocity measurements $\dot{\Phi}_{25(i)/40}$ and $\dot{\Phi}_{27(k)/40}$ need not be measured by receiver 41 and uplinked to receiver 32. Furthermore, the values $r_{45/40}$, $n_{30/40}$, $r_{43(k)/40}$, and $n_{27(k)/40}$ need not be computed by receiver 32. Thus, the values $\Phi_{30/40}$, $\Phi_{27(k)/40}$, $\dot{\Phi}_{25(i)/40}$, $\dot{\Phi}_{27(k)/40}$, $r_{45/40}$, $n_{30/40}$, $r_{43(k)/40}$, and $n_{27(k)/40}$ can be implicitly removed from consideration in the set of Equations (1)–(42) by setting them to zero.

This configuration has an advantage over the configuration of FIG. 13 in that the number of channels required by the signal processing block 51 is reduced by three. This stems from the fact that the carrier phase measurements for the three GPS signals 27(1)–(2) and 30 need not be made.

This configuration also has an advantage over the configuration of FIG. 14 in that it eliminates the three signal receiving stages 53(2)–(4) and the three signal processing stages 54(2)–(4) needed for making the phase measurements for the GPS signals 27(1)–(2) and 30. It also eliminates the need for the coaxial cables 68(1)–(3).

Figure 16:
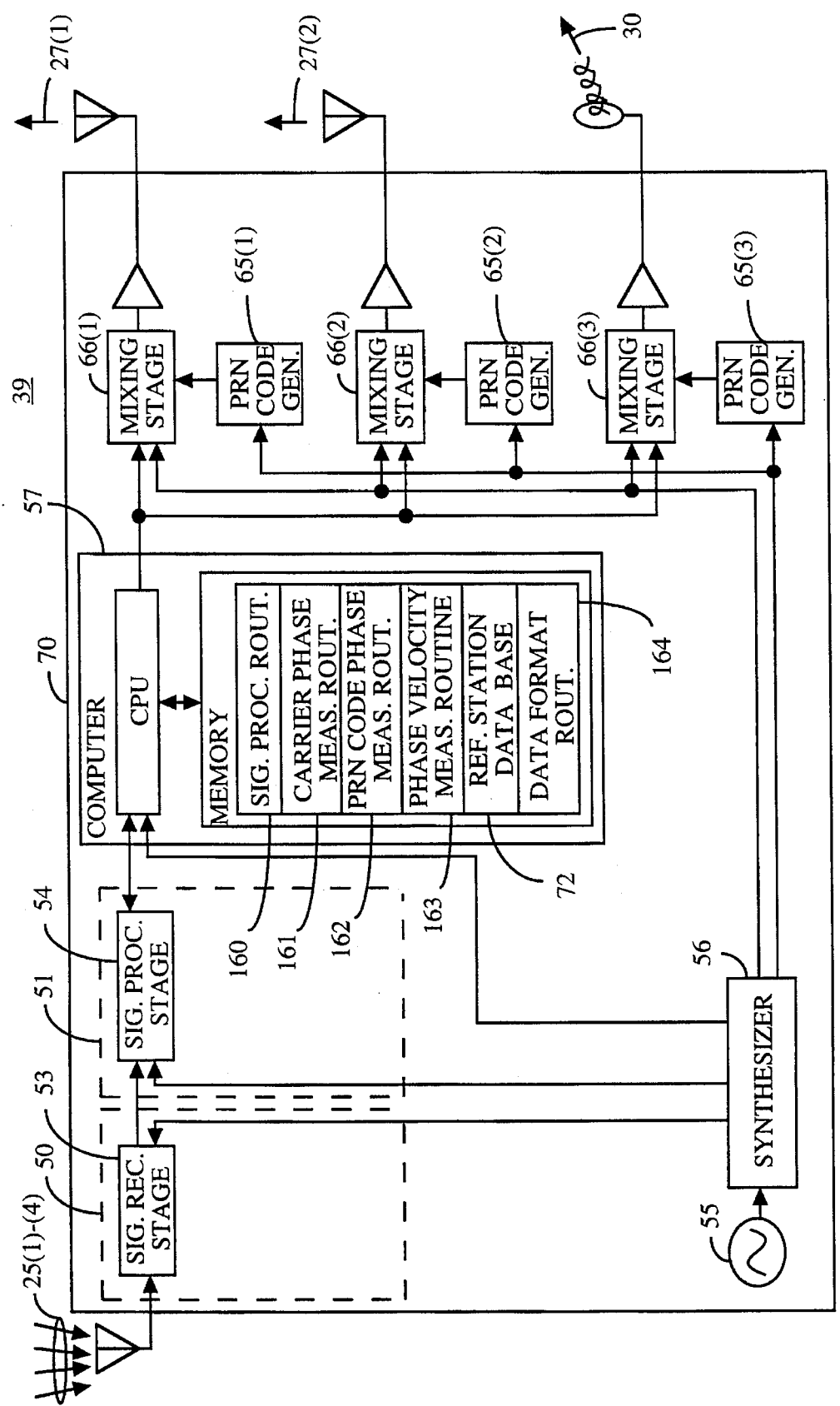
FIG. 16 shows yet another embodiment for the GPS reference system where the GPS reference receiver and the pseudolite signal generators are combined into a single GPS reference transceiver.

FIG. 16 shows a variation of the embodiment in FIG. 15. In this configuration, the receiver 41 and the signal generators 42(1)–(2) and 44 are combined into a single transceiver 70. The CPU 58 of computer 57 is directly coupled to the mixing stages 66(1)–(3). Furthermore, the synthesizer 56 is coupled to the mixing stages 66(1)–(3) for providing the carrier components of the pseudolite signals 27(1)–(2) and 30. The synthesizer 56 is also coupled to the PRN code generators 65(1)–(3) for providing the clock signals necessary in generating the PRN codes of the pseudolite signals 27(1)–(2) and 30 respectively.

The computer memory 59 of computer 55 stores the signal processing routine 160, the carrier phase measuring routine 161, the PRN code measuring routine 162, the phase velocity measuring routine 163, the data formatting routine 164, and the reference system data base 72. In this configuration, the data formatting routine 164 formats the measurements made by the routines 161–163 with the data in the data base 72.

In alternative arrangements to any of configurations in FIGS. 13–16, the pseudolite signals 27(1)–(2) and 30 need not be GPS signals. In this case, synthesizers 64 may generate carrier components for the pseudolite signals 27(1)–(2) or 30 at a frequency other than the GPS L1 frequency of 1.575 GHz. This may be done in order to avoid interference with the GPS signals 25(1)–(4). Furthermore, the pseduolite signals need not have PRN code components. Thus, signal generators 42(1)–(2) or 44 need not include the PRN code generators 65(1)–(3). And finally, the pseudolite signals 27(1)–(2) need not contain data components since the data component of the pseudolite signal 30 will suffice to provide receiver 32 with the all of information necessary for making precise position determinations. Therefore, the signal generators 42(1)–(2) need not include the computers 62(1)–(2) for providing formatted data to be modulated onto the carrier components of the signals 27(1)–(2).

But, in order to minimize hardware costs by utilizing existing GPS receiver technology, signal generators 42(1)–(2) and 44 generate the pseudolite signals 27(1)–(2) and 30 as GPS signals. Thus, the synthesizers 64 generate carrier components having a frequency of 1.575 GHz and the signal generators 42(1)–(2) and 44 include PRN code generators 62.

DETAILED DESCRIPTION OF MOBILE SYSTEM

FIGS. 17–21 provide detailed illustrations of the GPS mobile system 37 which makes up part of the entire GPS system 20. The functions of the components of the mobile system 37, in relation to the previously described equations, are better understood with reference to these figures.

FIG. 2 shows one embodiment of mobile system 37. In this embodiment, mobile system 37 includes GPS position receiver 32, GPS attitude receiver 33, antennas 34, 35(1)–(3), and 38.

Figure 17:
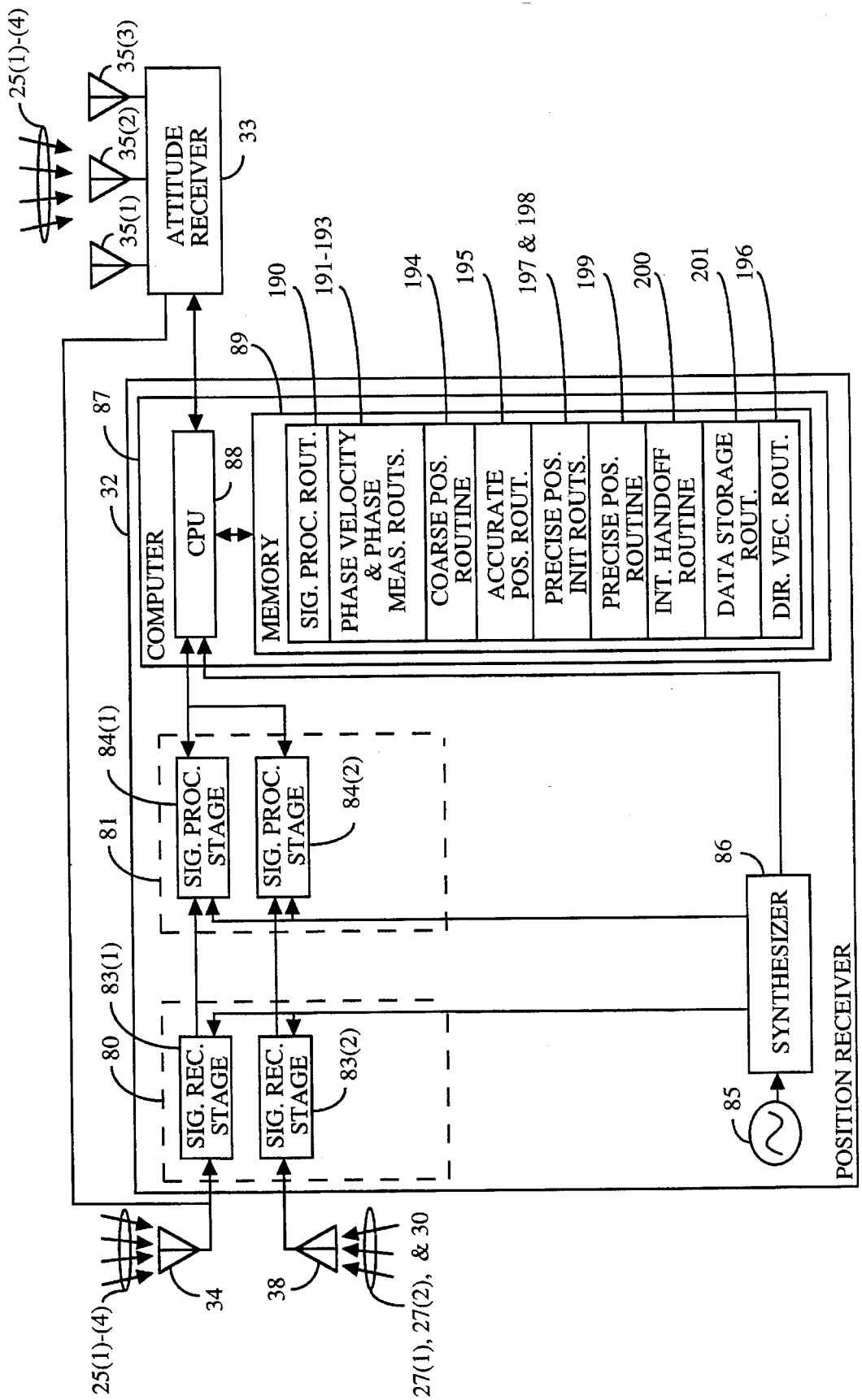
FIG. 17 provides a detailed illustration of a portion of a GPS mobile system which is part of the entire GPS system of FIG. 1 and which includes a GPS position receiver and several antennas.

FIG. 17 provides a more detailed illustration of part of the configuration of FIG. 2. This figure shows the relationship between antennas 34 and 38 and GPS receiver 32.

The antenna 34 receives GPS signals 25(1)–(4). As was indicated earlier, its position with respect to the runway 23 threshold is given by the vector x.

The antenna 38 receives GPS signals 27(1)–(2) and 30. As was also indicated earlier, its position with respect to the runway 23 threshold is given by the vector y.

GPS position receiver 32 receives the GPS signals 25(1)–(4), 27(1)–(2), and 30 from the antennas 34 and 38. Like the reference receiver 41, it includes a signal receiving block 80, a signal processing block 81, a reference oscillator 85, a synthesizer 86, and a computer 87.

In this configuration, the signal receiving block 80 comprises two signal receiving stages 83(1)–(2). The signal receiving stage 83(1) is coupled to antenna 34 for receiving the GPS signals 25(1)–(4). The signal receiving stage 83(2) is coupled to antenna 38 for receiving the GPS signals 27(1)–(2) and 30. The signal receiving stages 83(1)–(2) are configured and coupled in the same way and perform the same signal extracting and down converting functions as was described earlier for the signal receiving stage 53 of the reference receiver 41 in FIG. 11.

The signal processing block 81 includes two multi-channel signal processing stages 84(1)–(2). The signal processing stages 84(1)–(2) are respectively coupled to the signal receiving stages 83(1)–(2). The signal processing stages 84(1)–(2) are configured and coupled in the same way, perform the same signal separating and phase locking functions, and generate the same type of phase and phase velocity information as was described earlier for the signal processing stage 53 of reference receiver 41 of FIG. 11.

The computer 87 is coupled to each of the signal processing stages 84(1)–(2). It includes a central processing unit (CPU) 88 and a computer memory 89.

The CPU 88 receives from the signal processing stages 84(1)–(2) the information necessary for making the earlier described carrier phase and PRN code measurements and phase velocity measurements for each received GPS signal 25(1)–(4), 27(1)–(2), and 30. Furthermore, the CPU 88 also receives from the signal processing block 81 the demodulated data components of the GPS signal 25(1)–(4), 27(1)–(2), and 30.

The computer memory 89 stores the signal processing routine 190, the carrier phase measuring routine 191, the PRN code phase measuring routine 192, the phase velocity measuring routine 193, the coarse position generating routine 194, the accurate position generating routine 195, the GPS satellite unit directional vector computation routine 196, the initialization routine 197 using just phase measurements, the initialization routine 198 using both phase measurements and phase velocity measurements, the precise position generating routine 199, and the precise position integer hand-off routine 200. Data generated by the routines 190–200 are stored in the data storage area 201 of the computer memory 89. The CPU 88 is coupled to the computer memory 89 for receiving the routines 190–200 and the data in the data storage area 201.

The signal processing routine 190 generates the signal processing control signals for controlling the carrier and PRN code phase locking operations of the signal processing block 81. These control signals are outputted by the CPU 88 and received by the signal processing block 81.

The carrier phase measuring routine 191 makes the phase measurements $\Phi_{25(i)/34}$, $\Phi_{30/38}$, and $\Phi_{27(k)/38}$ based on the information received from the signal processing block 81. Thus, the routine 191 and the signal processing block 81 make up the carrier phase measuring component of the receiver 32. As was indicated earlier, each of these carrier phase measurement includes both a fractional wavelength phase component $\Phi_{fr}$ and an integer wavelength phase change component $\Phi_{int}$. These phase measurements are used by receiver 32 for making Carrier Phase Differential GPS position determinations.

The PRN code phase measuring routine 192 makes the PRN code phase measurements described earlier based on the information received from the signal processing block 81. Thus, the routine 192 and the signal processing block 81 make up the PRN code phase measuring component of the receiver 32. As was indicated earlier, these measurements are used by receiver 32 for Conventional GPS and Ordinary Differential GPS position determinations.

The carrier phase velocity measuring routine 193 makes the phase velocity measurements $\Phi_{25(i)/34}$ and $\Phi_{27(k)/38}$ from the information received from the signal processing block 81. Thus, the routine 193 and the signal processing block 81 make up the carrier phase velocity measuring component of the receiver 32. As was indicated earlier, each of these phase velocity measurements are used by receiver 32 for calculating the initialization values necessary for Carrier Phase Differential GPS position determinations.

The routines 191–193 issue their respective measurements at the same rate as is do the measurement routines in receivers 41 and 33. This is done so that the carrier and PRN code phase measurements and the phase velocity measurements of receivers 41 and 33 can be synchronized with the carrier and PRN code phase measurements and phase velocity measurements of receiver 32. As was discussed earlier, these carrier phase measurements are made by the routines 191–193 at the rate of approximately 1–10 Hz.

The coarse position generating routine 194 is called up by CPU 88 for coarse navigation when airplane 21 is out of view of the pseudolites 26(1)–(2) and 29. The routine 194 computes position determinations using Conventional GPS to within tens of meters of the exact location. It generates these position determinations from (A) the PRN code phase measurements which were made for each of the GPS signals 25(1)–(4) by signal processing block 81 and which were measured by the routine 192, and (B) the GPS satellite position data in the data components of the GPS signals 25(1)–(4) which were demodulated by signal processing block 81.

The accurate position generating routine 195 is called up by CPU 88 for more accurate navigation when airplane 21 is in view of any of the pseudolites 26(1)–(2) or 29. The routine 195 generates position determinations using Ordinary Differential GPS to within several meters of the exact location. It does so by computing corrections for the PRN code phase measurements which were made for each of the GPS signals 25(1)–(4) by the signal receiving block 81 and which were measured by the routine 192. These corrections are computed from (A) the PRN code phase measurements which were made for GPS signals 25(1)–(4) by receiver 41 and which were sampled and uplinked to receiver 32 by any of the pseudolites 26(1)–(2) or 29, (B) the known position of reference antenna 40 with respect to the coordinate system used to determine the positions of the GPS satellites 24(1)–(4), and (C) the GPS satellite position data in the data components of the GPS signals 25(1)–(4) which were demodulated by the signal processing block 81. The coarse position determinations of routine 195 are then computed in the same way as in routine 194 except that the computed corrections are applied.

The unit directional vector computation routine 196 computes the vectors $\hat{s}_{24(i)}$ in the manner described earlier. Thus, these vectors are computed from the satellite orbital positions received in the data components of the GPS signals 25(1)–(4) and from the known location of reference antenna 40 in the coordinate system used to define the satellite orbital positions.

The initialization routine 197 generates the earlier described initialization values necessary for precise position determinations using Carrier Phase Differential GPS. This initialization routine 197 only employs the carrier phase measurements made by receivers 32 and 41 and involves a multiple step process.

The routine 197 first uses Equations (35) and, if applicable Equations (36) or/and (37) to compute in the manner described earlier the initialization values $N_{25(i)/27(1)}$, and if applicable, $N_{30/27(1)}$ or/and $N_{27(2)/27(1)}$. Thus, the routine initially computes these initialization values from (A) the measurements $\Phi_{25(i)/34}$ and $\Phi_{27(1)/38}$ and, if applicable $\Phi_{30/38}$ and $\Phi_{27(2)/38}$ made at a number of epochs during the initialization period by receiver 32, (B) the measurements $\Phi_{25(i)/40}$ and $\Phi_{27(1)/40}$ and, if applicable $\Phi_{30/40}$ and $\Phi_{27(2)/40}$ made at the same epochs by receiver 41 and contained in the data component of pseudolite signal 30 and, if applicable, 27(1) or/and 27(2), (C) the vector $\hat{s}_{24(i)}$ computed by routine 196, (D) the coarse initial guess for position vector $x_0$ computed by the routine 195, (E) the matrix A received from receiver 33, and (F) the predetermined vectors t, $k_{38}$, $p_{43(k)}$, and $p_{45}$ contained in the data component of the pseudolite signal 30 and if applicable, 27(1) or/and 27(2). These values are recorded in data storage area 201 in such a way that the equations generated from Equation (33) and, if applicable, Equation (34) or/and (35), can be stacked in matrix form for simultaneously computing the initialization values $N_{25(i)/27(1)}$, and if applicable, $N_{30/27(1)}$ or/and $N_{27(2)/27(1)}$. Routine 197 uses the iterative process described earlier for computing these values.

Then, routine 197 uses Equation (32) and, if applicable Equations (33) or/and (34) to compute the initialization values $n_{25(i)}$ and, if applicable, $n_{30}$ or/and $n_{27(k)}$. As a built integrity check, routine 197 checks to see that the values $n_{25(i)}$, $n_{30}$, $n_{27(k)}$ converge to integer values at each iteration or after the entire iterative process has been completed. These values are then stored in storage area 201 for use by the routines 199 and 200.

The initialization routine 198 generates the initialization values necessary for precise position determinations using Carrier Phase Differential GPS. The initialization routine 198 employs both the carrier phase measurements and phase velocity measurements made by receivers 32 and 41 and involves a multiple step process.

The routine 198 first uses Equation (40) to compute the value $\Delta\dot{T}_{32}-\Delta\dot{T}_{41}$ at a number of epochs in the manner described earlier. Thus, the routine initially computes these initialization values from (A) the phase velocity measurements $\dot{\Phi}_{25(i)/34}$ made at these epochs during the initialization period by receiver 32, (B) the phase velocity measurements $\dot{\Phi}_{25(i)/40}$ made at the same epochs by receiver 41 and contained in the data component of pseudolite signal 30 and, if applicable, 27(1) or/and 27(2), and (C) the vector $\hat{s}_{24(i)}$ computed by routine 196.

Then, routine 198 uses Equation (41) to compute the range rate $\dot{r}_{43(k)/38}$ at each epoch employed in the manner described earlier. Thus, the routine 198 computes this value from (A) the phase velocity measurement $\dot{\Phi}_{27(k)/38}$ made by receiver 32, (B) the phase velocity measurement $\dot{\Phi}_{27(k)/40}$ made by receiver 41 and contained in the data component of pseudolite signal 30 and, if applicable, 27(1) or/and 27(2), and (C) the value $\Delta\dot{T}_{32}-\Delta\dot{T}_{41}$ computed by routine 198.

Next, routine 198 uses Equation (42) to compute the value $\delta\dot{r}$ at each epoch employed in the way described earlier. Thus, $\delta\dot{r}$ is computed from (A) the range rate $\dot{r}_{43(k)/38}$ at each of these epochs by routine 198, and (B) the guess $\dot{r}_{0/43(k)/38}$ for the actual range rate $\dot{r}_{43(k)/38}$ which is computed by routine 198 at each of these epochs.

Routine 198 then computes $\delta x$ from Equation (43) in the manner described earlier. Thus, it is computed from (A) the guess $\vec{r}_{0/43(k)/38}$ for the actual range vector $\vec{r}_{43(k)/38}$ computed from $x_0$, (B) the guess $\vec{\dot{r}}_{0/43(k)/38}$ for the actual rate of change in $\vec{r}_{43(k)/38}$ computed from $x_0$, (C) the earlier described guess $\dot{r}_{0/43(k)/38}$, and (D) the earlier computed value $\delta\dot{r}$. These values are stored in the storage area 200 so that after several epochs routine 197 can generate equations from Equation (41) which are stacked in matrix form for solving for the unknown vector $\delta x$. The calculation for $\delta x$ is iteratively repeated until it converges to within a desired level. This is done by substituting the value of $\delta x$ obtained in the previous iteration into Equation (37) and computing the vector x. This calculated vector x is then used as $x_0$ for the next iteration. The vector $\delta x$ is then computed again from Equation (43) in the way just described and compared with the previously computed $\delta x$ to see if it converged to within the desired level.

The guesses $\dot{r}_{0/43(k)38}$, $\vec{r}_{0/43(k)38}$, and $\vec{\dot{r}}_{0/43(k)38}$ are computed by routine 198 from the vector relationship which corresponds to Equation (20). Thus, these guesses are computed from (A) a coarse position fix $x_0$ received from routine 195 at each epoch, (B) the matrix A computed by receiver 33, and (C) the predetermined vectors t, $k_{38}$, and $p_{45}$ contained in the data component of pseudolite signal 30 and, if applicable, 27(1) or/and 27(2).

Then, routine 198 uses Equation (32) and, if applicable Equations (33) or/and (34) to compute the initialization values $n_{25(i)}$ and, if applicable, $n_{30}$ or/and $n_{27(k)}$. As a built integrity check, routine 198 checks to see that the values $n_{25(i)}$, $n_{30}$, $n_{27(k)}$ converge to integer values at each iteration or after the entire iterative process has been completed. These values are then stored in storage area 201 for use by the routines 199 and 200.

The precise position generating routine 199 is called up by CPU 88 for precise position determinations when airplane 21 is in view of the pseudolites 26(1)–(2) and 29. The routine 93 generates position determinations using Carrier Phase Differential GPS to within centimeters of the exact location.

The precise position routine 199 generates the precise position vector x using Equations (26) and, if applicable, Equation (27). Thus, the vector x is generated from (A) the measurements $\Phi_{25(i)/34}$ and $\Phi_{27(1)/38}$ and, if applicable $\Phi_{30/38}$ and $\Phi_{27(2)/38}$ made at a each epoch after the initialization period by receiver 32, (B) the measurements $\Phi_{25(i)/40}$ and $\Phi_{27(1)/40}$ and, if applicable $\Phi_{30/40}$ and $\Phi_{27(2)/40}$ made at the same epochs by receiver 41, (C) the vector $\hat{s}_{24(i)}$ computed by routine 196, and (D) the initialization values $n_{25(i)}$ and, if applicable, $n_{30}$. Furthermore, for accurate landings, the precise position routine 199 can compute the precise position y of the bottom side antenna 38 using Equation (25). Thus, it computes this position from (A) the attitude matrix A computed by receiver 33, (B) the computed vector x, and (C) the known vector $k_{38}$. For even greater accuracy in landing, routine 199 will compute the position of the landing gear in the same manner.

The integer hand-off routine 200 computes after the initialization period the integer ambiguities $n_{25(i)}$ and $n_{30}$ for any GPS signals 25(i) or 30 which were not in view during the initialization period or which were lost after this period. This is done by using Equation (26), or if applicable, Equation (27). Thus, the values for the new integer ambiguities $n_{25(i)}$ and, if applicable, $n_{30}$, are generated from (A) the measurements $\Phi_{25(i)/34}$ and $\Phi_{27(1)/38}$ and, if applicable $\Phi_{30/38}$ and $\Phi_{27(2)/38}$ made at an epoch of after the initialization period by receiver 32, (B) the measurements $\Phi_{25(i)/40}$ and $\Phi_{27(1)/40}$ and, if applicable $\Phi_{30/40}$ and $\Phi_{27(2)/40}$ made at the same epoch by receiver 41, (C) the vector $\hat{s}_{24(i)}$ computed by routine 196, (D) the vector x computed by routine 199 at the same epoch, (E) the predetermined vector t and, if applicable, the vectors $p_{45}$ and $k_{38}$, received from the data component of the GPS signal 30, and, if applicable, (E) the matrix A. The routine 199 will then use these additionally computed integer ambiguities for computing the precise position vector x.

The synthesizer 86 and the reference oscillator 85 are coupled together. The synthesizer 86 is configured and coupled in the same way and generates the same type of down converting and clock signals as was described earlier for the synthesizer 56 of reference receiver 41 of FIG. 11. The oscillator 85 is configured and coupled in the same way and generates the same type of reference frequency signal as was described earlier for the reference oscillator 55 of reference receiver 41 of FIG. 11.

The clock signal generated by the synthesizer 85 is received by the signal processing stages 84(1)–(2) and the CPU 88. Since the CPU 88 and the signal processing stages 84(1)–(2) operate based on the same clock source, the carrier phase measurements, PRN code phase measurements, and carrier phase velocity measurements made for each of the GPS signals 25(1)–(4), 27(1)–(2), and 30 are coherent (i.e. made at the same time) with respect to each other.

Figure 18:
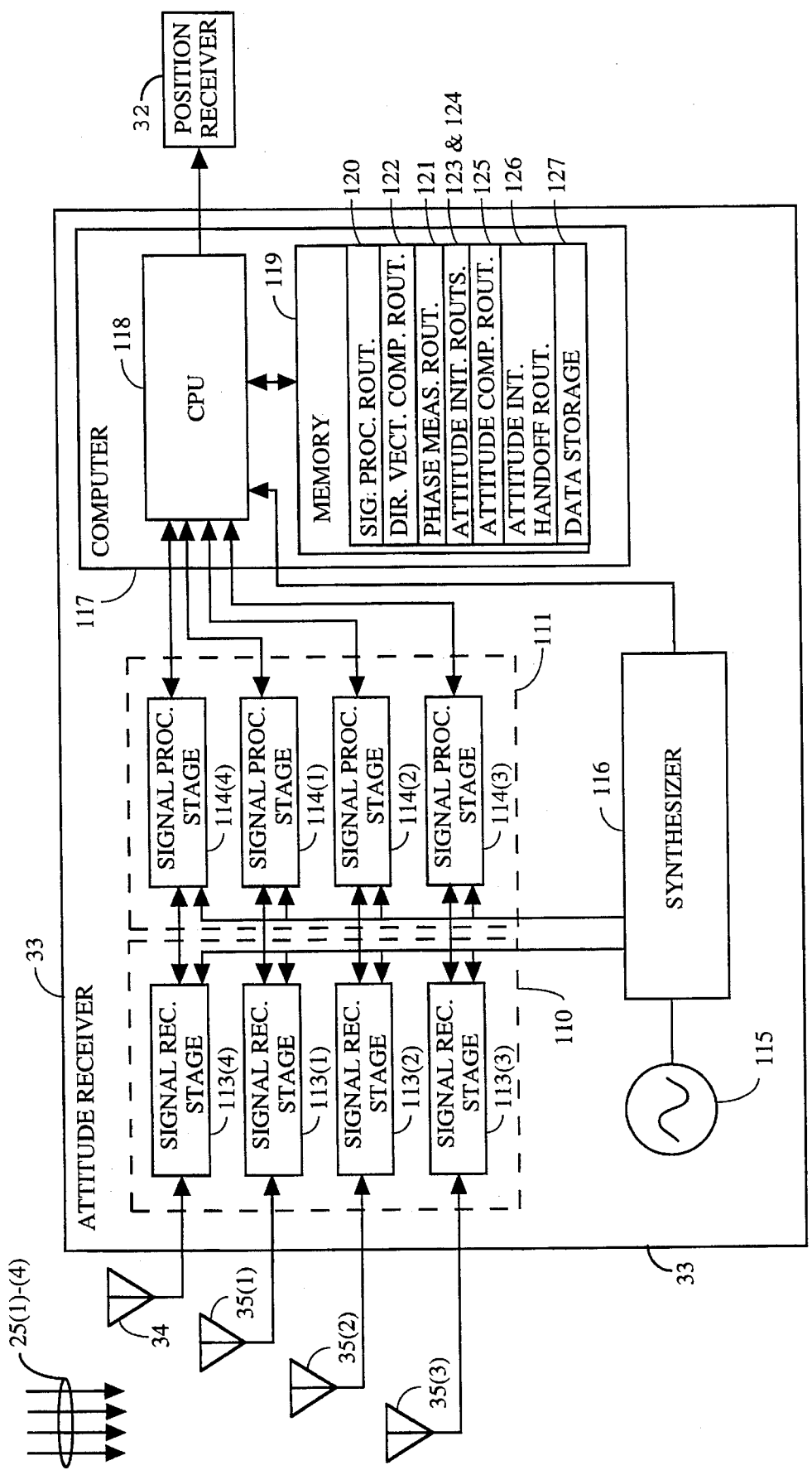
FIG. 18 provides a detailed illustration of another portion of the GPS mobile system including a GPS attitude receiver and several antennas.

FIG. 18 provides another detailed illustration of part of the mobile system 37. It shows the antennas 34 and 35(1)–(3) and the GPS attitude receiver 33.

Antennas 34 and 35(1)–(3) receive GPS signals 25(1)–(4). As was indicated earlier, the positions of antennas 35(1)–(3) with respect to antenna 34 are respectively given by the vectors $x_{35(1)}$, $x_{35(2)}$, and $x_{35(3)}$ in the runway coordinate system 46 and given by the vectors $k_{35(1)}$, $k_{35(2)}$, and $k_{35(3)}$ in the body coordinate system 47.

The GPS attitude receiver 33 is coupled to GPS position receiver 32. It computes the attitude matrix A using Carrier Phase Differential GPS. As was described earlier, the attitude matrix A is used by the routines 197 and 198 of receiver 32 in computing the initialization values described earlier and is used by routine 199 of receiver 32 in computing the precise position vector y.

GPS receiver 33 receives the GPS signals 25(1)–(4) from each of the antennas 34 and 35(1)–(3). Like the reference receiver 41 and the position receiver 32, it includes a signal receiving block 110, a signal processing block 111, a reference oscillator 115, a synthesizer 116, and a computer 117.

In this configuration, the signal receiving block 110 comprises four signal receiving stages 113(1)–(4). The signal receiving stage 113(4) is coupled to antenna 34 for receiving the GPS signals 25(1)–(4). The signal receiving stages 113(1)–(3) are respectively coupled to antennas 35(1)–(3) for also receiving the GPS signals 25(1)–(4). The signal receiving stages 113(1)–(4) are otherwise configured and coupled in the same way and perform the same signal extracting and down converting functions as do the signal receiving stages 53(1)–(4) and 83(1)–(2) described earlier for reference receiver 41 and position receiver 32 respectively.

The signal processing block 111 includes four multi-channel signal processing stages 114(1)–(4). The signal processing stages 114(1)–(4) are respectively coupled to the signal receiving stages 113(1)–(4). The signal processing stages 114(1)–(4) are configured and coupled in the same way, perform the same type of signal separating and phase locking functions, and generate the same type of phase and phase velocity information as do the signal processing stages 53(1)–(4) and 83(1)–(2).

The computer 117 is coupled to each of the signal processing stages 114(1)–(4). It includes a central processing unit (CPU) 118 and a computer memory 119.

The CPU 118 receives from the signal processing stages 114(1)–(4) the raw carrier phase measurements for GPS signals 25(1)–(4).

The computer memory 119 stores the signal processing routine 120, the carrier phase measuring routine 121, the directional vector computation routine 122, the static attitude initialization routine 123, the motion based attitude initialization routine 124, the attitude generating routine 125, and the attitude integer ambiguity hand-off routine 126. The computer memory also stores data generated from these routines 120–126 in the data storage area 127. The CPU 118 is coupled to the computer memory 119 for receiving the routines 120–126 and the data in the data storage area 127. The CPU 118 is also coupled to the CPU 88 of the GPS position receiver 32 for passing the computed attitude matrix A to the receiver 32.

The signal processing routine 120 generates the signal processing control signals for controlling the carrier and PRN code phase locking operations of the signal processing block 111. These control signals are outputted by the CPU 118 and received by the signal processing block 111.

The carrier phase measuring routine 121 makes the phase measurements $\Phi_{25(i)/34}$ and $\Phi_{25(i)/35)(m)}$ based on the information received from the signal processing block 111. Thus, the routine 121 and the signal processing block 111 make up the carrier phase measuring component of the receiver 33. As was indicated earlier, each of these carrier phase measurement includes both a fractional wavelength phase component $\Phi_{fr}$ and an integer wavelength phase change component $\Phi_{int}$. These phase measurements are used by receiver 33 for making Carrier Phase Differential GPS attitude determinations.

The routine 121 issues the phase measurements at the same rate as is do the measurement routines in receivers 41 and 32. This is done so that the phase measurements and the phase velocity measurements of receivers 41 and 32 can be synchronized with the carrier phase measurements of receiver 33. As was discussed earlier, these carrier phase measurements are made by the routine 121 at the rate of approximately 1–10 Hz.

The unit directional vector computation routine 122 computes the vectors $\hat{s}_{24(i)/34}$ in the manner described earlier. Thus, these vectors are computed from (A) the satellite orbital positions received in the data components of the GPS signals 25(1)–(4), and (B) the location of reference antenna 34 in the coordinate system used to define the satellite orbital positions computed by routine 122 from Conventional GPS or Ordinary Differential GPS.

The static attitude initialization routine 123 when selected computes the initialization values $n_{25(i)/34/35(m)}$ from Equation (48) in the manner described earlier. Thus, routine 123 is responsive to (A) the measurements $\Phi_{25(i)/34}$ and $\Phi_{25(i)/35(m)}$ made by routine 122 over several epochs, and (B) the directional vectors $\hat{s}_{24(i)/34}$ computed by routine 122. Since routine 123 records these values so that Equation (43) is stacked in matrix form, the values $n_{25(i)/34/35(m)}$ can be simultaneously solved. These initialization values $n_{25(i)/34/35(m)}$ are then stored in the data storage area 127 for use by the attitude determination routine 125. As a built in integrity check, these values are checked to see that they converge to integer values.

The motion based attitude initialization routine 124 when selected also computes the initialization values $n_{25(i)/34/35(m)}$ in the manner described earlier. This requires a multiple step process.

First, routine 124 initially computes the vectors $\Delta b_{35(m)}$ using Equation (50) in the manner described earlier. Routine 124 records in data storage area 127 the measurements $\Phi_{25(i)/34}$ and $\Phi_{25(i)/35(m)}$ made by routine 122 at an initial epoch. Then, at a number of succeeding epochs routine 124 computes the vectors $\Delta b_{35(m)}$ from (A) the measurements $\Phi_{25(i)/34}$ and $\Phi_{25(i)/35(m)}$ recorded at the initial epoch and made at these succeeding epochs, and (B) the unit directional vectors $\hat{s}_{24(i)/34}$ computed by routine 122.

Routine 124 then computes the baseline vectors $b_{35(m)}$ from Equation (53). These values are generated from (A) measurements $\Phi_{25(i)/34}$ and $\Phi_{25(i)/35(m)}$ made by routine 122 at the epochs employed, (B) the vectors $\Delta b_{35(m)}$ computed from Equation (43) at each of the epochs employed after the initial epoch, and (C) the unit directional vectors $\hat{s}_{24(i)/34}$ computed by routine 122. Routine 124 records these values in the data storage area 127 so that Equation (53) is stacked in matrix form. As a result, the baseline vectors $b_{35(m)}$ can be simultaneously solved and stored in the data storage area 127.

Once the baseline vectors $b_{35(m)}$ are computed, routine 124 computes the values $n_{25(i)/34/35(m)}$ from Equation (48). Thus, these values are generated by routine 124 from (A) the measurements $\Phi_{25(i)/34}$ and $\Phi_{25(i)/35(m)}$ made by routine 122 and recorded at the initial epoch, (B) from the baseline vectors $b_{35(m)}$ computed and stored in storage area 127, and (C) the unit directional vectors $\hat{s}_{24(i)/34}$ computed by routine 122. The computed initialization values $n_{25(i)/34/35(m)}$ are then stored in data storage area 127 for use by the attitude determination routine 125. As a built in integrity check, the values $n_{25(i)/34/35(m)}$ can be checked to see that they converge to integer values.

The attitude determination routine 125 computes the attitude matrix A at each epoch in the manner described earlier. This involves a five step process.

First, routine 125 computes at each epoch the differential ranges $\Delta r_{24(i)/34/35(m)}$ using Equation (44). Thus, these differential ranges $\Delta r_{24(i)/34/35(m)}$ are computed from (A) the measurements $\Phi_{25(i)/34}$ and $\Phi_{25(i)/35(m)}$ made by routine 122 at each epoch, (B) the initialization values $n_{25(i)/34/35(m)}$ computed by routines 123 or 124, and (C) the unit directional vectors $\hat{s}_{24(i)/34}$ computed by routine 122.

Routine 125 computes the initial estimate $A_0$ at each epoch by minimizing Equation (60). Thus, the initial estimate $A_0$ is generated by routine 125 from (A) the predetermined measurement weights $w_{35(m)/24(i)}$, (B) the differential ranges $\Delta r_{24(i)/34/35(m)}$ computed by routine 125, (C) the known vectors $k_{35(m)}$, and (D) the unit directional vectors $\hat{s}_{24(i)}$ computed by routine 122.

The routine 125 then computes the vector $\delta\Theta$ at each epoch by minimizing the Equation (66). Thus, the vector $\delta\Theta$ is generated by routine 125 from (A) the predetermined measurement weights $w_{35(m)/24(i)}$, (B) the differential ranges $\Delta r_{24(i)/34/35(m)}$ computed by routine 125, (C) the initial estimate $A_0$ computed by routine 125, (D) the matrix $B_{35(m)}^x$ computed by routine 125, and (E) the computed unit directional vectors $\hat{s}_{24(i)/34}$.

Routine 125 then computes the matrix $\Theta^x$ using Equation (65). Thus, the matrix $\Theta^x$ is generated by routine 125 from the elements of the computed vector $\delta\Theta$.

The routine 125 then computes the correctional matrix $\delta A$ using Equation (63). As a result, the matrix $\delta A$ is generated by routine 125 from the computed matrix $\Theta^x$.

The routine 125 then computes the matrix A using Equation (63). Thus, matrix A is generated by routine from the computed correctional matrix $\delta A$.

The routine 125 repeats this process iteratively until the value for A converges to within a desired level. As was discussed earlier, this is done by substituting the estimate matrix A from the previous iteration into Equation (66) as the matrix $A_0$ for the next iteration. The new estimate A is then computed and compared with the estimate A from the previous iteration. This process is continued until the estimate for A converges to within the desired level.

The integer hand-off routine 126 computes after the initialization period the integer ambiguities $n_{25(i)/34/35(m)}$ for any GPS signals 25(i) which were not in view during the initialization period or which were lost after this period. This is done by using Equation (59). Thus, the values for the new integer ambiguities $n_{25(i)/34/35(m)}$ are generated from (A) the measurements $\Phi_{25(i)/34}$ and $\Phi_{25(i)/35(m)}$ made at an epoch, (B) the known vectors $k_{35(m)}$, and (C) the known attitude matrix A computed by routine 125. The routine 125 will then use these additionally computed integer ambiguities in computing the attitude matrix A.

The synthesizer 116 and the reference oscillator 115 are coupled together. The synthesizer 116 is configured and coupled in the same way and performs the same down converting and clock signal generating functions as do the synthesizers 56 and 86. The oscillator 115 is configured and coupled in the same way and performs the same reference frequency signal generating functions as does the reference oscillator 55 and 85.

The clock signal generated by the synthesizer 116 is received by the signal processing stage 114 and the CPU 118. Since the CPU 118 and the signal processing stage 114 operate based on the same clock source, the carrier phase measurements made for each of the GPS signals 25(1)–(4) are coherent (i.e. made at the same time) with respect to each other.

Figure 19:
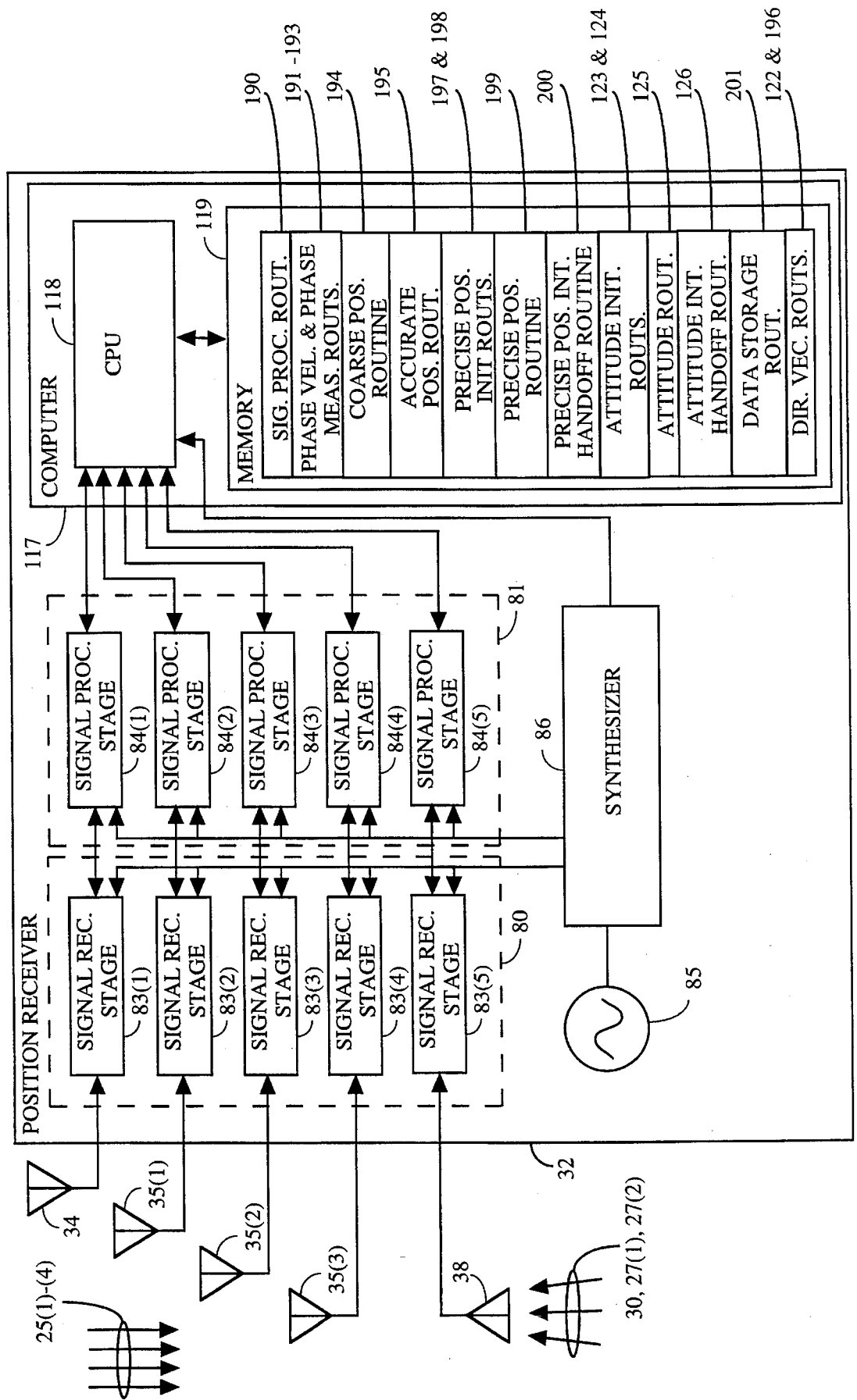
FIG. 19 shows another embodiment of the GPS mobile system where a single GPS receiver generates both position determinations and attitude determinations.

FIG. 19 shows an alternative embodiment for the airborne components of system 20. In this configuration, there is a single GPS receiver 32 which computes both position determinations and attitude determinations.

Receiver 32 now has five signal paths. The first accommodates the GPS signals 25(1)–(4) received from the antenna 34. The second, third, and fourth signal paths respectively accommodate the GPS signals 25(1)–(4) received by the antennas 35(1)–(3). And, the fifth accommodates the GPS signals 27(1)–(2) and 30 received from the antenna 38.

Thus, in this embodiment the signal receiving block 80 has five signal receiving stages 83(1)–(5) and the signal processing block 81 has five signal processing stages 84(1)–(5). The signal receiving stages 83(1)–(5) are respectively coupled to the signal processing stages 84(1)–(5).

The signal receiving stages 83(1)–(5) are respectively coupled to the antennas 34, 35(1)–(3), and 38. Except for this difference, each of the signal receiving stages 83(1)–(5) is otherwise configured and coupled in the same way and performs the same signal extracting and down converting functions as was earlier described for the signal receiving stage 53 of FIG. 11. Moreover, each of the signal processing stages 84(1)–(5) is configured and coupled in the same way, perform the same type of separating and phase locking functions, and generate the same type of phase and phase velocity information as was described earlier for the signal processing stage 54.

Furthermore, computer memory 89 of computer 87 stores in this configuration the signal processing routine 190, the carrier phase measuring routine 191, the PRN code phase measuring routine 192, the phase velocity measuring routine 193, the coarse position generating routine 194, the accurate position generating routine 195, the unit directional vector computing routines 196 and 122, the initializing routines 196 and 197, the precise position generating routine 198, the precise position hand-off routine 199, the static attitude initialization routine 123, the motion based attitude initialization routine 124, the attitude generating routine 125, and the attitude integer hand-off routine 126. The computer memory also stores data generated from these routines 190–200 and 122–126 in the data storage area 201. The CPU 88 is coupled to the computer memory 89 for receiving the routines 190–200 and 122–126 and the data in the data storage area 201.

Figure 20:
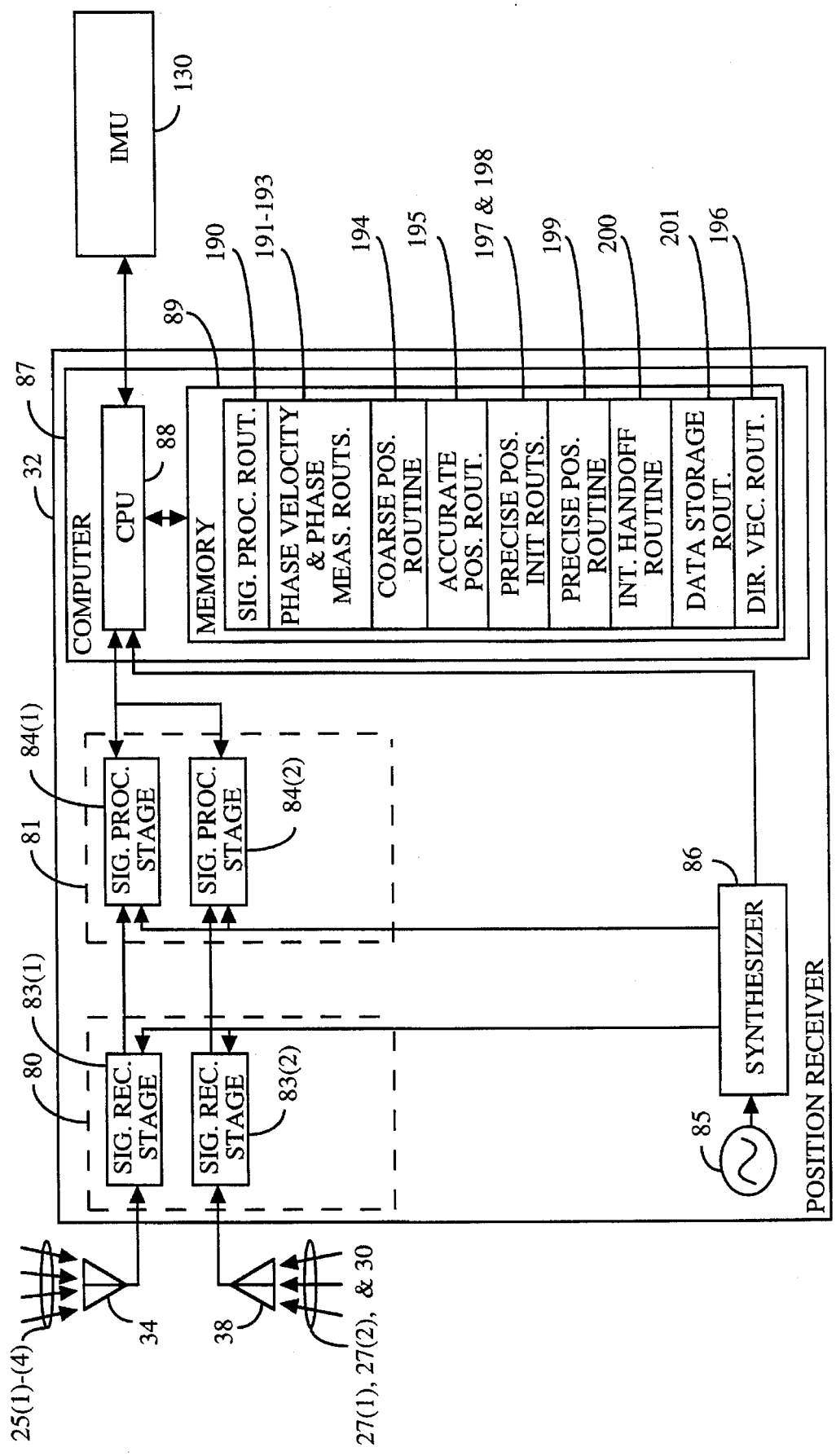
FIG. 20 shows another embodiment of the GPS mobile system where an inertial measurement unit is employed.

FIG. 20 shows another embodiment for the airborne components of system 20. In this configuration, an inertial measurement unit (IMU) 130 has been substituted for the GPS attitude receiver 33. The IMU 130 is coupled to the CPU 88 of receiver 32.

In one embodiment, the IMU 130 can directly provide receiver 32 with the computed attitude matrix A. Alternatively, the computer memory 89 can store a routine 131 for converting the attitude parameters yaw, pitch, and roll supplied by the IMU 130 into the matrix A.

Figure 21:
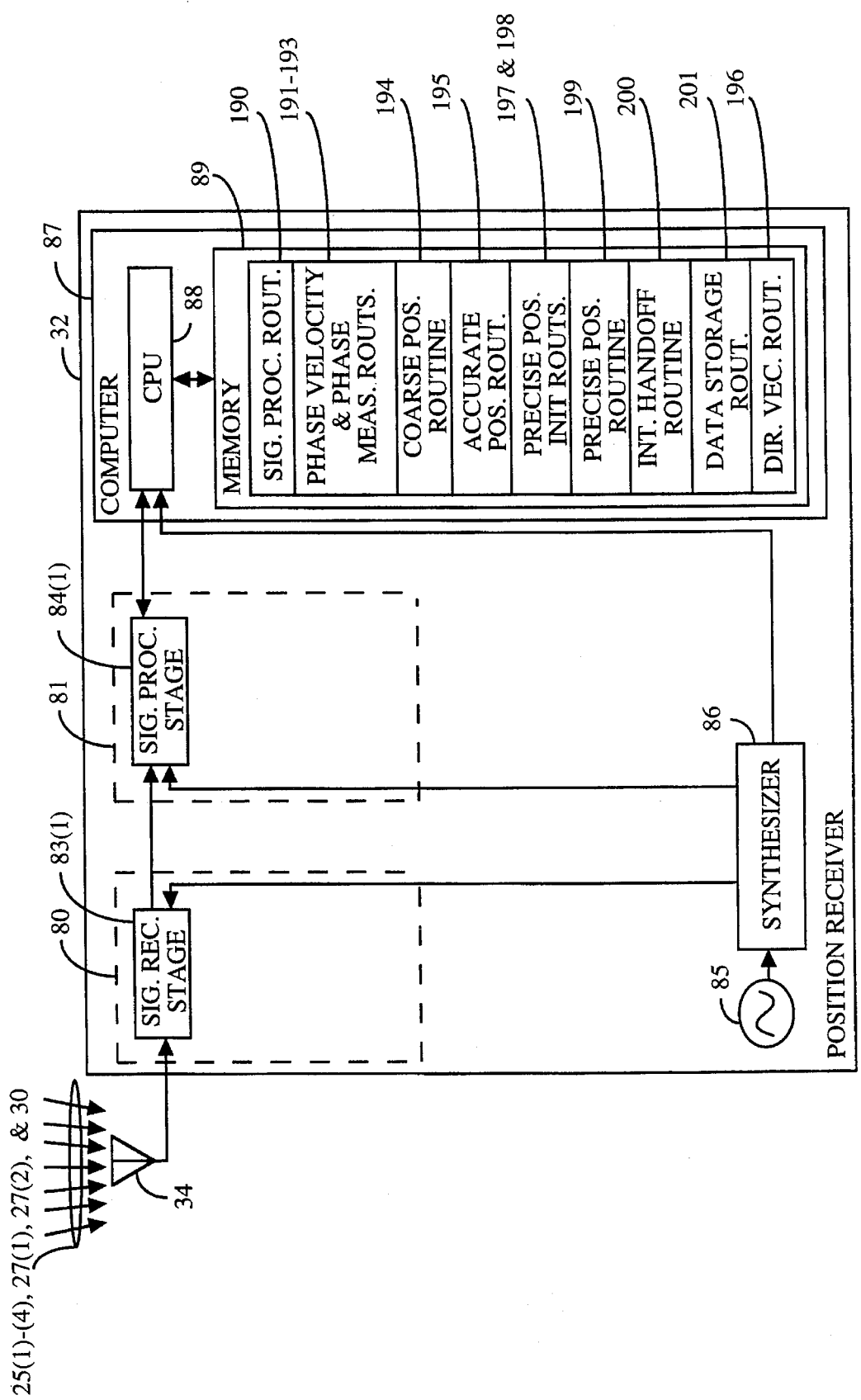
FIG. 21 shows another embodiment for the GPS mobile system where a single antenna and a single GPS position receiver are employed.

FIG. 21 shows another embodiment for the airborne components of system 20. In this configuration, only a single antenna 34 and a single receiver 32 are mounted on airplane 21. Receiver 32 now has only one signal path. It accommodates the GPS signals 25(1)–(4), 27(1)–(2), and 30 all received from the antenna 34.

Thus, in this embodiment the signal receiving block 80 has a single receiving stage 83 and the signal processing block 81 has a single signal processing stages 84. The signal receiving stage 83 is coupled to the signal processing stage 84.

The signal receiving stage 83 is coupled to the antenna 34. Except for this difference, the signal receiving stage 83 is otherwise configured and coupled in the same way and performs the same signal extracting and down converting functions as was earlier described for the signal receiving stage 53 of FIG. 11. Moreover, the signal processing stage 84 is configured and coupled in the same way, performs the same type of separating and phase locking functions, and generates the same type of phase and phase velocity information as was described earlier for the signal processing stage 54.

The computer 87 is coupled to the signal processing stage 83. It otherwise is coupled in the same way and stores the same routines as was described earlier for the receiver 32 of the embodiment of FIG. 2.

CONCLUSION

Many of the individual elements of the components of system 20 are known in the art. In fact, many are found in commercially available products.

Specifically, the GPS antennas 34, 35(1)–(3), 38, 40 and 43(1)–(2) are of the type commonly known as standard hemispherical microstrip patch antennas. The GPS antenna 45 is of the type commonly known as a standard helical antenna.

The signal receiving stages 53(1)–(4), 83(1)–(5), and 113(1)–(4), the signal processing stages 54(1)–(4), 84(1)–(5), and 114(1)–(4), the synthesizers 55, 85 and 115, the oscillators 56, 86, and 116, and the computers 57, 87, and 117 and their respective signal processing routines 160, 190, and 120, carrier phase measuring routines 161, 191, and 121, PRN code phase measuring routines 162 and 192, phase velocity measuring routines 163 and 193 may be of the type commonly found in a Trimble 4000 Series GPS receiver.

The reference oscillators 63(1)–(3), the synthesizers 64(1)–(3), the PRN code generators 65(1)–(3), the mixing stages 66(1)–(3), and the amplifiers 67(1)–(3) may be commonly found in a GS-100 signal generator produced by Welnavigate.

Although these figures and the accompanying description are provided in relation to an airplane, one skilled in the art would readily understand that the invention is applicable to Carrier Phase Differential Position determinations for any land, sea, air, or space vehicle. Furthermore, while the present invention has been described with reference to a few specific embodiments, the description is illustrative of the invention and is not to be construed as limiting the invention. Indeed, various modifications may occur to those skilled in the art without departing from the true spirit and scope of the invention as defined by the appended claims.

What is claimed is:

1. A method of resolving integer wavelength ambiguities associated with phase measurements made for GPS carrier signals transmitted by GPS satellites, the method being used with an aircraft on a final approach trajectory to a runway, the method comprising the steps of:

positioning one or more pseudolites each at a fixed known location in front of the runway below the final approach trajectory of the aircraft;

with the one or more pseudolites, transmitting one or more pseudolite carrier signals;

with a mobile GPS receiver system mounted on the aircraft:

receiving the transmitted one or more pseudolite carrier signals and the transmitted GPS carrier signals;

making phase measurements for the received one or more pseudolite carrier signals and the received GPS carrier signals at measurement epochs while the aircraft is on the final approach trajectory, there being an integer wavelength ambiguity associated with the phase measurements made for each of the received GPS carrier signals;

determining directions to the GPS satellites with respect to the reference coordinate system at the measurement epochs; and resolving the integer wavelength ambiguities in response to the phase measurements, the known location of each of the one or more pseudolites, and the determined lines of sight to the GPS satellites.

2. The method of claim 1 wherein:

the final approach trajectory has an along track component;

the one or more pseudolites comprise two pseudolites further positioned in the positioning step on opposite sides of the along track component of the final approach trajectory.

3. The method of claim 1 wherein:

each of the one or more pseudolite carrier signals is transmitted in the pseudolite carrier signal transmitting step as a low power signal bubble;

the phase measurements are made in the phase measurement making step while the aircraft flies through the one or more low power signal bubbles on the final approach trajectory.

4. The method of claim 3 wherein each of the one or more pseudolite carrier signals is transmitted in the transmitting step with a pseudo-random code signal as an L1 C/A GPS signal.

5. The method of claim 1 wherein:

the mobile receiver system comprises a top side antenna mounted on top of the aircraft and a bottom side antenna mounted on bottom of the aircraft;

the GPS carrier signals being received in the receiving step with the top side antenna;

the one or more pseudolite carrier signals being received in the receiving step with the bottom side antenna.

6. The method claim 1 wherein:

the phase measurements are made in the phase measurement step during a period in which the aircraft flies over the one or more pseudolites on the final approach trajectory and a large angular change in geometry occurs between the mobile GPS receiver system and the one or more pseudolites;

the integer ambiguities are resolved in the resolving step with batch processing of (A) the phase measurements, (B) the known location of each of the one or more pseudolites, and (C) the determined directions to the GPS satellites.

7. The method claim 6 wherein:

the mobile GPS receiver has undetermined positions with respect to the reference coordinate system at the measurement epochs;

the integer wavelength ambiguities are resolved with the batch processing in the resolving step based on a set of simultaneous equations that relate (A) the phase measurements, (B) the known location of each of the one or more pseudolites, (C) the determined directions to the GPS satellites, (D) the integer wavelength ambiguities, and (E) the undetermined positions of the mobile GPS receiver system, the number of the measurement epochs and the pseudolite and GPS carrier signals being such that the set of simultaneous equations is overdetermined.

8. The method of claim 7 further comprising the step of:

with the mobile GPS receiver system, computing initial guesses for the undetermined positions of the mobile GPS receiver system;

the set of simultaneous equations comprising a set of non-linear equations that are linearized so that the undetermined positions of the mobile GPS receiver system are represented as estimates and precise differences between the estimates and the undetermined positions;

the integer wavelength ambiguities being iteratively resolved with the batch processing in the resolving step by (A) resolving the integer wavelength ambiguities and computing the corrections in iterations based on the set of simultaneous equations, (B) in an initial one of the iterations, using the initial guesses as the estimates, and (C) in each subsequent one of the iterations, using as the estimates the estimates used in a directly preceding one of the iterations adjusted by the precise differences computed in the directly preceding one of the iterations.

9. A method of resolving integer wavelength ambiguities associated with phase measurements made for GPS carrier signals transmitted by GPS satellites, the method comprising the steps of:

positioning one or more pseudolites each at a fixed known location with respect to a reference coordinate system;

with the one or more pseudolites, transmitting one or more pseudolite carrier signals;

with a mobile GPS receiver system:

receiving the transmitted one or more pseudolite carrier signals and the transmitted GPS carrier signals;

making phase measurements for the received one or more pseudolite carrier signals and the received GPS carrier signals at measurement epochs while a large angular change in geometry occurs between the mobile GPS receiver system and the one or more pseudolites, there being an integer wavelength ambiguity associated with the phase measurements made for each of the received GPS carrier signals;

determining directions to the GPS satellites with respect to the reference coordinate system at the measurement epochs; and resolving the integer wavelength ambiguities in response to the phase measurements, the known location of each of the one or more pseudolites, and the determined lines of sights to the GPS satellites.

10. The method claim 9 wherein the integer ambiguities are resolved in the resolving step with batch processing of (A) the phase measurements, (B) the known location of each of the one or more pseudolites, and (C) the determined directions to the GPS satellites.

11. The method claim 10 wherein:

the mobile GPS receiver has undetermined positions with respect to the reference coordinate system at the measurement epochs;

the integer wavelength ambiguities are resolved with the batch processing in the resolving step based on a set of simultaneous equations that relate (A) the phase measurements, (B) the known location of each of the one or more pseudolites, (C) the determined directions to the GPS satellites, (D) the integer wavelength ambiguities, and (E) the undetermined positions of the mobile GPS receiver system, the number of the measurement epochs and the pseudolite and GPS carrier signals being such that the set of simultaneous equations is overdetermined.

12. The method of claim 11 further comprising the step of:

with the mobile GPS receiver system, computing initial guesses for the undetermined positions of the mobile GPS receiver system;

the set of simultaneous equations comprising a set of non-linear equations that are linearized so that the undetermined positions of the mobile GPS receiver system are represented as estimates and precise differences between the estimates and the undetermined positions;

the integer wavelength ambiguities being iteratively resolved with the batch processing in the resolving step by (A) resolving the integer wavelength ambiguities and computing the precise differences in iterations based on the set of simultaneous equations, (B) in an initial one of the iterations, using the initial guesses as the estimates, and (C) in each subsequent one of the iterations, using as the estimates the estimates used in a directly preceding one of the iterations adjusted by the precise differences computed in the directly preceding one of the iterations.

13. The method of claim 9 wherein:

the mobile GPS receiver system is mounted on an aircraft on a final approach trajectory to a runway; and each of the one or more pseudolites is positioned in the positioning step in front of the runway below the final approach trajectory;

the phase measurements are made in the phase measurement step during a period in which the aircraft flies over the one or more pseudolites on the final approach trajectory and the large angular change in geometry occurs.

14. The method of claim 13 wherein:

the final approach trajectory has an along track component;

the one or more pseudolites comprise two pseudolites further positioned in the positioning step on opposite sides of the along track component of the final approach trajectory.

15. A method of making position determinations for a mobile GPS receiver system mounted on an aircraft on a final approach trajectory to a runway, the method comprising the steps of:

positioning one or more pseudolites each at a fixed known location in front of the runway below the final approach trajectory of the aircraft;

with the one or more pseudolites, transmitting one or more pseudolite carrier signals;

with a GPS reference system:
receiving GPS carrier signals transmitted by GPS satellites at a fixed known reference location with respect to the reference coordinate system;
transmitting reference phase information associated with the GPS carrier signals received with the GPS reference system;

with the mobile GPS receiver system:
receiving the transmitted one or more pseudolite carrier signals, the transmitted GPS carrier signals, and the transmitted reference phase information;
making phase measurements for the one or more pseudolite carrier signals and the GPS carrier signals received with the mobile GPS receiver system at measurement epochs during an initialization period while the aircraft is on the final approach trajectory and making phase measurements for the GPS carrier signals received by the mobile GPS receiver system at measurement epochs after the initialization period while the aircraft is still on the final approach trajectory, there being an integer wavelength ambiguity associated with the phase measurements made for each of the GPS carrier signals;
determining directions to the GPS satellites with respect to the reference coordinate system at the measurement epochs during and after the initialization period;
resolving the integer wavelength ambiguities in response to (A) the phase measurements made at the measurement epochs during the initialization period, (B) the known location of each of the one or more pseudolites, (C) the reference phase information received during the initialization period, and (D) the determined directions to the GPS satellites at the measurement epochs during the initialization period; and
computing positions for the mobile GPS receiver system with respect to the reference coordinate system at the measurement epochs after the initialization period in response to (A) the resolved integer ambiguities, (B) the phase measurements made at the measurement epochs after the initialization period, (C) the reference phase information received after the initialization period, and (D) the determined lines of sight to the GPS satellites at the measurement epochs after the initialization period.

16. The method of claim 15 wherein the reference phase information is transmitted in the reference phase information transmitting step from a fixed different location than the known location of each of the one or more pseudolites so that the transmitted reference phase information is received with the mobile GPS receiver system during and after the initialization period while the aircraft is on the final approach trajectory.

17. The method of claim 15 further comprising the step of:

with the GPS reference system, making phase measurements for the GPS carrier signals received with the GPS reference system at the measurement epochs during and after the initialization period;

the reference phase information transmitted during and after the initialization period in the reference phase information transmitting step comprising the phase measurements made during and after the initialization period with the GPS reference system.

18. The method of claim 15 wherein:

the final approach trajectory has an along track component;

the one or more pseudolites comprise two pseudolites further positioned in the positioning step on opposite sides of the along track component of the final approach trajectory.

19. The method of claim 15 wherein:

each of the one or more pseudolite carrier signals is transmitted in the pseudolite carrier signal transmitting step as a low power signal bubble;

the phase measurements made in the phase measurement making step during the initialization period are made while the aircraft flies through the low power signal bubbles on the final approach trajectory.

20. The method of claim 19 wherein each of the one or more pseudolite carrier signals is transmitted in the transmitting step with a pseudo-random code signal as an L1 C/A GPS signal.

21. The method of claim 15 wherein:

the mobile receiver system comprises a top side antenna mounted on top of the aircraft and a bottom side antenna mounted on bottom of the aircraft;

the GPS carrier signals being received with the top side antenna in the receiving step with the mobile GPS receiver system;

the one or more pseudolite carrier signals being received with the bottom side antenna in the receiving step with the mobile GPS receiver system.

22. The method of claim 15 wherein the phase measurements made in the phase measurement step during the initialization period are made while the aircraft flies over the one or more pseudolites on the final approach trajectory and a large angular change in geometry occurs between the mobile GPS receiver system and the one or more pseudolites.

23. The method of claim 22 wherein the integer ambiguities are resolved in the resolving step with batch processing of (A) the phase measurements made at the measurement epochs during the initialization period, (B) the known location of each of the one or more pseudolites, (C) the reference phase information received during the initialization period, and (D) the determined directions to the GPS satellites at the measurement epochs during the initialization period.

24. The method claim 23 wherein:

the mobile GPS receiver has undetermined positions with respect to the reference coordinate system at the measurement epochs during the initialization period;

the integer wavelength ambiguities are resolved with the batch processing in the resolving step based on a set of simultaneous equations that relate (A) the phase measurements made at the measurement epochs during the initialization period, (B) the known location of each of the one or more pseudolites, (C) the reference phase information received during the initialization period, (D) the determined directions to the GPS satellites at the measurement epochs during the initialization, (E) the integer wavelength ambiguities, and (F) the undetermined positions of the mobile GPS receiver system at the measurement epochs during the initialization period, the number of the measurement epochs and the pseudolite and GPS carrier signals being such that the set of simultaneous equations is overdetermined.

25. The method of claim 24 further comprising the step of:

with the mobile GPS receiver system, computing initial guesses for the undetermined positions of the mobile GPS receiver system;

the simultaneous equations comprising non-linear equations that are linearized so that the undetermined positions of the mobile GPS receiver system are represented as estimates and precise differences between the estimates and the undetermined positions;

the integer wavelength ambiguities being iteratively resolved with the batch processing in the resolving step by (A) resolving the integer wavelength ambiguities and computing the corrections in iterations based on the set of simultaneous linearized non-linear equations, (B) in an initial one of the iterations, using the initial guesses as the estimates, and (C) in each subsequent one of the iterations, using as the estimates the estimates used in a directly preceding one of the iterations adjusted by the precise differences computed in the directly preceding one of the iterations.

* * * * *